Feb. 5, 1957 R. C. CARLSON 2,780,465

PHONOGRAPH RECORD PLAYER

Filed July 29, 1948 27 Sheets-Sheet 1

Inventor:
Reuben C. Carlson
By J. W. Douglas atty.

PHONOGRAPH RECORD PLAYER

Filed July 29, 1948 27 Sheets-Sheet 2

Inventor:
Reuben C. Carlson
By J. D. Douglass atty.

Feb. 5, 1957 R. C. CARLSON 2,780,465

PHONOGRAPH RECORD PLAYER

Filed July 29, 1948 27 Sheets-Sheet 3

Inventor:
Reuben C. Carlson
By J. D. Douglass Atty.

Inventor:
Reuben C. Carlson
By J. D. Douglass Atty

PHONOGRAPH RECORD PLAYER

Filed July 29, 1948 27 Sheets-Sheet 5

Inventor:
Reuben C. Carlson
By J. D. Douglas Atty.

Inventor:
Reuben C. Carlson
By J. D. Douglas Atty.

Feb. 5, 1957 R. C. CARLSON 2,780,465

PHONOGRAPH RECORD PLAYER

Filed July 29, 1948 27 Sheets-Sheet 7

Inventor:
Reuben C. Carlson
By J. W. Douglas atty.

Feb. 5, 1957 R. C. CARLSON 2,780,465

PHONOGRAPH RECORD PLAYER

Filed July 29, 1948 27 Sheets-Sheet 8

Inventor:
Reuben C. Carlson
By J. W. Douglas Atty.

Feb. 5, 1957 R. C. CARLSON 2,780,465

PHONOGRAPH RECORD PLAYER

Filed July 29, 1948 27 Sheets-Sheet 9

Inventor:
Reuben C. Carlson
By J. W. Douglas Atty.

Inventor:
Reuben C. Carlson
By J. D. Douglas Atty.

Feb. 5, 1957 R. C. CARLSON 2,780,465

PHONOGRAPH RECORD PLAYER

Filed July 29, 1948 27 Sheets-Sheet 11

Inventor:
Reuben C. Carlson
By J. D. Douglas Atty.

Inventor:
Reuben C. Carlson
By O. W. Douglas Atty.

PHONOGRAPH RECORD PLAYER

Filed July 29, 1948

Inventor:
Reuben C. Carlson
By J. D. Douglas Atty.

Feb. 5, 1957 R. C. CARLSON 2,780,465
PHONOGRAPH RECORD PLAYER
Filed July 29, 1948 27 Sheets-Sheet 14
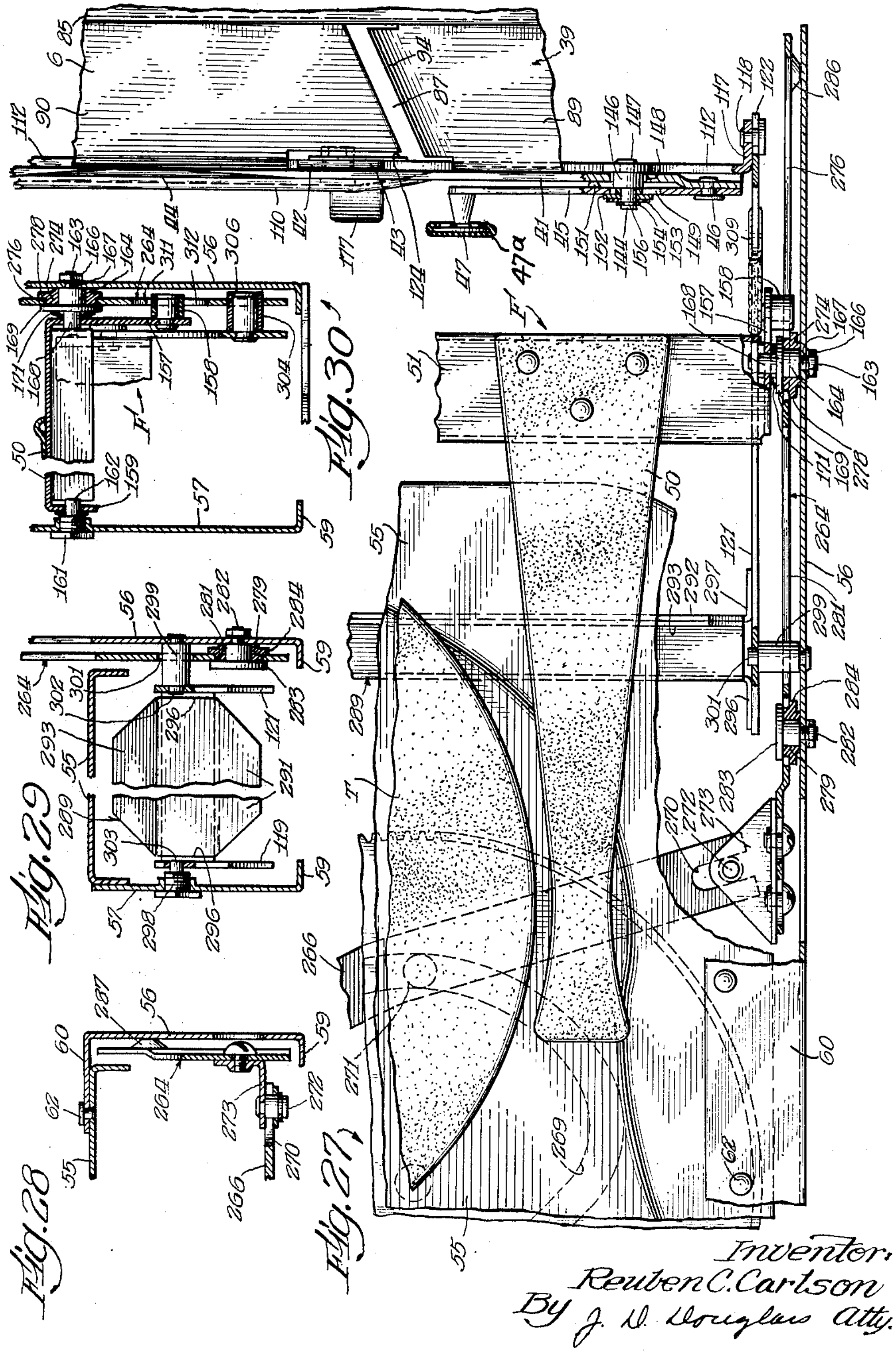
Fig. 27, Fig. 28, Fig. 29, Fig. 30, F 47a
Inventor:
Reuben C. Carlson
By J. D. Douglas Atty.

PHONOGRAPH RECORD PLAYER

Filed July 29, 1948 27 Sheets-Sheet 15

Inventor:
Reuben C. Carlson
By. J. D. Douglas Atty.

Feb. 5, 1957 R. C. CARLSON 2,780,465

PHONOGRAPH RECORD PLAYER

Filed July 29, 1948 27 Sheets-Sheet 16

Inventor:
Reubin C. Carlson
By J. D. Douglas Atty.

Feb. 5, 1957 R. C. CARLSON 2,780,465

PHONOGRAPH RECORD PLAYER

Filed July 29, 1948 27 Sheets-Sheet 17

Inventor:
Reuben C. Carlson
By J. W. Dougherty Atty.

Feb. 5, 1957 R. C. CARLSON 2,780,465

PHONOGRAPH RECORD PLAYER

Filed July 29, 1948 27 Sheets-Sheet 18

Inventor:
Reuben C. Carlson
By J. D. Douglas Atty.

Feb. 5, 1957 R. C. CARLSON 2,780,465

PHONOGRAPH RECORD PLAYER

Filed July 29, 1948 27 Sheets-Sheet 19

Inventor:
Reuben C. Carlson
By J. D. Douglas Atty.

Inventor:
Reuben C. Carlson
By J. W. Douglas atty.

Feb. 5, 1957 R. C. CARLSON 2,780,465

PHONOGRAPH RECORD PLAYER

Filed July 29, 1948 27 Sheets-Sheet 21

Inventor:
Reuben C. Carlson
By J. D. Douglas atty.

Feb. 5, 1957 R. C. CARLSON 2,780,465

PHONOGRAPH RECORD PLAYER

Filed July 29, 1948 27 Sheets-Sheet 22

Inventor:
Reuben C. Carlson
By J. W. Douglas Atty.

Feb. 5, 1957 R. C. CARLSON 2,780,465

PHONOGRAPH RECORD PLAYER

Filed July 29, 1948 27 Sheets-Sheet 23

Inventor:
Reuben C. Carlson
By J. D. Douglas Atty.

Inventor:
Reuben C. Carlson
By J. D. Douglass Atty.

Feb. 5, 1957 R. C. CARLSON 2,780,465

PHONOGRAPH RECORD PLAYER

Filed July 29, 1948 27 Sheets-Sheet 25

Inventor:
Reuben C. Carlson
By J. D. Douglas Atty.

Feb. 5, 1957 R. C. CARLSON 2,780,465

PHONOGRAPH RECORD PLAYER

Filed July 29, 1948 27 Sheets-Sheet 26

Inventor
Reuben C. Carlson
By J. D. Douglas Atty.

INVENTOR
REUBEN C. CARLSON
BY
J. W. Douglas
ATTY.

United States Patent Office 2,780,465

Patented Feb. 5, 1957

2,780,465

PHONOGRAPH RECORD PLAYER

Reuben C. Carlson, Chicago, Ill., assignor to Admiral Corporation, Chicago, Ill., a corporation of Delaware Application July 29, 1948, Serial No. 41,388

28 Claims. (Cl. 274—10)

This invention relates to phonograph record players of the type adapted to play one side of a plurality of mixed 10- and 12-inch records. It is particularly adapted to a type of cabinet wherein the records are supplied to the mechanism through a slot in said cabinet.

In greater detail, the invention comprehends automatic record player mechanism which is substantially inaccessible to an operator and which includes magazine means where the records, received through a slot in the cabinet, are adapted to be supported on their edges in a near vertical position and from which magazine means the records are adapted to be automatically manipulated to a station where they are used to reproduce the recorded sound thereon and from which station they are adapted to be automatically transferred to a played record compartment. The played record compartment is supplied with a door which may be opened for ready removal of the records.

Heretofore, the more common type of record player involved the use of a magazine which included a spindle having a shoulder on which a group of records are adapted to be manually positioned. The records were dislodged from the shoulder, after which they dropped onto a turntable where they were played. Due to the engagement of the spindle with the center hole, it was not uncommon for their center holes to become worn or mutilated by chipping thereby impairing their usefullness or rendering them worthless for future use. Usually such a style of record player is adapted to accommodate but one size of record at a time, records of a size differing from the size for which the mechanism is set, calling for a manual adjustment before the magazine can accommodate them. Moreover, the mechanism being accessible to an operator is liable of maladjustment or breakage by careless adults or juveniles. The records, as they are played, accumulate on the turntable from which they must be carefully removed, manually.

The manual operations necessary for operation of such a style of record player therefore involve considerable interruptions in a program derived from reproduction of phonograph records. The load on the turntable drive motor is gradually increased with a gradual accumulation of records on the turntable. The motor is thus retarded and its speed decreased as the records accumulate on the turntable with consequent gradual change in pitch of the reproduction. Frequently as the records become superimposed on each other, their smooth, adjacent, flat surfaces offer so little friction to each other that the top record of the group is liable to be turned with respect to the records on which it rests, due to the drag of the pickup on the top record, thereby impairing reproduction. A further disadvantage resided in the fact that, where the records accumulated on the turntable, the spindle, which held them in place, had to be small enough to provide a clearance for the side of the holes and the record could not be properly centered on the turntable which resulted in certain irregularities in tone due to the eccentricity of the record on the turntable.

Although record players, in which the records are assembled on their edges in a magazine, are known to the prior art, obstacles to their commercial success have been, among others, the difficulty of removing one of the records from the magazine without disturbing an additional record or records in the magazine; also the uncertainty that the mechanism, which is intended to remove the records in a cyclic one-at-a-time order, will always remove any record at all when they are in readiness for such removal.

Due to the present invention an inexpensive record player is available which may be incorporated in a console style of radio-phonograph combination. The improved record player is unsusceptible of maladjustment or breakage to the extent that it is concealed within a cabinet in a way which renders it substantially inaccessible to an operator. The novel record player is adapted to have records fed to it through a slot in the cabinet regardless of whether the machine is playing a record or is free of records. Furthermore, no manual adjustment is necessary for playing records of either 10-inch or 12-inch size since single records or groups of records of either or both of these sizes, in any order, can be pushed through the slot by which they enter the magazine of the record player and are therefrom manipulated automatically until they are transferred to a played or rejected record compartment.

The invention further contemplates use of a magazine in which the records of a group are supported on their edges, in a near vertical position by novel support means, and novel mechanism in combination with the support means is adapted to segregate a single record from the group without disturbing the remaining records, and which always removes a record from the group when the machine operates to so remove one. Furthermore, the mechanism for automatically handling the records does not mutilate or unduly wear their center holes. Finally, the turntable undergoes no process of slowing down due to an increased load on the turntable since no more than one record is ever carried by the turntable at a time. In addition, due to the fact that only one record is on the turntable at a time, the record can be more perfectly centered on the turntable with the result that the reproduction of the sound is effected without changes in the pitch, or "wows," due to eccentricity of the record on the turntable.

In order that the foregoing advantages may be realized, I make use of mechanism including a conventional turntable from the axis of which a fixed spindle extends. I also employ a fixed magazine to receive records of a plurality of sizes. The magazine has surfaces adapted to take advantage of the force of gravity for conveying the records to a predetermined location in the magazine where they are brought to rest in a nearly vertical position; i. e., with the records resting principally on their peripheral edges. Mechanism for segregating one of the records from the others in the magazine and by which the record so segregated is removed from the magazine is also employed. The spindle is fixed and includes an inclined portion extending toward the magazine and mechanism is employed for receiving a record from the magazine and threading it over the spindle. The invention further includes swingable mechanism, cooperatively associated with the spindle, by which a record engaged by the spindle is lowered to the turntable for reproduction, after which the swingable mechanism moves the record in a reverse direction over the spindle until it is disengaged therefrom, whereupon it slides from the swingable mechanism and drops to a played record compartment. Finally, the mechanism is employed for reducing the speed of descent of a record after it leaves the swingable mechanism so that the record creates no noise of impact on striking surfaces within the played record compartment, and the records do not mutilate each other as they are dropped into the compartment.

Other advantages of the invention, as well as the invention itself, will become more apparent from the following description of an embodiment thereof, which description is illustrated by the accompanying drawings and forms a part of this specification.

Figures 1, 2, 2A, 3:
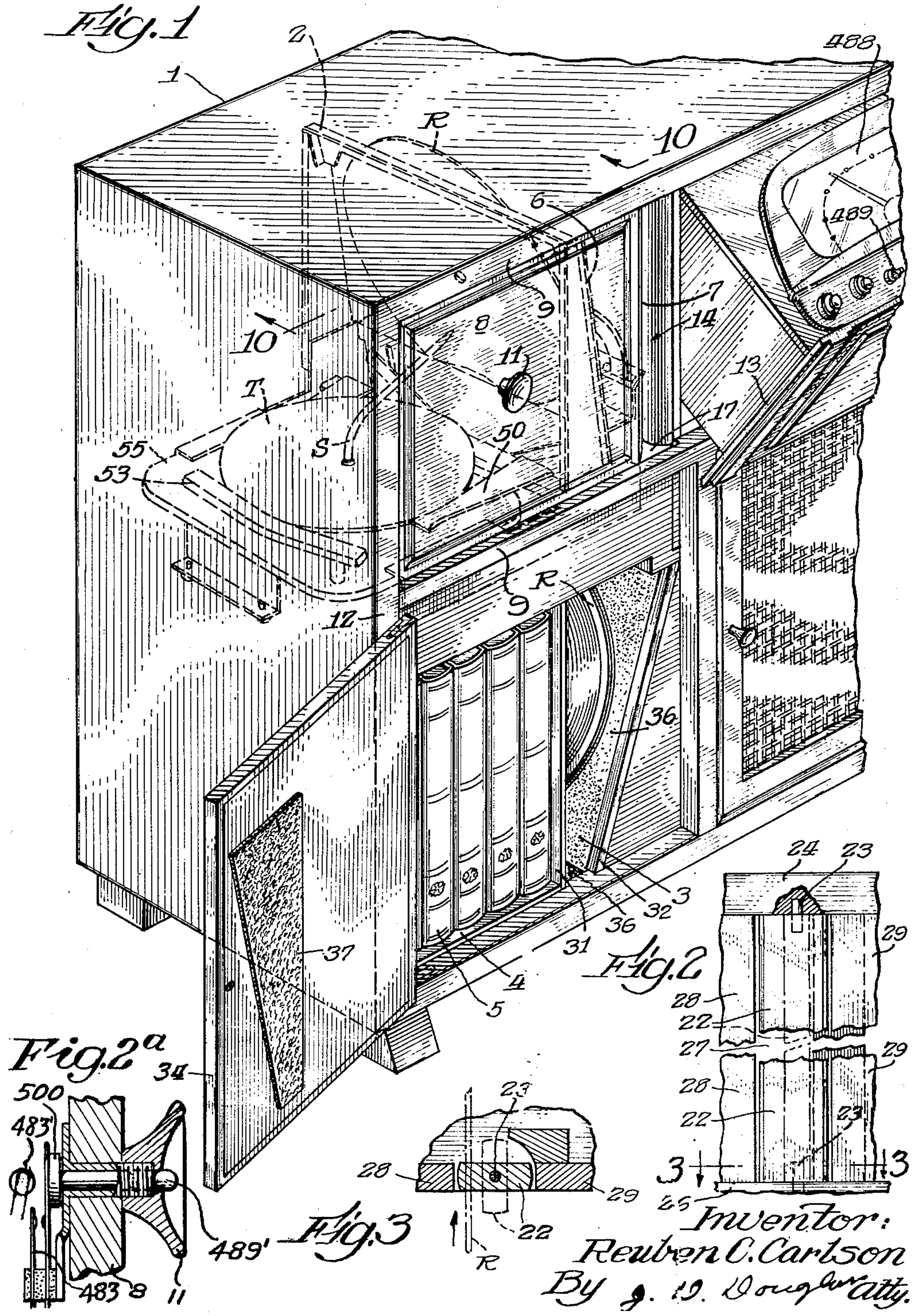
Fig. 1 is a fragmentary perspective view of a radio phonograph console style of cabinet in conjunction with which the invention is incorporated.
Fig. 2 is a fragmentary view, in elevation, showing an alternative construction for providing a closable slot in a cabinet.
Figures 4, 5, 6, 7, 8, 9:
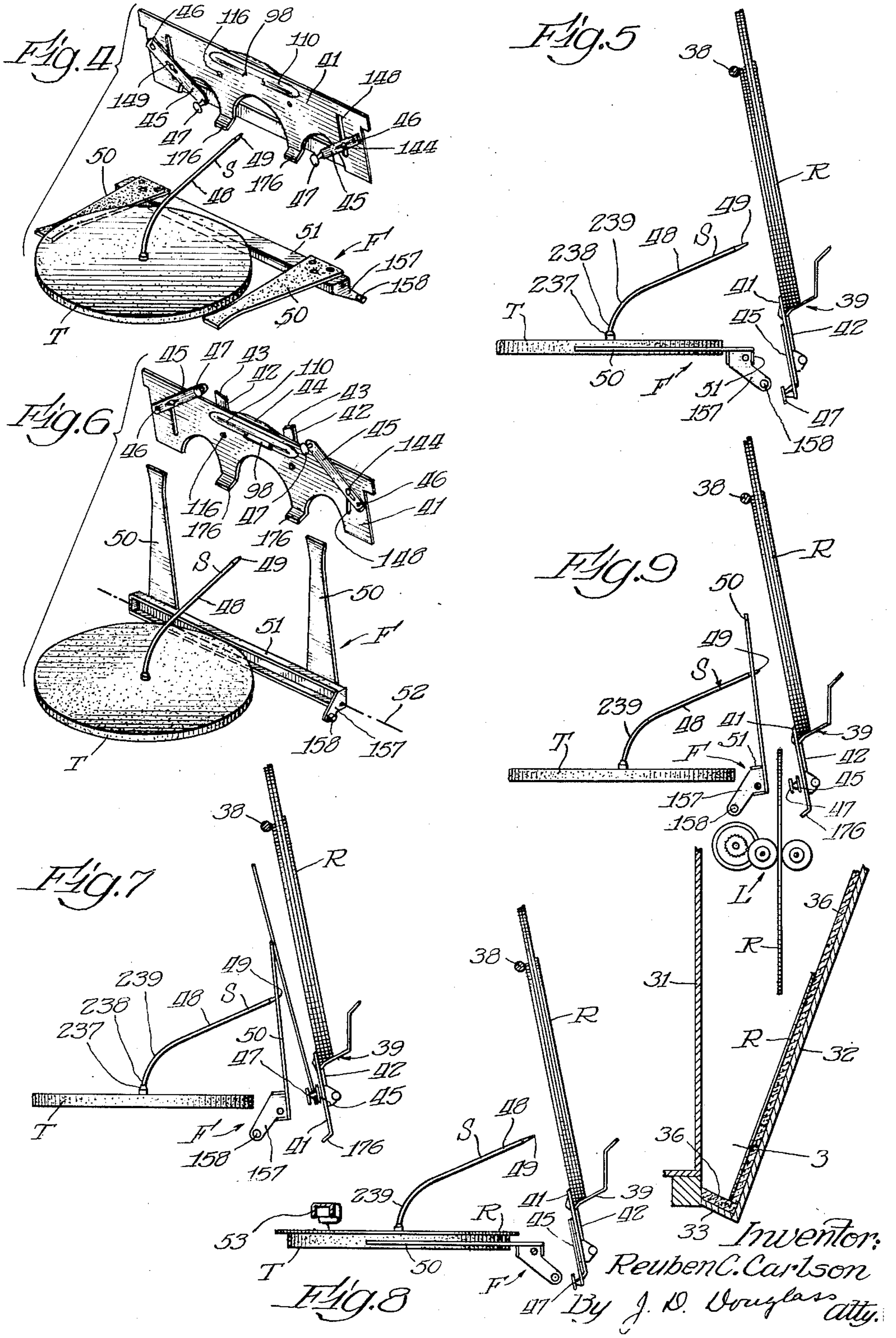
Figure 10:
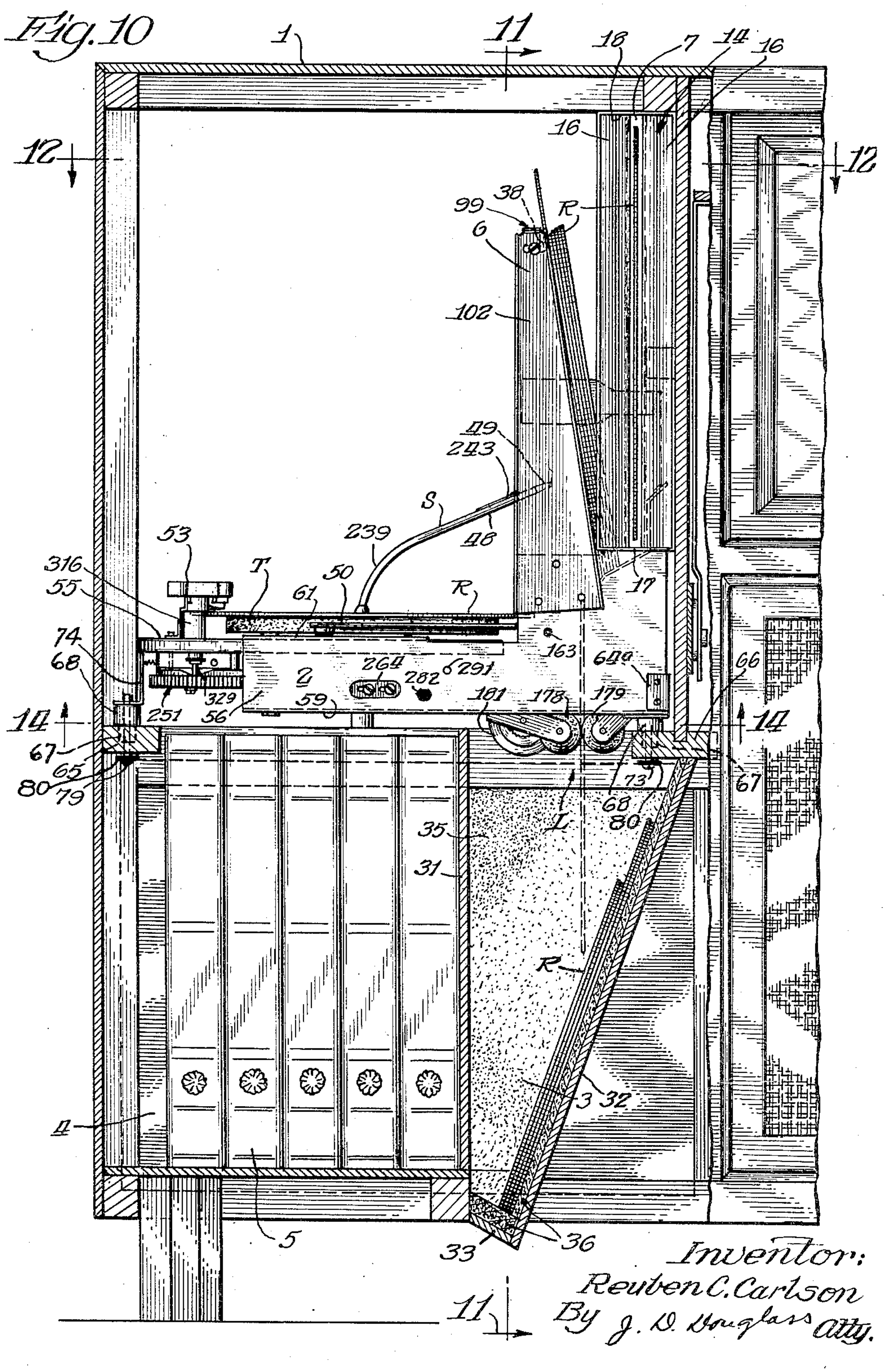
Figure 11:
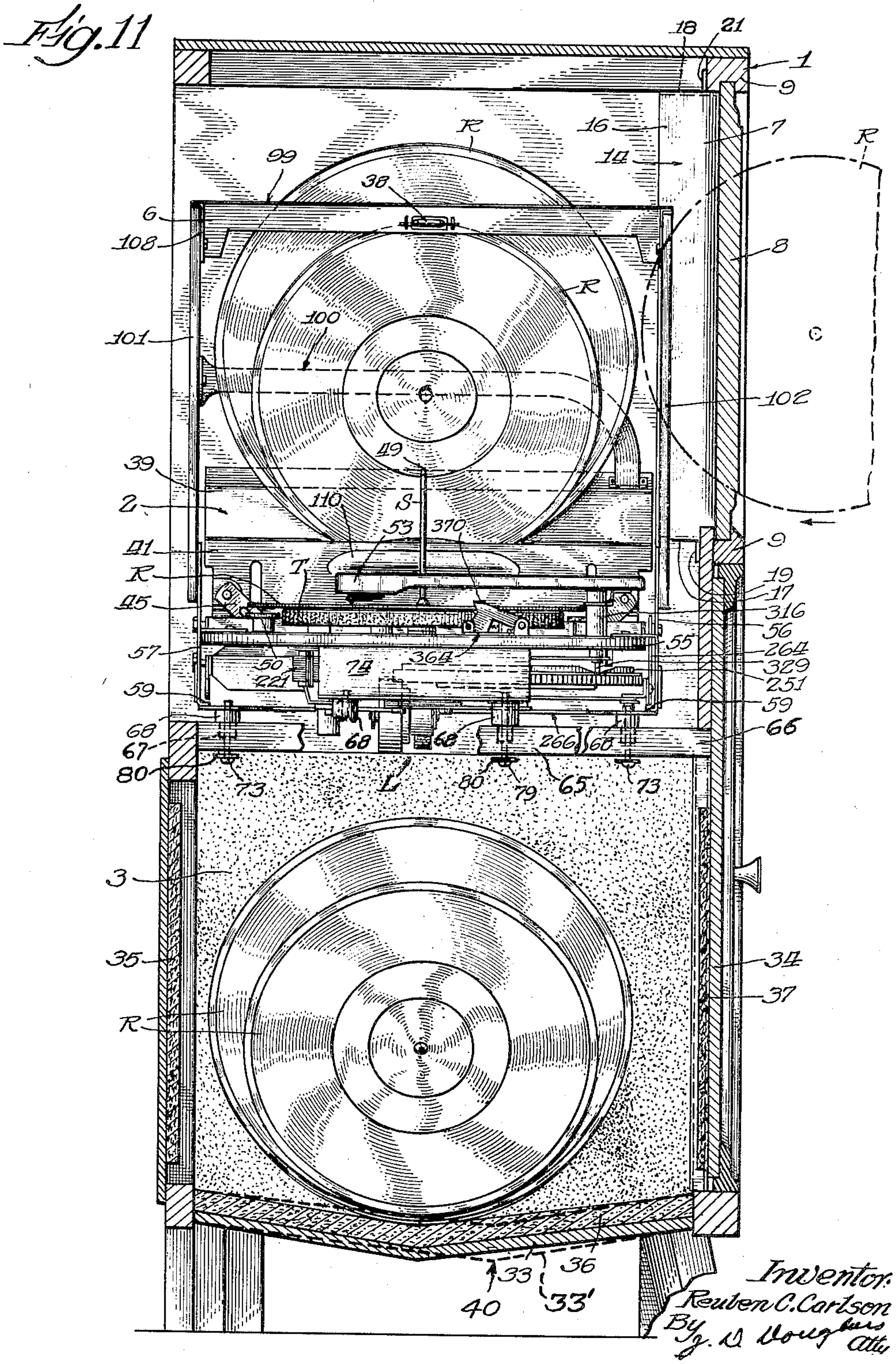
Figure 12:
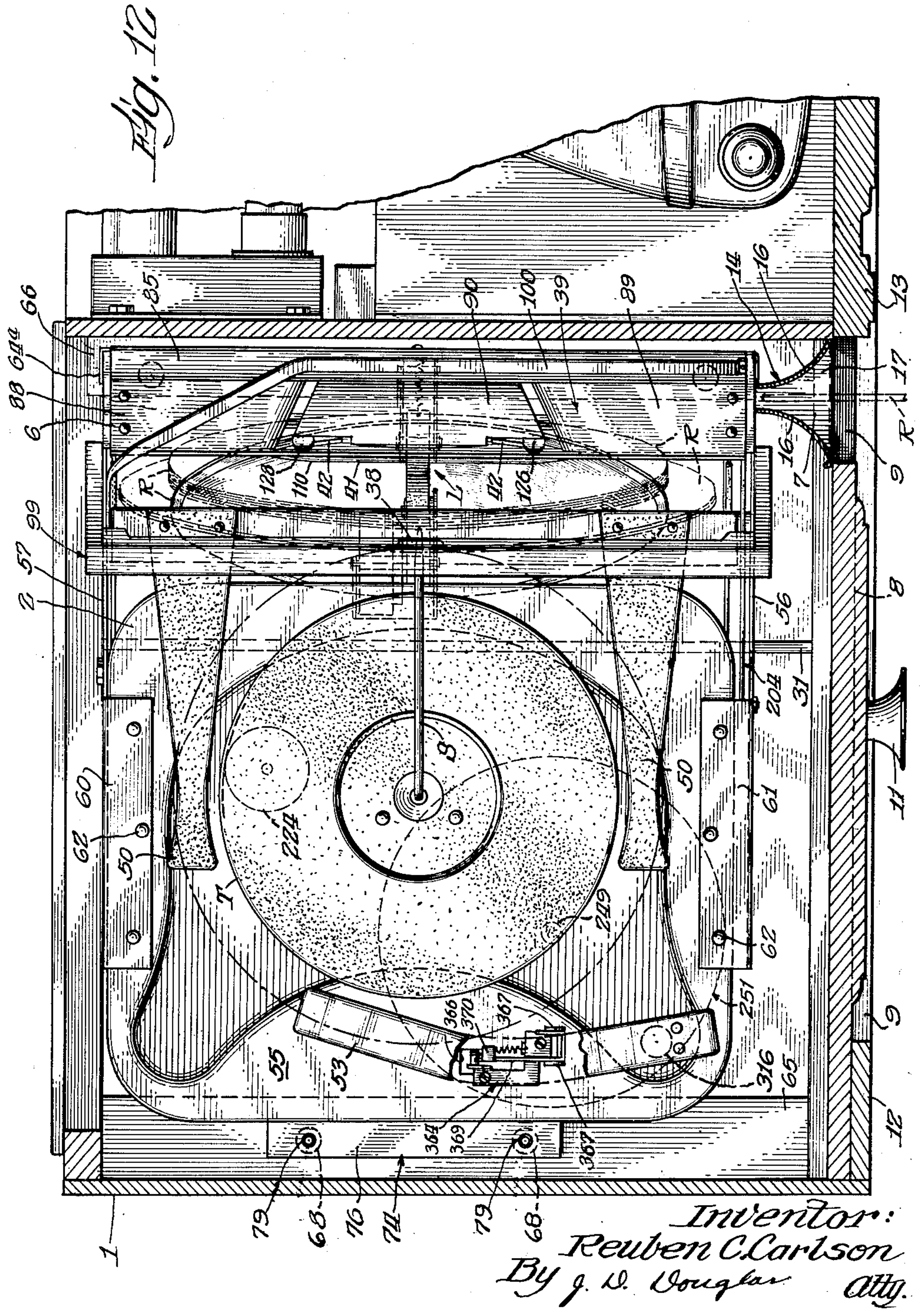
Figure 69:
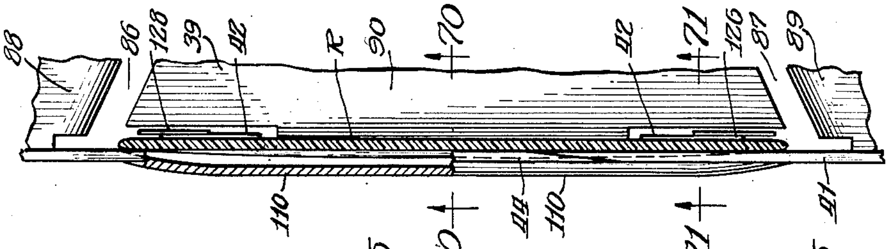
Figure 13:
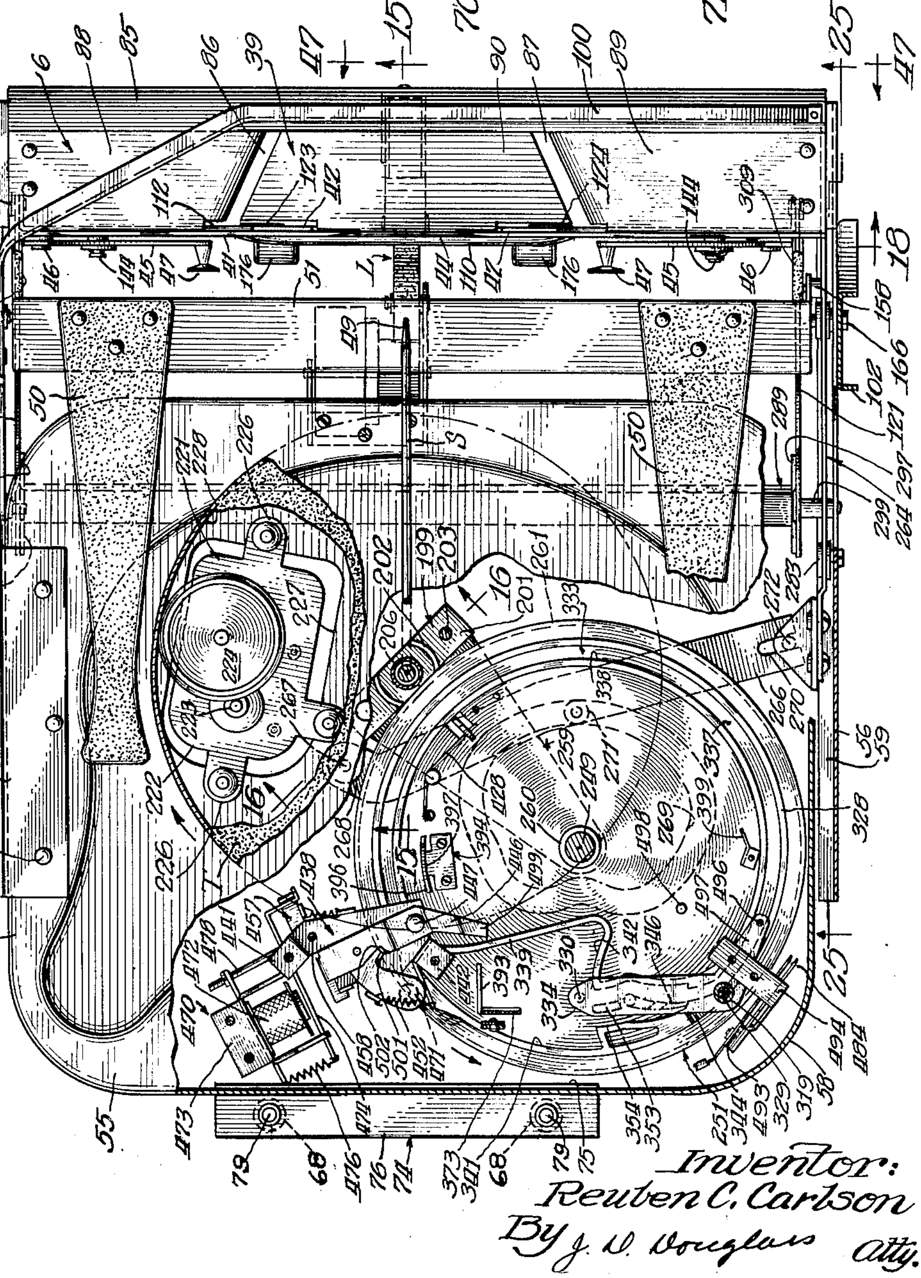
Figures 14, 70, 71:
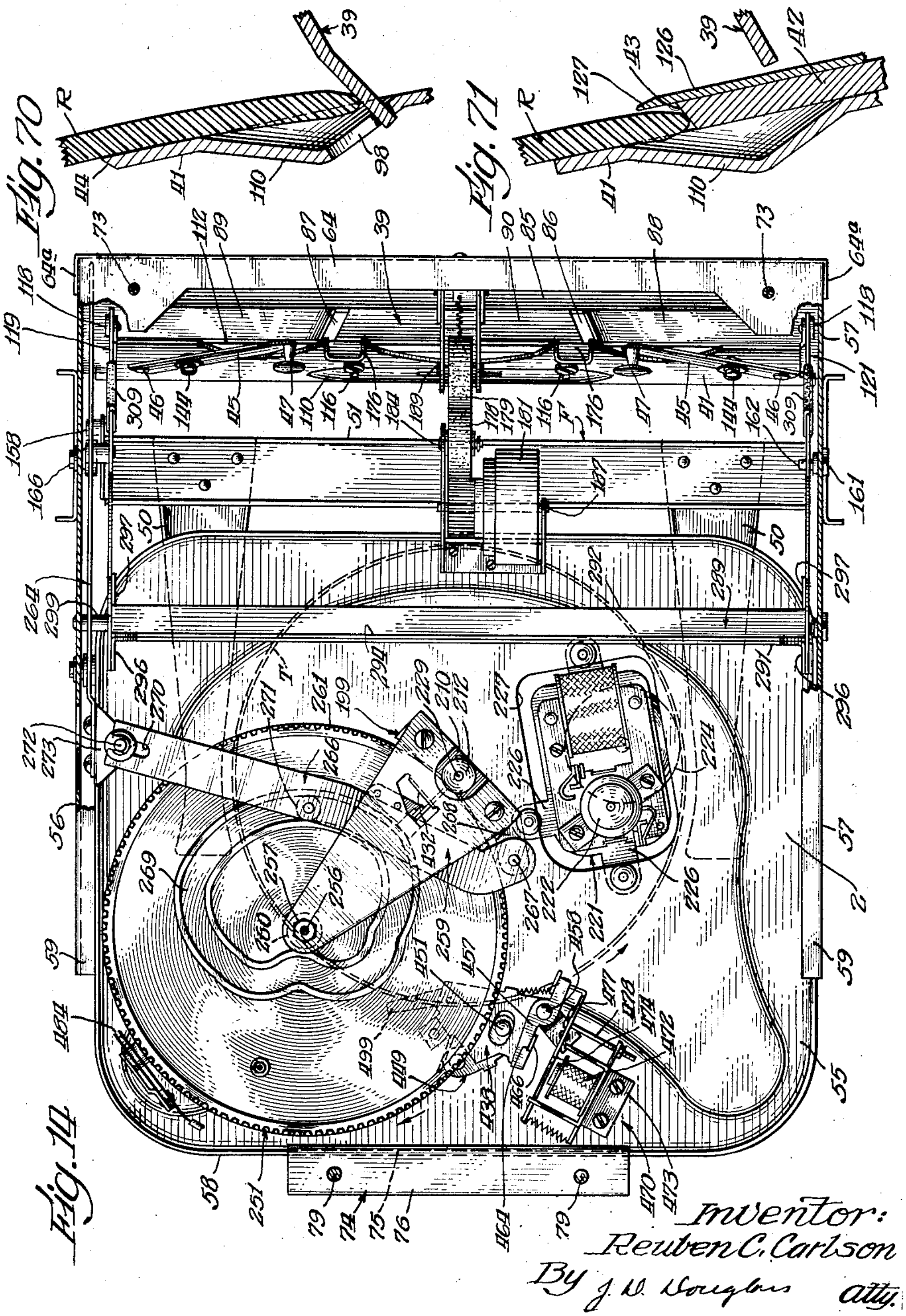
Figures 15, 16, 17:
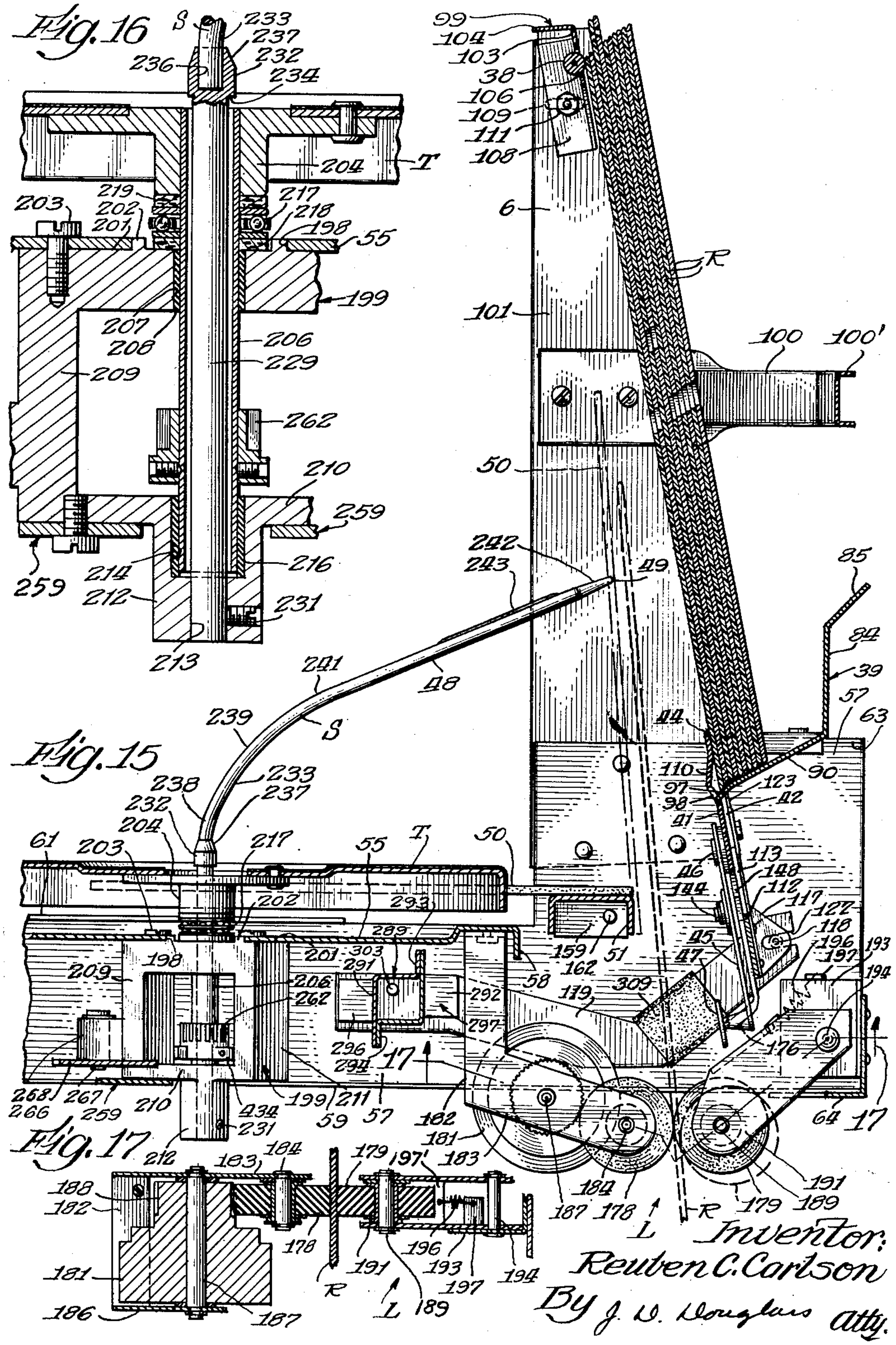
Figures 18, 19, 20, 21, 22:
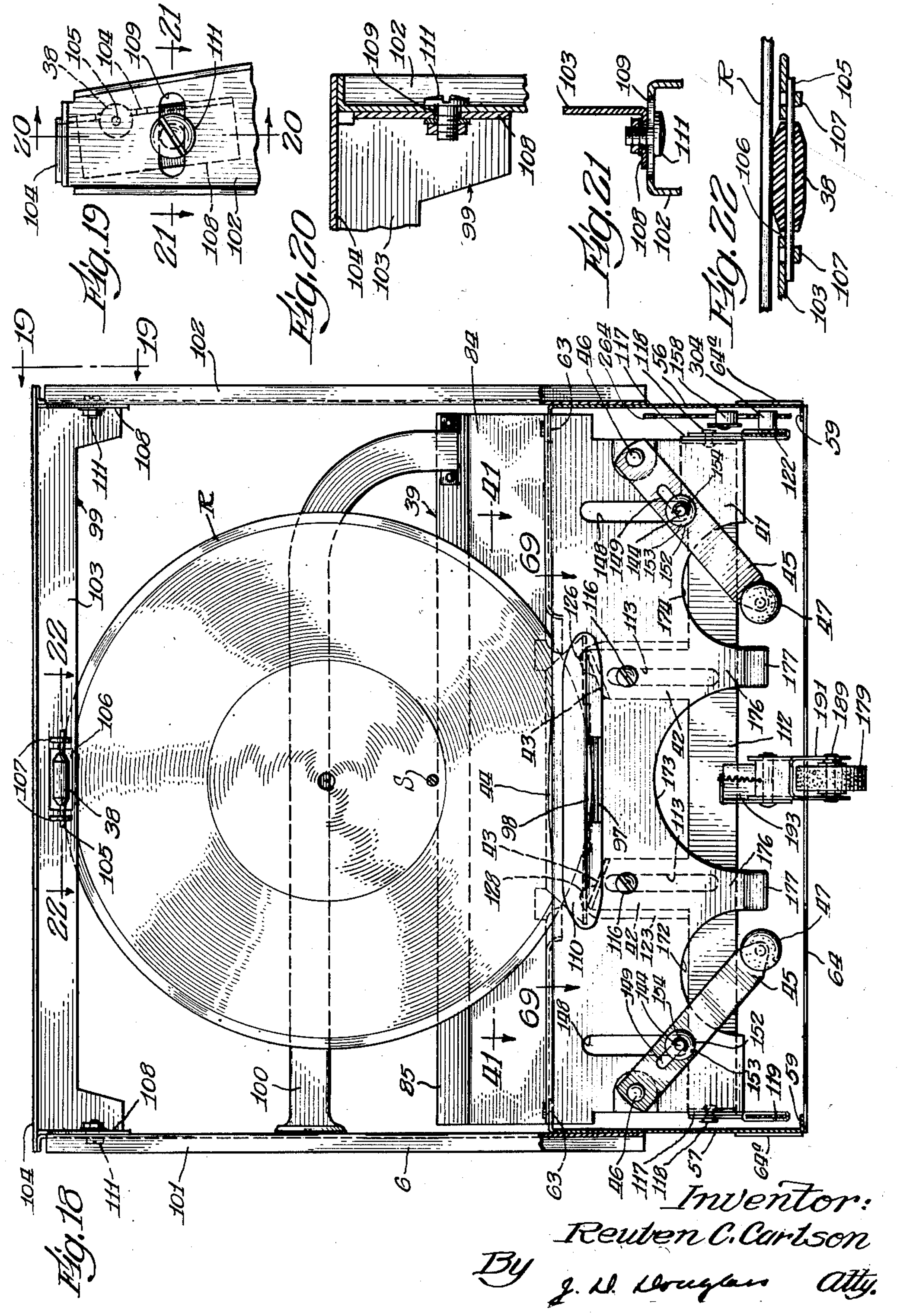
Figures 23, 86:
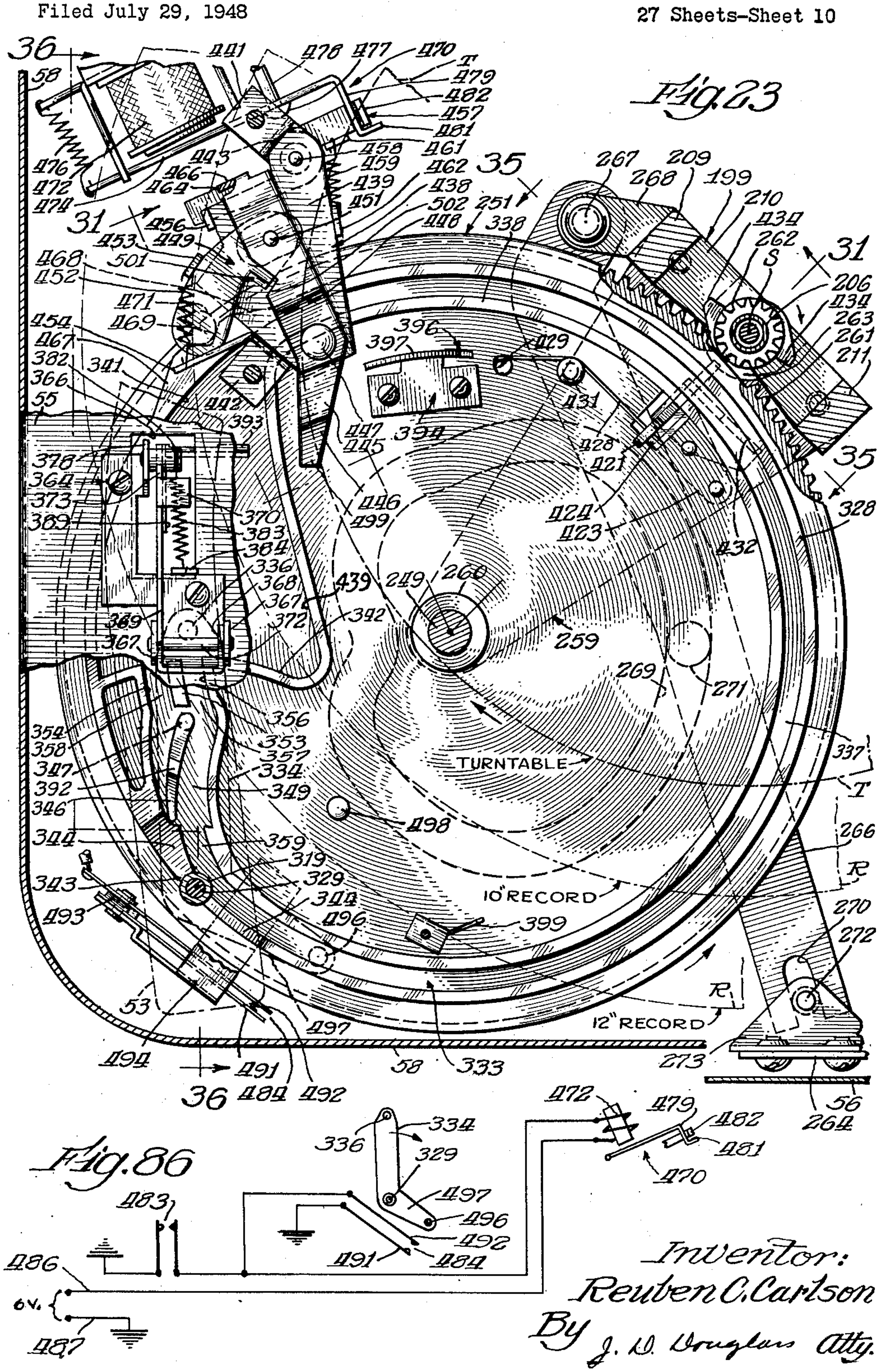
Figure 24:
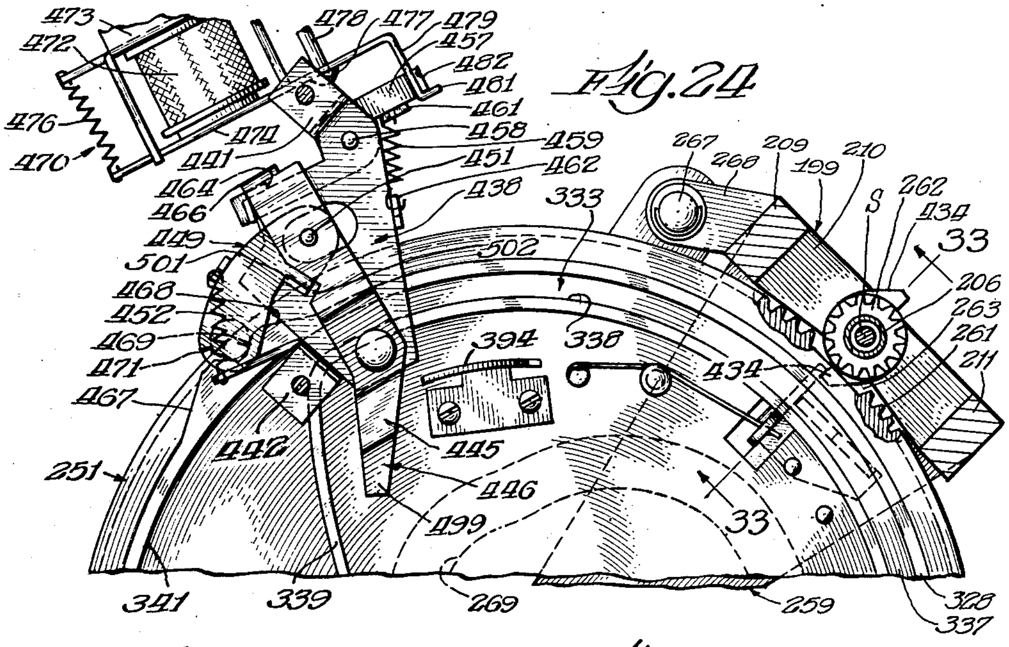
Figures 87, 88:
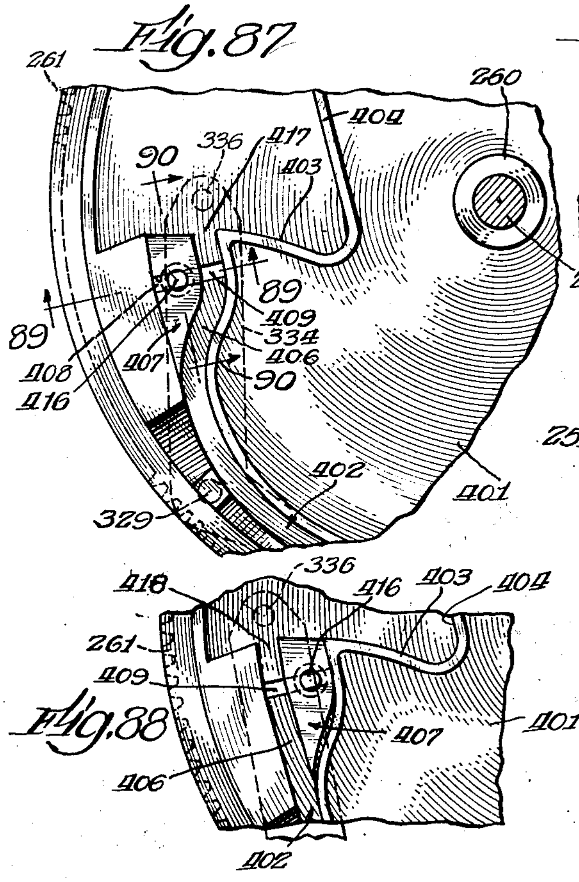
Figure 89:
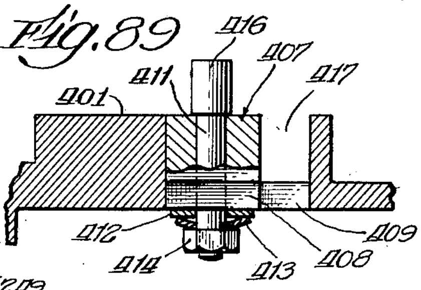
Figure 90:
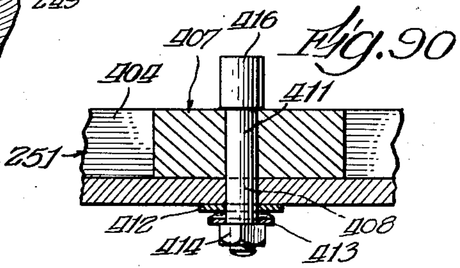
Figure 91:
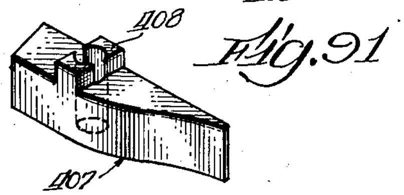
Figures 25, 66, 67:
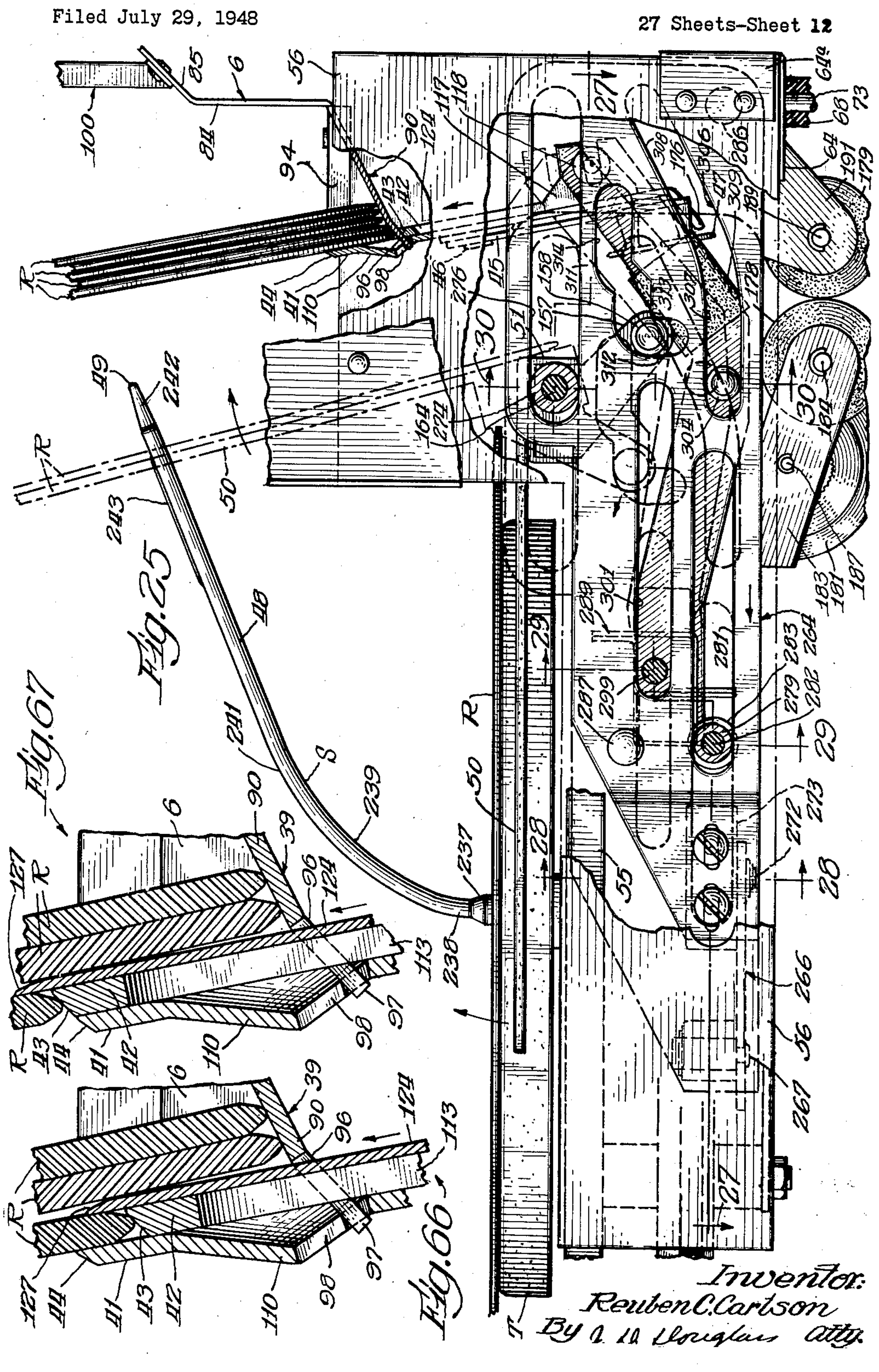
Figures 26, 65, 68:
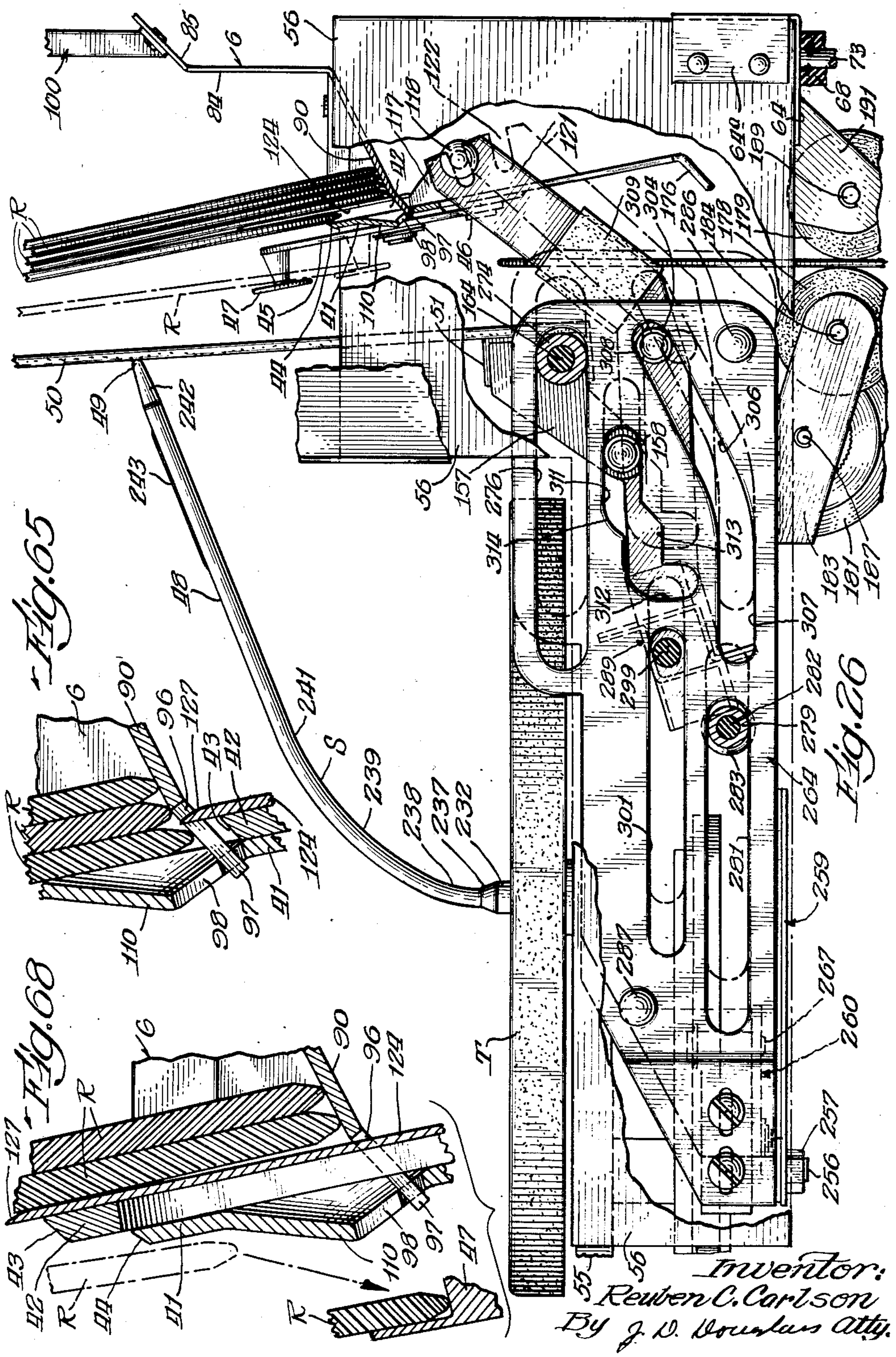
Figure 31:
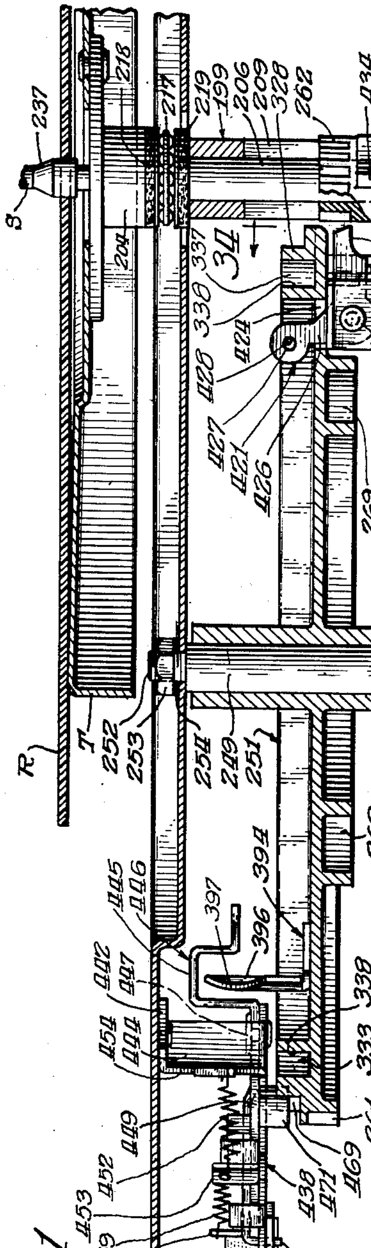
Figures 32, 33, 34, 35:
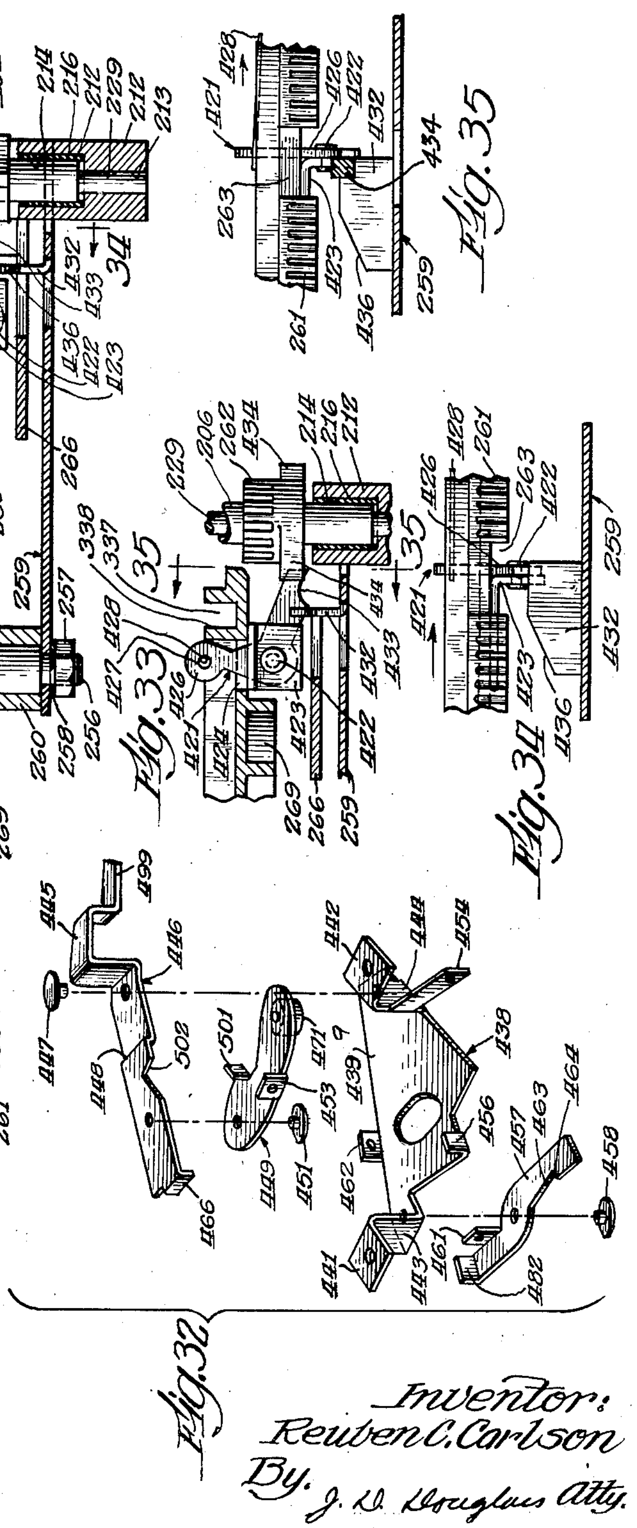
Figure 36:
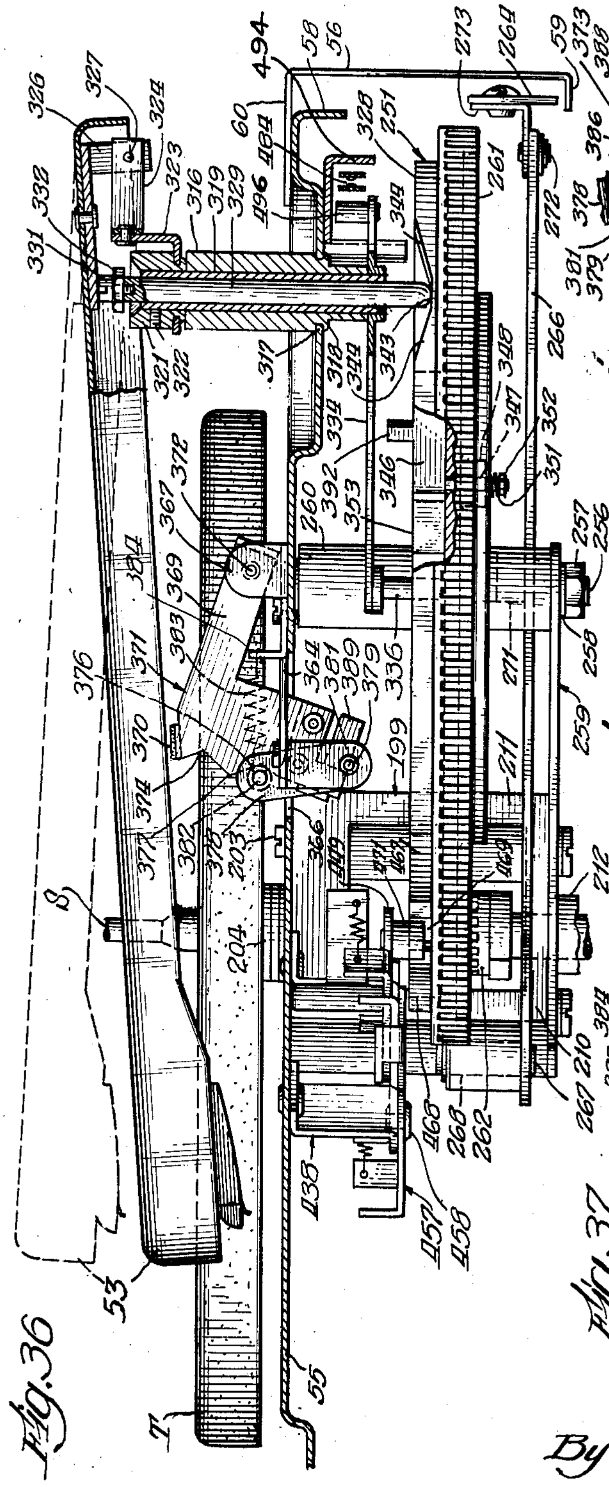
Figures 37, 38, 39, 40:
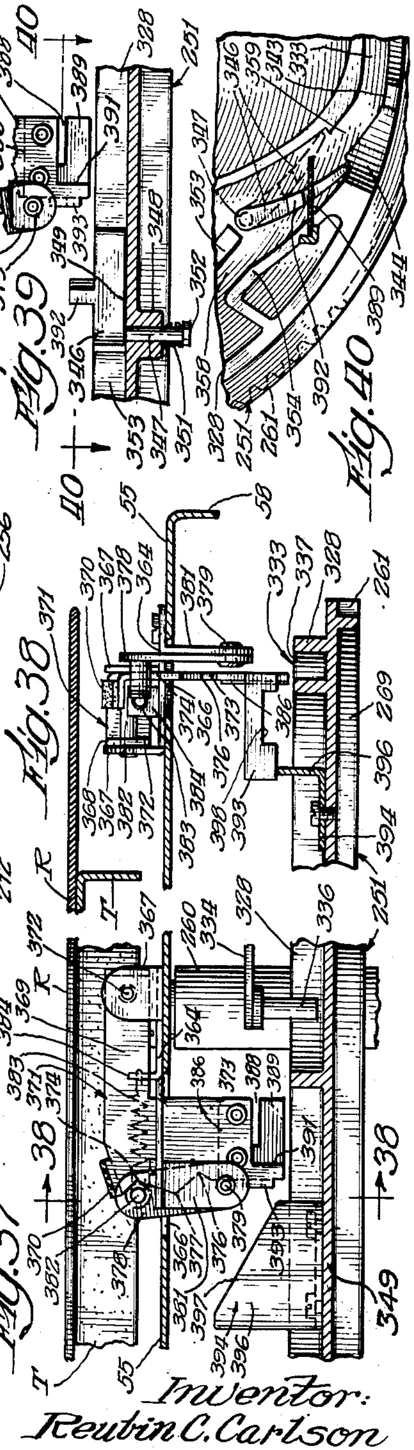
Figures 41, 42, 43, 44, 45, 46:
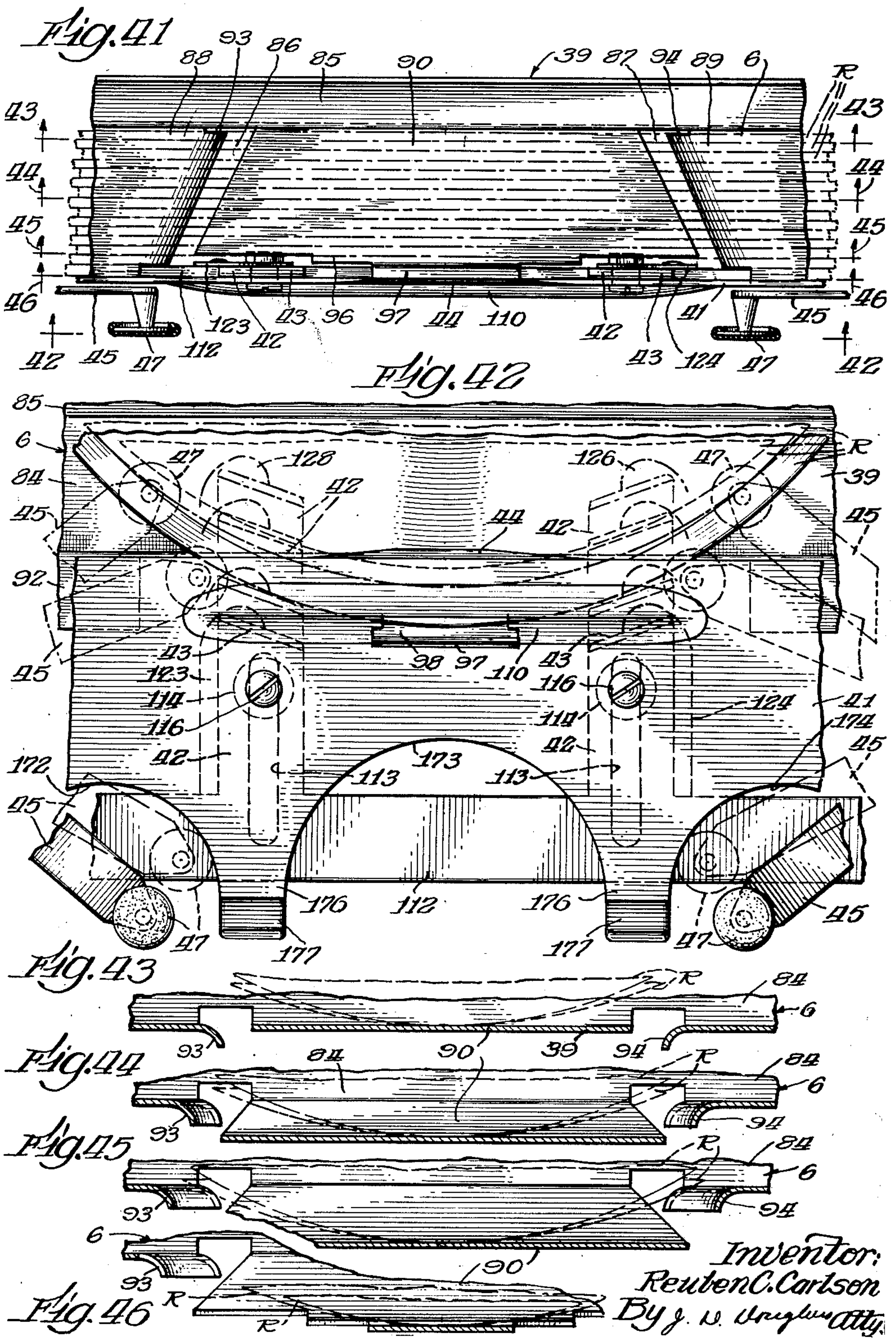
Figures 47, 48, 49, 50, 51, 52:
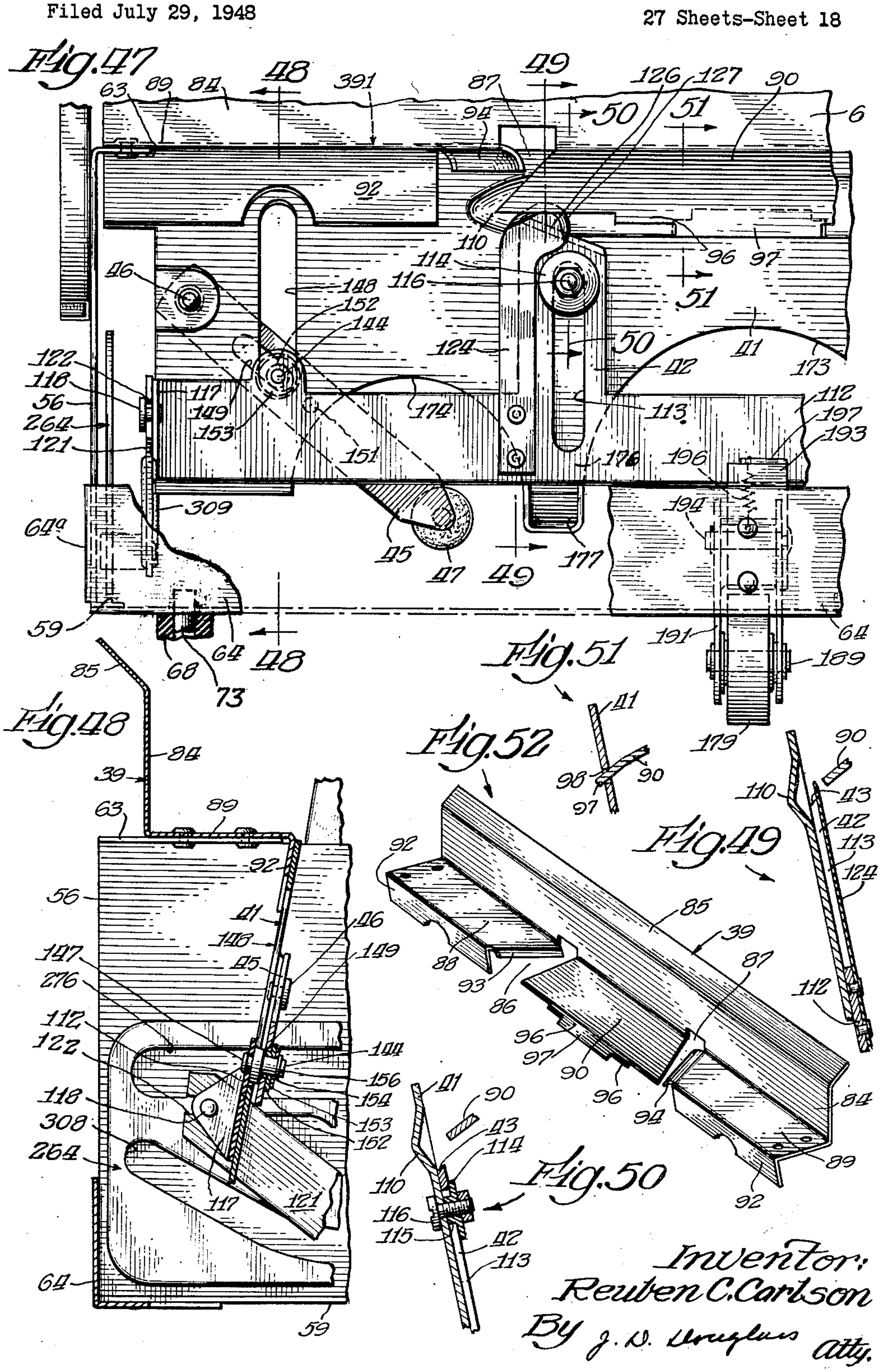
Figures 53, 54, 55, 56:
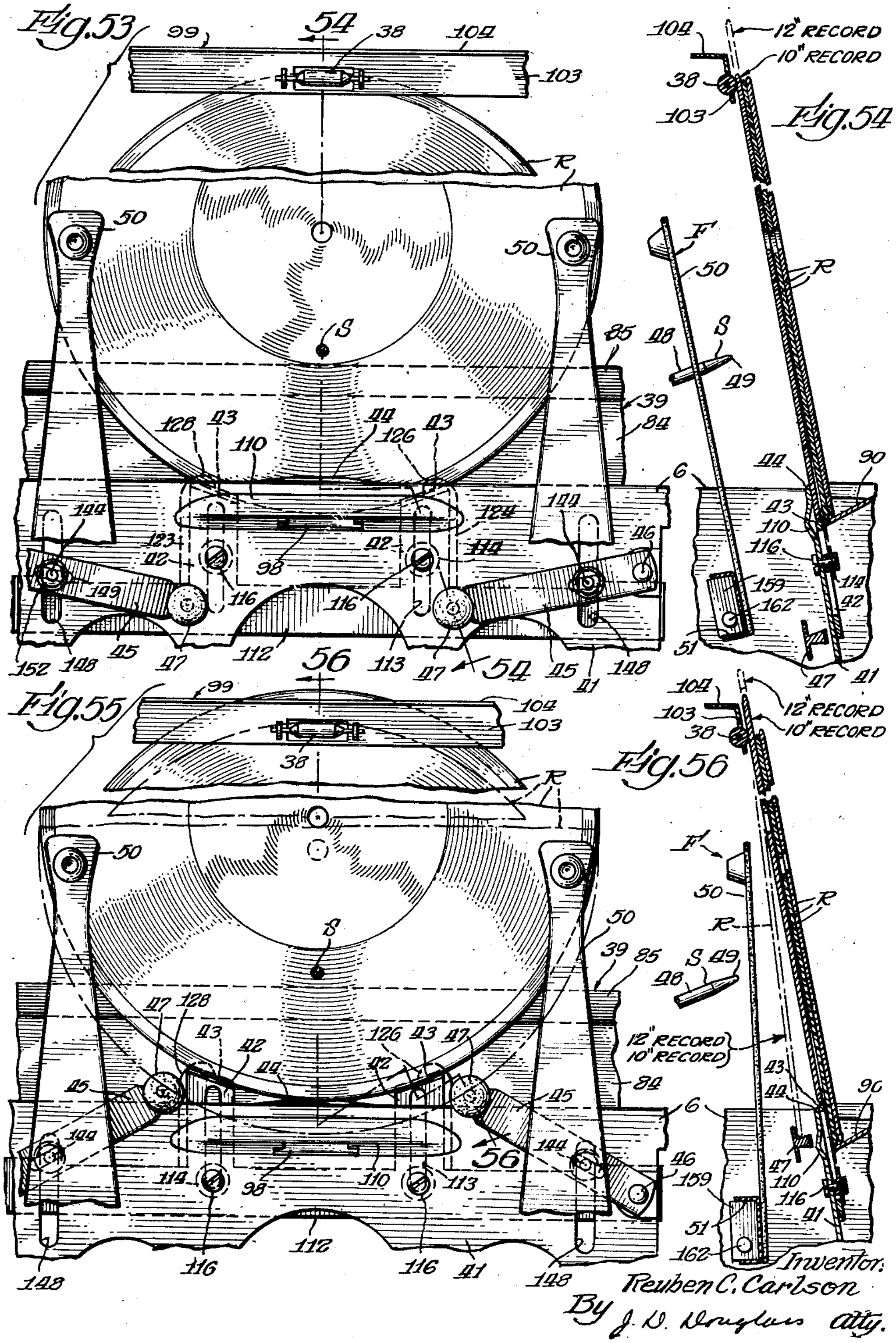
Figures 57, 58, 59, 60:
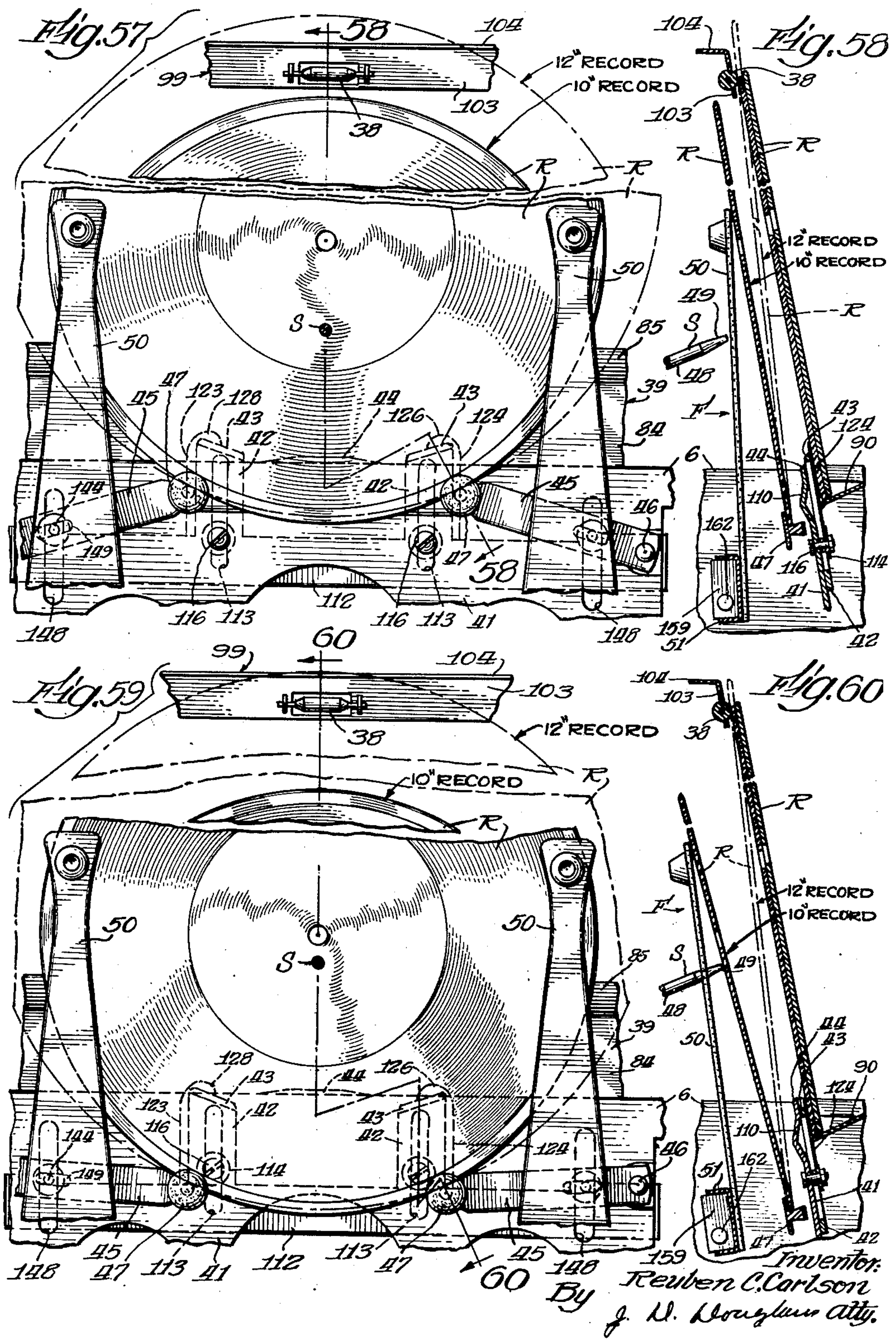
Figures 61, 62, 63, 64:
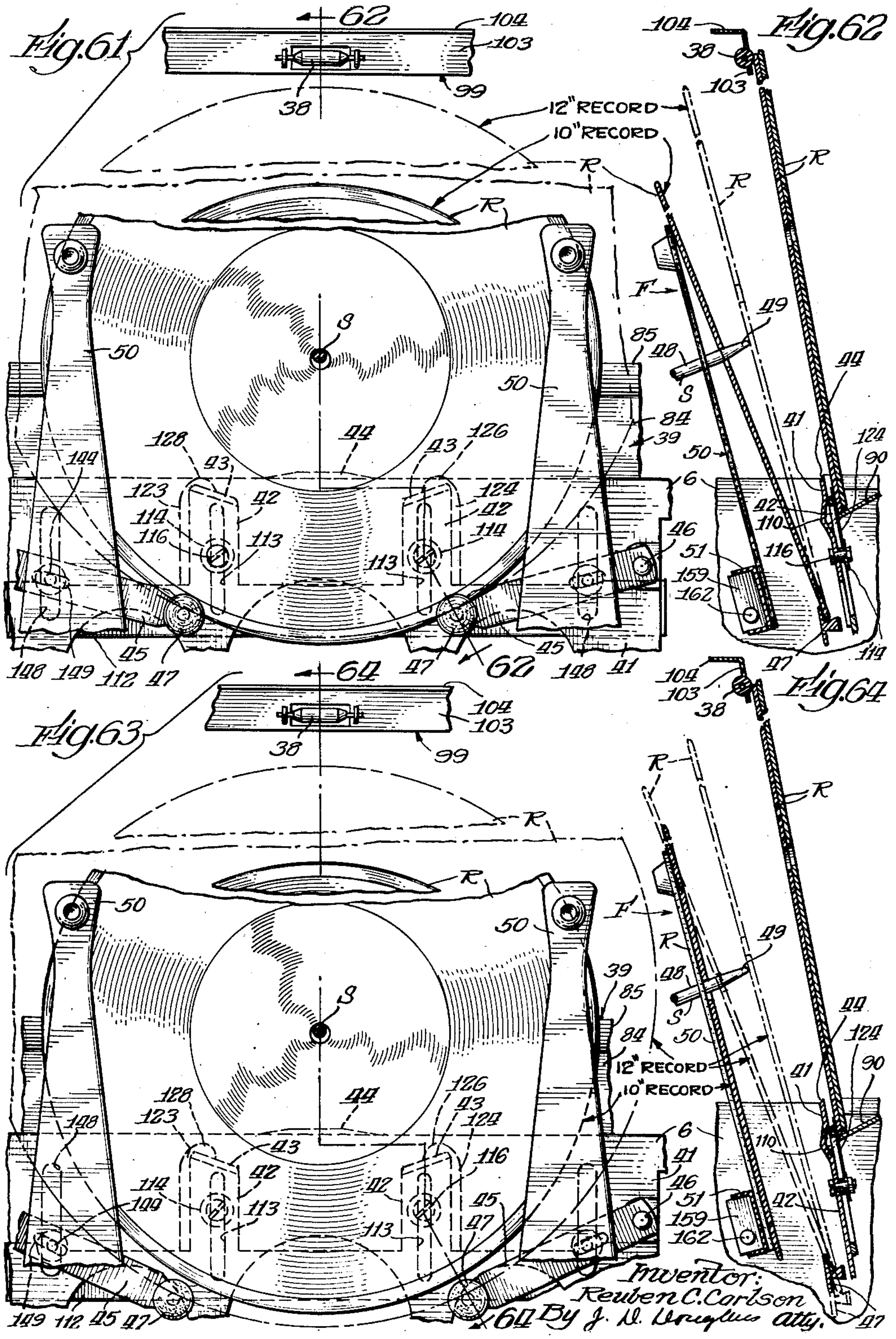
Figures 72, 73, 76, 77, 78, 79, 80:
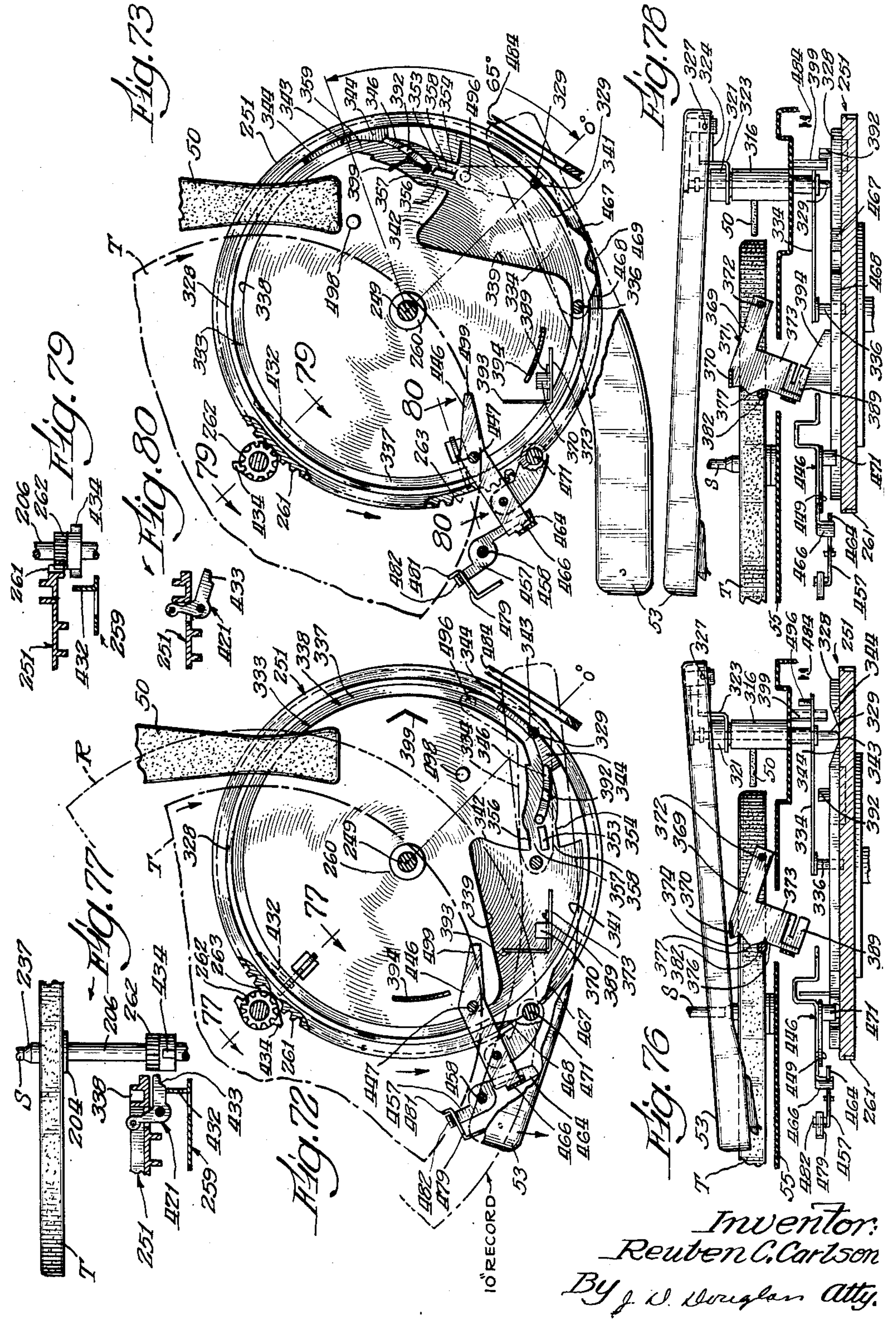
Figures 74, 75, 81, 82:
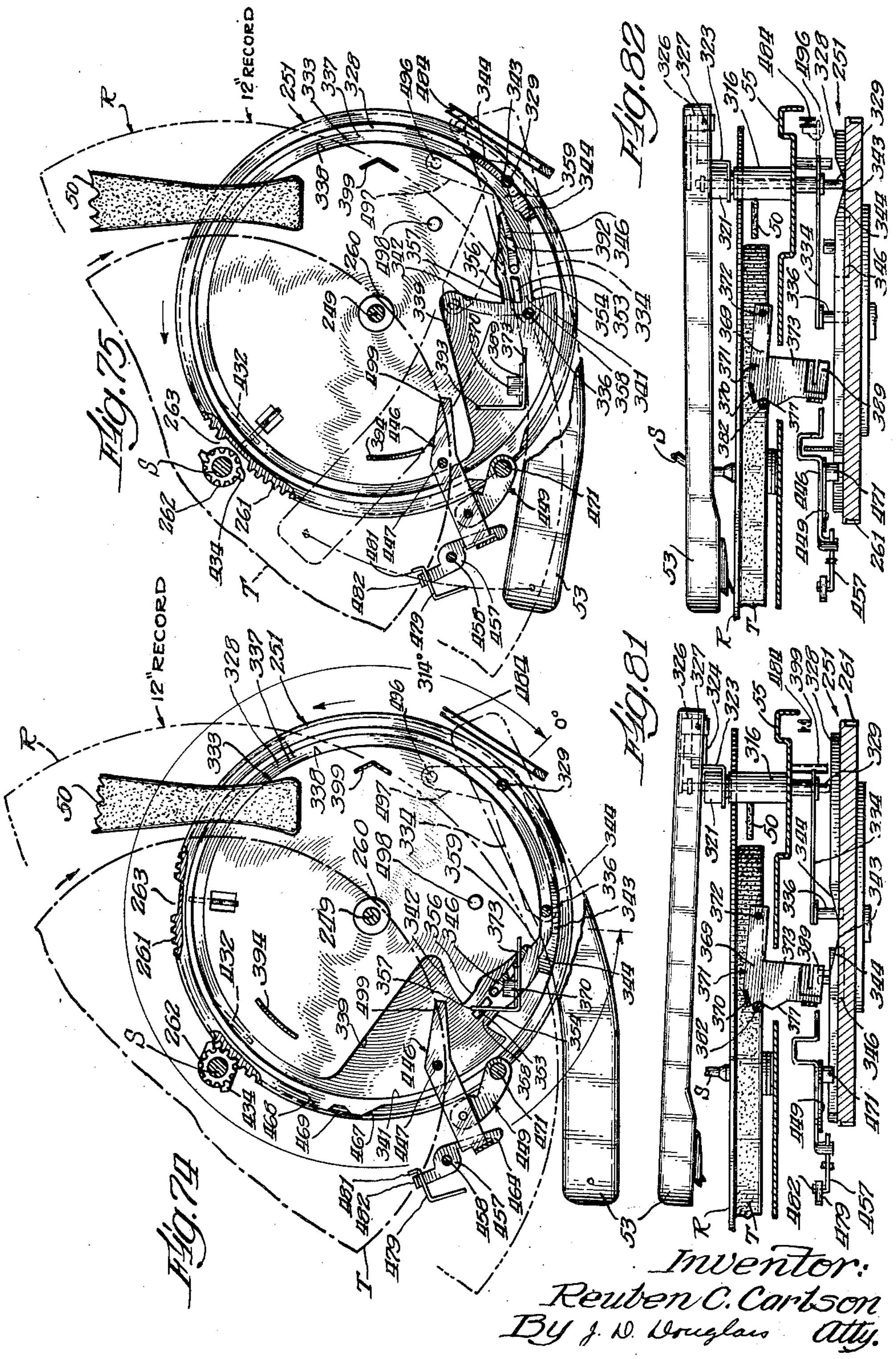
Figures 83, 84, 85:
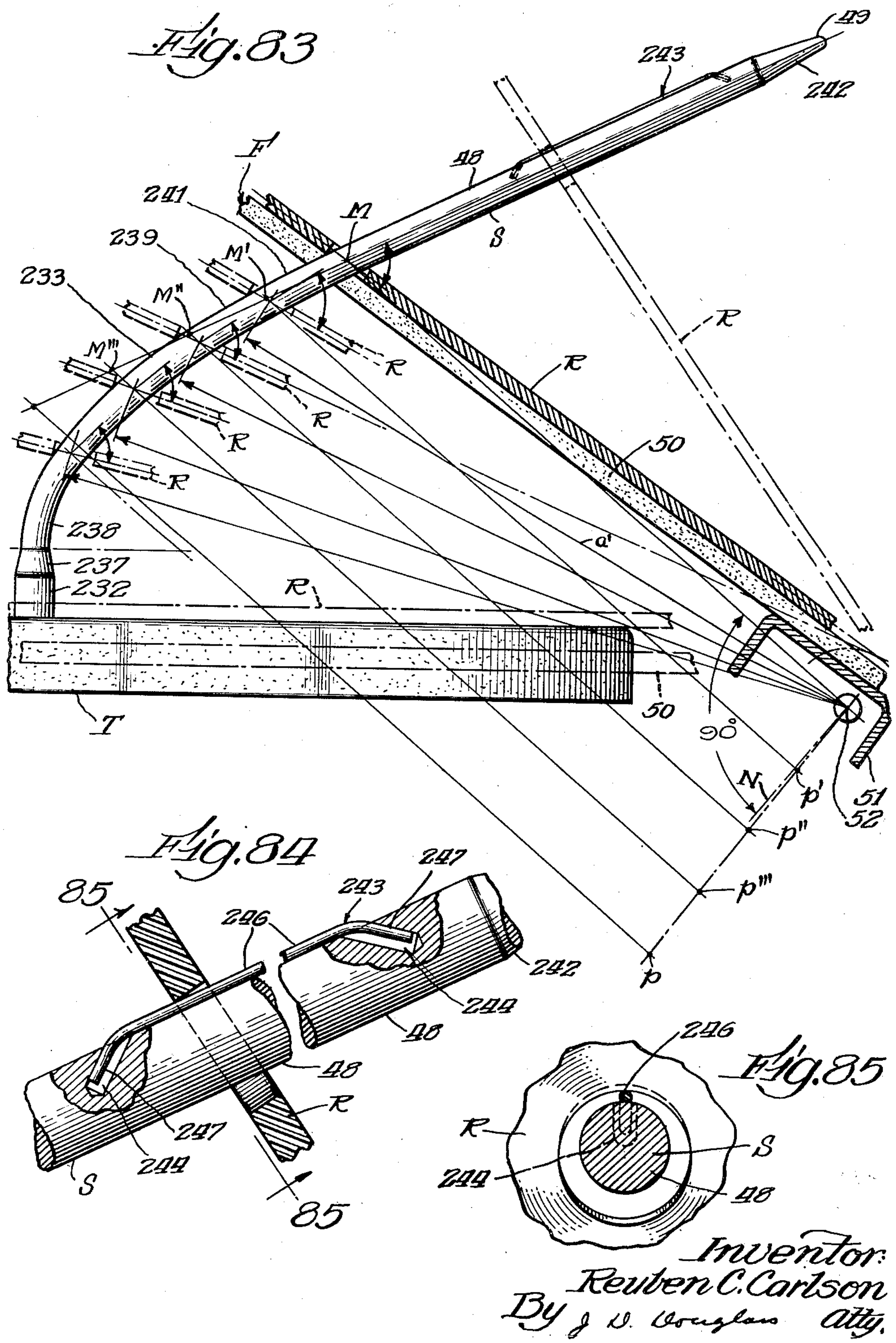
Figures 92, 93, 94, 95, 96, 97:
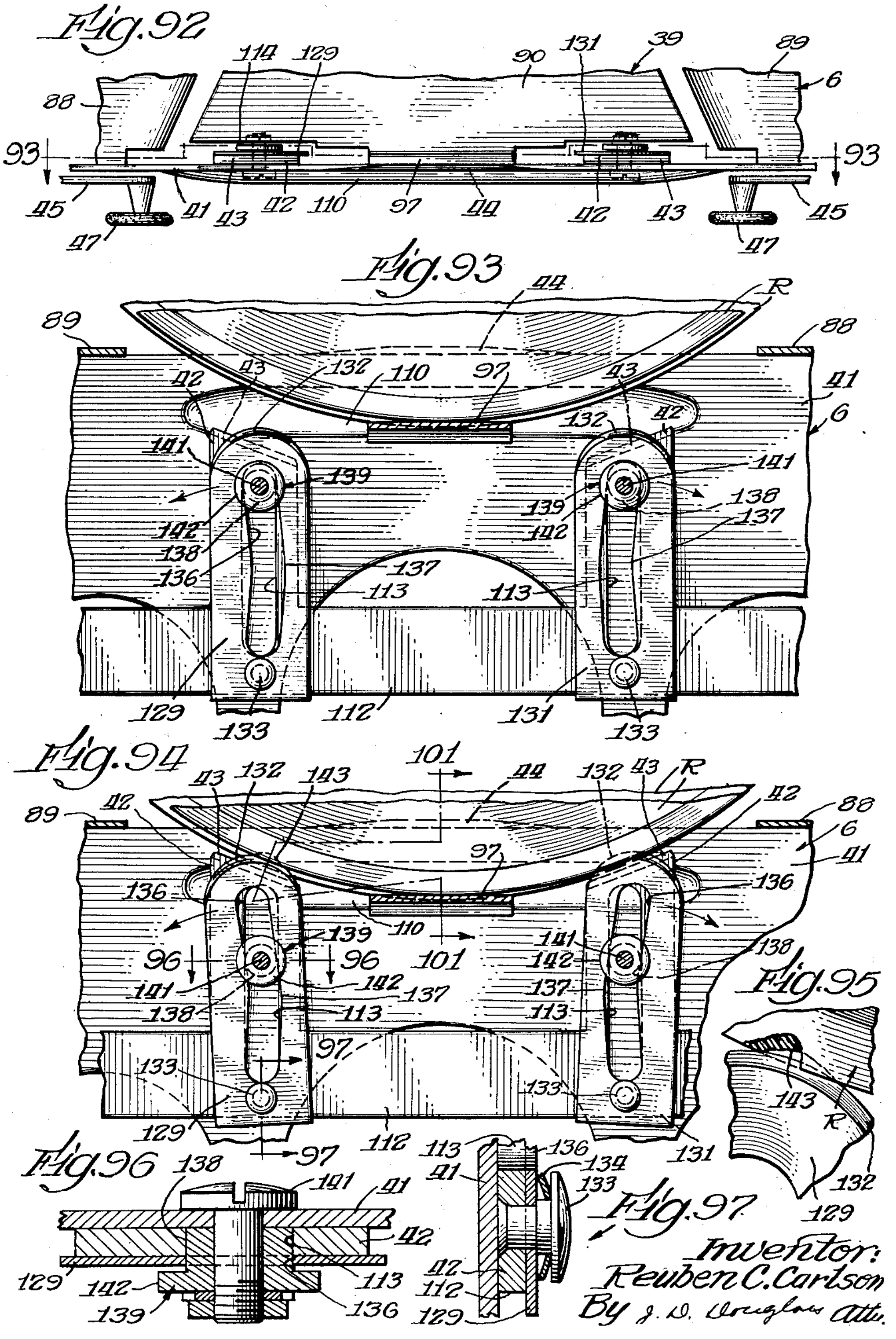
Figures 98, 99, 100, 101, 102, 103, 104, 105:
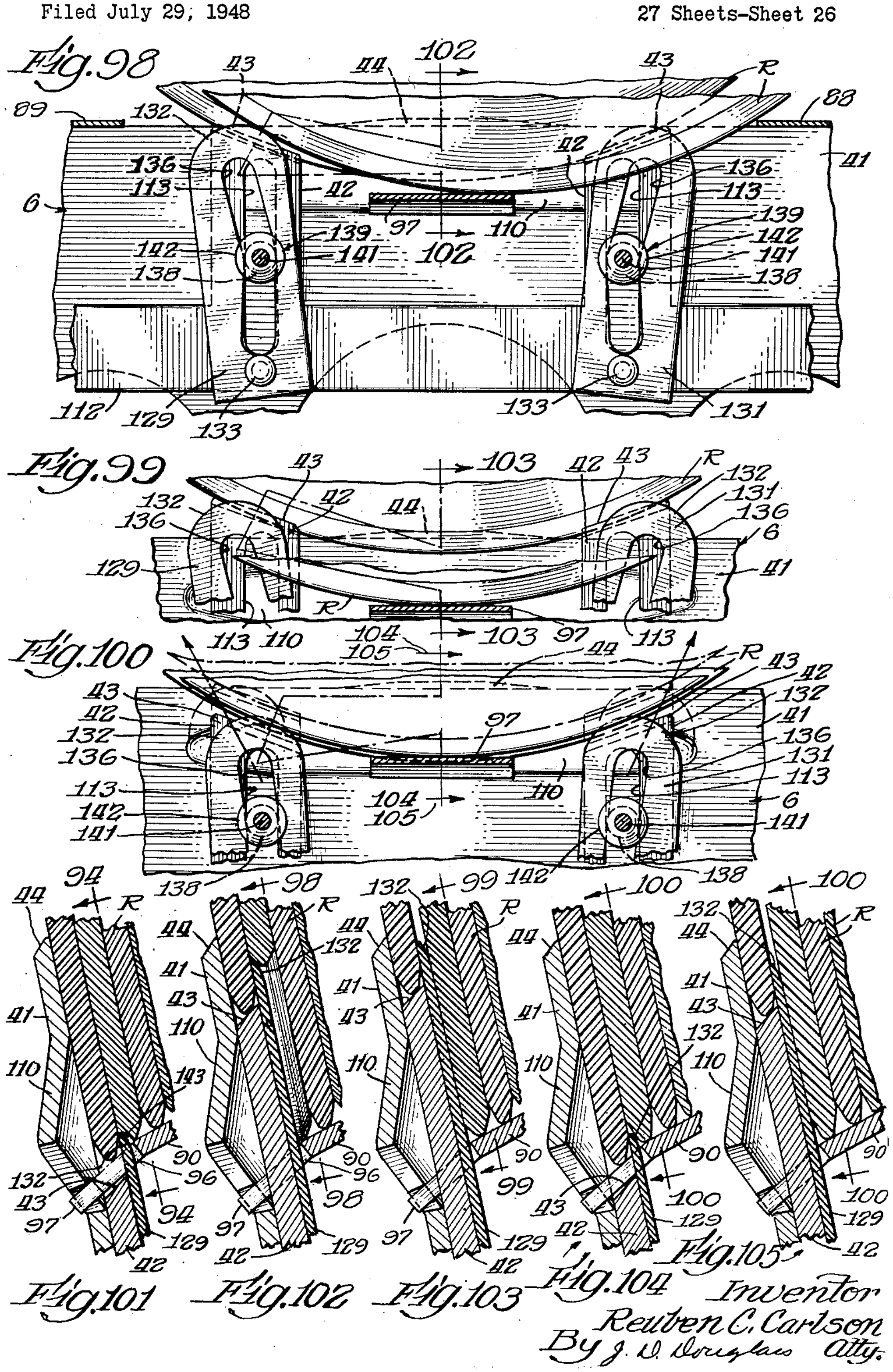
Figures 106, 107, 108, 109:
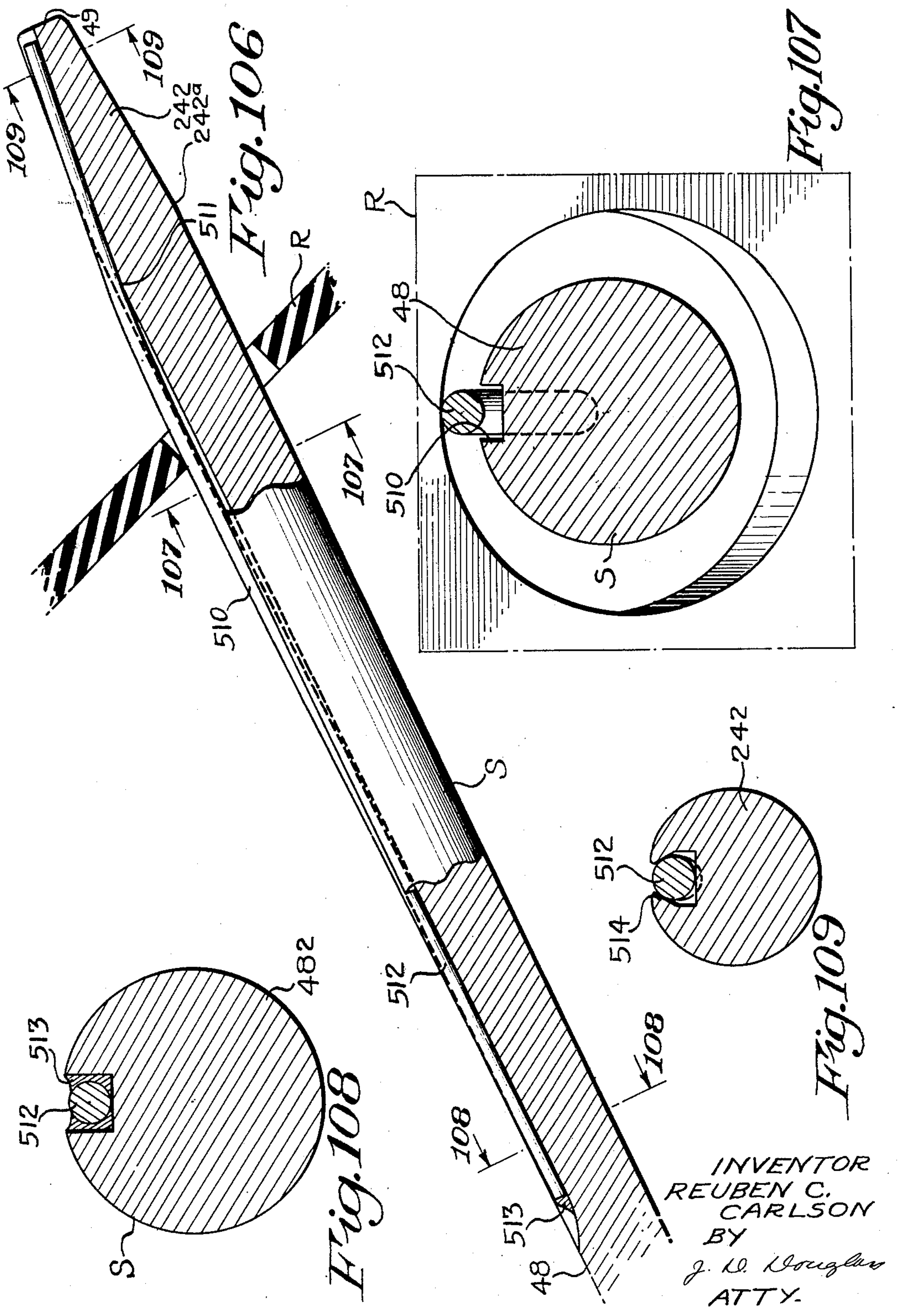

Fig. 2*a* is a detail fragmentary view of a record reject control button as combined in a knob;

Fig. 3 is a transverse section taken on line 3—3 of Fig. 2;

Fig. 4 is a diagrammatic view to indicate the structure of specific elements of the record player, in perspective, some of the elements being arbitrarily removed and displaced in a vertical direction from the remaining elements, for the sake of clarity;

Fig. 5 is a side elevational view which includes the parts indicated in Fig. 4, said parts being associated substantially as they ordinarily are associated;

Fig. 6 is another view of the elements indicated in Fig. 4, the same being in one of the positions they occupy when a record is being removed from the magazine;

Fig. 7 is another view of the elements as shown in Fig. 5, the elements occupying the position they occupy as a record is being removed from the magazine;

Fig. 8 is a view of the mechanism shown in Fig. 7 in the position it occupies after a record has been transferred from the magazine to the turntable;

Fig. 9 is a view which includes mechanism indicated in Fig. 8 to illustrate the status of the mechanism as a record is being conveyed from the turntable to the played record compartment;

Fig. 10 is vertical section taken substantially on line 10—10 of Fig. 1;

Fig. 11 is a vertical section on line 11—11 of Fig. 10;

Fig. 12 is a transverse section on line 12—12 of Fig. 10 showing, in top plan, the record player having the pickup arm shown partly broken away to reveal other parts;

Fig. 13 is an enlarged top plan view of the mechanism indicated in Fig. 12, the same being shown as disassociated from the cabinet and having structural elements thereof broken away to reveal other parts;

Fig. 14 is a bottom plan view of the record player mechanism shown in Fig. 13;

Fig. 15 is a vertical section on line 15—15 of Fig. 13;

Fig. 16 is a vertical section, drawn to a larger scale, on line 16—16 of Fig. 13;

Fig. 17 is a transverse section on line 17—17 of Fig. 15;

Fig. 18 is substantially vertical section on line 18—18 of Fig. 13;

Fig. 19 is a fragmentary view, in elevation, as indicated by line 19—19 of Fig. 18;

Fig. 20 is a vertical section taken on line 20—20 of Fig. 19;

Fig. 21 is a transverse section on line 21—21 of Fig. 19;

Fig. 22 is a transverse section on line 22—22 of Fig. 18;

Fig. 23 is an enlarged fragmentary top plan view of the mechanism indicated in Fig. 13, some of the parts being in another position;

Fig. 24 is a fragmentary view of parts indicated in Fig. 23, some of which are in additional positions of operation;

Fig. 25 is a vertical section on line 25—25 of Fig. 13;

Fig. 26 is a vertical side elevation of the mechanism shown in Fig. 25, parts being broken away to reveal the structure of underlying parts;

Fig. 27 is a transverse section on line 27—27 of Fig. 25;

Fig. 28 is a vertical section on line 28—28 of Fig. 25;

Fig. 29 is a vertical section on line 29—29 of Fig. 25;

Fig. 30 is a vertical section on line 30—30 of Fig. 25;

Fig. 31 is a vertical section on line 31—31 of Fig. 23;

Fig. 32 is an exploded view of details of the trigger mechanism for starting rotation of the cam gear;

Fig. 33 is a fragmentary view of parts indicated in Fig. 31, the figure showing the pawl in another position;

Fig. 34 is a vertical sectional view as indicated by line 34—34 of Fig. 31;

Fig. 35 is a similar view on line 35—35 of Fig. 33;

Fig. 36 is a vertical sectional view taken substantially on line 36—36 of Fig. 23;

Fig. 37 is a view of mechanism shown in Fig. 36 including parts which are moved to a different position of adjustment;

Fig. 38 is a vertical section on line 38—38 of Fig. 37;

Fig. 39 is a fragmentary view, partly in section and partly in elevation, of the structure shown in Fig. 36;

Fig. 40 is a transverse section taken on line 40—40 of Fig. 39, the cam wheel having been rotated counterclockwise substantially from its Fig. 39 position;

Fig. 41 is a fragmentary transverse section taken on line 41—41 of Fig. 18;

Fig. 42 is a fragmentary vertical section on line 42—42 of Fig. 41;

Figs. 43, 44, 45 and 46 are substantially vertical sections on lines 43—43, 44—44, 45—45 and 46—46 respectively, of Fig. 41;

Fig. 47 is a vertical, fragmentary view showing structural features of the magazine and record ejector mechanism as viewed on line 47—47 of Fig. 13;

Fig. 48 is a fragmentary, vertical section taken on line 48—48 of Fig. 47;

Fig. 49 is a fragmentary vertical section taken on line 49—49 of Fig. 47;

Fig. 50 is a fragmentary vertical section on line 50—50 of Fig. 47;

Fig. 51 is a fragmentary vertical section on line 51—51 of Fig. 47;

Fig. 52 is a perspective view of the record support when disassociated from the rest of the magazine;

Figs. 53, 55, 57, 59, 61 and 63 are fragmentary views, in elevation, to show parts including those indicated in Fig. 42 in comparison with which this series of views is drawn to a reduced scale to indicate the steps in removing a record from the magazine;

Figs. 54, 56, 58, 60, 62 and 64 are fragmentary vertical sections each of which bears the same relationship to the figure along side of it as Fig. 54 does to Fig. 53, Fig. 54 being a section on line 54—54 of Fig. 53;

Figs. 65, 66, 67 and 68 are fragmentary vertical sections, on an enlarged scale, of that portion of the magazine revealed by breaking the same away in Fig. 26, the four views being at the junction of the tongue and side member and each of the views being to illustrate various steps in the dislodgment of a record from a group of the same in the magazine;

Fig. 69 is a fragmentary transverse section substantially on line 69—69 of Fig. 18;

Figs. 70 and 71 are sections corresponding to Fig. 65 to 68 on lines 70—70 and 71—71 respectively of Fig. 69, to show the provision made for handling a deformed record;

Figs. 72, 73, 74 and 75 are diagrammatic views, in top plan, of parts including those shown in Fig. 36 to indicate different steps in manipulation of the pickup arm;

Fig. 76 is a view, partly in side elevation and partly in section, to further illustrate the relationship of the parts to each other when they are in the positions they occupy in Fig. 72;

Fig. 77 is a section on line 77—77 of Fig. 72;

Fig. 78 is a view, partly in side elevation and partly in section, to further illustrate the relationship of the parts to each other when they are in the positions they occupy in Fig. 73;

Fig. 79 is a vertical section taken on line 79—79 of Fig. 73;

Fig. 80 is sectional view of parts, including those illustrated in Fig. 77, the view being indicated as taken on line 80—80 of Fig. 73;

Fig. 81 is a view, partly in side elevation and partly in section, to further illustrate the relationship of the parts to each other when in the position they occupy in Fig. 74;

Fig. 82 is also a view partly in side elevation and partly in section, to further illustrate the relationship of the parts to each other when in the position they occupy in Fig. 75;

Fig. 83 is a side elevational view of an alternative form of spindle;

Fig. 84 is a fragmentary enlarged view, in side elevation, of a portion of the spindle shown in Fig. 83, the spindle being broken away to indicate the mode of attachment of an additional part to the spindle;

Fig. 85 is a section, taken transversely of the spindle, on line 85—85 of Fig. 84;

Fig. 86 is an electrical circuit diagram to illustrate the means employed for either manually or automatically starting a record changing cycle;

Fig. 87 is a top plan view of an alternative construction of track switch, the same corresponding to the track switch illustrated in Fig. 40;

Fig. 88 is another view of the track switch shown in Fig. 87, the same being in a different position as when the machine is in readiness for playing a record differing from the size that the adjustment of Fig. 87 is adapted to accommodate;

Fig. 89 is a vertical section taken on line 89—89 of Fig. 87;

Fig. 90 is a vertical section on line 90—90 of Fig. 87;

Fig. 91 is a view, in perspective, showing the track switch in inverted position as compared to the point from which it is viewed in Figs. 87 and 88;

Fig. 92 is a fragmentary top plan view of the ejector mechanism illustrated in Fig. 93, the same being an alternative form of construction;

Fig. 93 is a fragmentary vertical section taken on line 93—93 of Fig. 92;

Fig. 94 is a fragmentary section on line 94—94 of Fig. 101 wherein a notched record adjacent the end record engaged by the safety fingers, is being lifted with the ejector fingers;

Fig. 95 is a fragmentary view to show how a nick in a record engages one of the safety blades;

Fig. 96 is a fragmentary transverse section on line 96—96 of Fig. 94;

Fig. 97 is a fragmentary vertical section on line 97—97 of Fig. 94;

Fig. 98 is a fragmentary vertical section on line 98—98 of Fig. 102;

Fig. 99 is a fragmentary vertical section on line 99—99 of Fig. 103;

Fig. 100 is a fragmentary vertical section on line 100—100 of Fig. 104;

Fig. 101 is a fragmentary, vertical, irregular section on line 101 of Fig. 94;

Fig. 102 is a fragmentary, vertical section on line 102—102 of Fig. 98;

Fig. 103 is a fragmentary, vertical section on line 103—103 of Fig. 99;

Fig. 104 is a fragmentary, vertical section on line 104—104 of Fig. 100;

Fig. 105 is a fragmentary, vertical section on line 105—105 of Fig. 100;

Fig. 106 is an enlarged fragmentary view similar to that of Fig. 84 of a modified form of spindle;

Fig. 107 is an enlarged section taken on the line 107—107 of Fig. 106; and

Figs. 108 and 109 are similar sections taken on the lines 108—108 and 109—109 respectively.

In Fig. 1, wherein for the purpose of illustration, is shown one embodiment of the invention, the reference character 1 is used to denote a cabinet, in its entirety, commonly known to the trade as a console. At the left of the cabinet the space afforded therein is devoted to a phonograph record player while radio apparatus may be housed in the right hand side thereof. The novel mechanism of my record player is indicated, in its entirety, by the character 2. The mechanism 2 is disposed in the upper portion of the cabinet, while at the base thereof the space is devoted to a played and/or rejected record compartment 3. To the left of the compartment 3 is space 4 where records conveniently contained in albums 5 may be stored. The record player mechanism 2 includes a magazine 6 to which records are adapted to be passed through a slot element 7.

Preferably, the slot element 7 is closable. This is possible since a movable panel or door 8, Fig. 12, providing an upper front wall for the cabinet, is slidably confined at the top and bottom thereof by guides 9 and is adapted to be moved longitudinally by a handle 11 on the door. When in open position (Fig. 12) the left end of the door 8 extends behind an end pilaster 12 of the cabinet 1. The slot 7 is then provided between the door 8 and a center pilaster 13. When in closed position, the door 8 is adapted to abut the pilaster 13. The slot 7 is sufficiently wide to readily accommodate insertion of from 1 to four records at a time therethrough.

The slot element is formed by guide means to effectively guide records to the interior of the magazine 6. This is advisable in order that the records may be more effectively received by the magazine for reasons that will be apparent hereinafter. The means provided involve use of a curved element 14 between the opening in the front of the cabinet (Fig. 12) and magazine 6. The element 14 comprises vertical sides 16 which are curvilinear in transverse cross-section and which, inwardly, are uniformly spaced from each other at the magazine 6 for a distance adequate to permit passage of as many as four records therebetween. From their inward edges the sides 16 diverge to their outward edges adjacent the vertical sides defined by door 8 and pilaster 13. The sides 16 are held in spaced relation to each other by a bottom wall 17 (Fig. 11) and a top wall 18. The wall 17 includes a downwardly extending flange 19 which, together with a flange 21 extending from the wall 18, Fig. 11, provide means by which the slot element is adapted to be secured to the cabinet 1, in any convenient manner. The door 8, when closed, is adapted to cover the slot element.

Although I prefer to use a longitudinally slidable door for closing the opening to the slot element, other means for closing the slot element may be used, as shown in Figs. 2 and 3. This includes a member adapted to be rocked about an axis extending in parallel relationship to the slot. Such an alternative construction includes a slat 22 which carries a pin or pivot 23 extending from either end thereof. The pins 23 are journaled in horizontal portions 24 and 26 of the cabinet structure so that slat 22 is adapted to close, in one of its two extreme positions, a slot or space 27 defined by the vertical side of an immovable panel 28, a center pilaster 29 and the horizontal portions 24 and 26. In its other extreme position, which is provided by swinging the slat 22 about its pivots 23 through a quarter turn, said slat provides space between its side and the panel 28 wide enough for passage of a group of four or five records therethrough to the magazine 6.

After a record has been reproduced by the mechanism 2, it is automatically released to the rejected or played record compartment 3. The compartment 3 is separated from the compartment 4 by a vertical partition 31 (Fig. 1) at one side thereof while at the other side thereof the compartment is in part defined by a wall 32 sloping upwardly and away from the wall or partition 31. At the base of the compartment 3 (Fig. 10), a bottom wall 33 slopes upwardly from wall 32 toward partition 31. If desired, the wall 33 may also slant upwardly from a region centrally thereof (Fig. 11) so that when records reach the bottom of the compartment they tend to roll to a position of rest over the central region of the wall. The compartments 3 and 4 are normally closed by means including a door 34, hinged from the end pilaster 12 of the cabinet 1. Additionally, a pad of comparatively soft, fibrous material 36, such as felt, is in extension over the walls 32 and 33 to which the felt is preferably secured by a suitable adhesive. Similarly attached to the door 34, Fig. 1, is additional fibrous material 37, of shape conforming to the contour of the space between walls 32, 33 and partition 31. When the door 34 is closed, a third section of felt 35 at the end of the compartment opposite the section 37, provides, with the felt portion 36, a pocket for records R. The first record to enter the empty compartment is adapted to strike the portion of the felt 36 which overlies the slanting side wall surface 32 down which the record slides and assumes an inclined position of rest on the surface 36. The following record to enter the compartment 3 engages the side of the previous record and comes to rest in intimate association therewith. Similarly, each additional record to enter the compartment 3 is superimposed against the previous record, the edges of the records resting on the padded bottom 36. The felt members 35, 36 and 37, therefore, not only play the role of cushioning agents but act as sound insulators for the records as they come to rest in the compartment 3.

The records pass from the slot element 7 to a magazine. From there they are transferred singly to playing position where one side of the record is played and thence they are dropped into the played record compartment.

*Method of transferring records*

To indicate the method adopted for manipulating a record from the point where it is contained in the magazine 6 to the point where it is eventually brought to rest in the rejected record compartment, a series of schematic views are presented in Figs. 4 to 9. Therein a conventional turntable T is adapted to rotate about a novel, fixed spindle S, supported axially of the turntable. The magazine 6 is in association with the turntable and adapted to carry a group of records R supported on their edges in a position slightly inclined from the vertical. This is in part effected by a rotatable element or roller 38, adapted to rotate freely about a fixed horizontal axis, against which the records lean while they are supported by a support or base member 39. The base 39 slopes downwardly toward a side member or stop 41 toward which the records move by gravity when received by the magazine 6. Means, to be described hereinafter, are also provided by which the records are caused to automatically seek a position centrally of the side member 41.

Of all the records in the magazine 6 that record which is immediately adjacent the side member 41 will be referred to hereinafter as the "end record."

Record removal mechanism for dislodging the end record from the magazine 6 includes a pair of ejector members or fingers 42, in intimate, slidable relationship to the side member 41. Each of the fingers 42 may be slightly thinner than the respective records in the magazine 6. The fingers 42 are normally in a position below the level of the junction of base and stop members 39 and 41, from which position the fingers are adapted to be moved upwardly by mechanism, later to be described. In the course of their upward movement, the fingers 42 are adapted to engage the end record which they raise to a level substantially above the top of the side member 41. For effective support of the end record, the tips of the fingers 42 include surfaces 43 slanting in opposite directions so as to collectively provide a cradle for the end record. Additionally, the surfaces 43 slant downward toward the side member 41 partly to urge the end record against the side member while the record is in the course of its upward movement. It will therefore be apparent that the record slides from the surfaces 43 on to the side member 41 as soon as its upward movement frees it from the confining influence of the side member. But the side member 41 also has a beveled surface 44, slanting downward toward the turntable T. Over the surface 44 the record then slides also by gravity, thus leaving the magazine as it is disengaged from the side member. Thereafter the fingers 42 move to their normal position and enable the records in the magazine 6 to move down the incline 39 so that the next consecutive record is adapted to abut the side member 41 and become the end record. The fingers 42 remain in their normal position during the operation of playing a record. As often as the record player operates to reject a record; that is, discard a record either automatically or indirectly in response to a manual stimulus, the rejected record is thus replaced by an unplayed record from the magazine 6.

Aligning mechanism is provided for conveying a record, regardless of its size, into a predetermined vertical plane after the record has been removed from the magazine 6. The aligning mechanism includes a pair of levers 45 swingable about pivots 46 on either end of the member 41. The levers 45 carry flanged pins 47, each of which is spaced equidistantly from the pivotal point 46 about which it is adapted to be swung in operative sequence by means to be described hereinafter. At the time when a record is dislodged from the magazine 6, the pins 47 are in an upward position where they are in readiness to receive the record, which the pins do by providing support therefor. The pins 47 are moved downward simultaneously with the downward movement of fingers 42 and hence lower the record from the support of roller 38, whereupon it inclines toward the left (Fig. 7). Since the axis of a record, supported by the pins 47, assumes a position in the same vertical plane regardless of whether it is of 10-inch or 12-inch size, the center hole of either sized record is adapted to be moved downwardly, through the same vertical plane, as the pins 47 are lowered.

The spindle S provides guide means to guide a record from the aligning mechanism to the turntable T. The spindle is therefore positioned in fixed relationship to the magazine 6. From the turntable T the spindle S extends vertically for a slight distance, then curves toward the magazine and includes straight section 48, slanting upwardly and terminates in a free end 49. Additionally, the section 48 points toward the vertical plane through which the records are movable when supported by the pins 47. The pins 47, when in their extreme upward position, support the record at such a level that regardless of its size, its center hole is above the level of the extremity of the end 49. Before the pins 47 have been swung to their lowest extremity the moving axis of the record is lowered into coincidence with the axis of the straight portion 48 of the spindle. At this point gravity provides for the record threading its center hole over the end 49. It is noteworthy, therefore, that the axis of the section 48, and particularly the portion of the axis at the end 49, is in substantially the same vertical medial plane that the axes of the records are adapted to be vertically moved through, when supported by the pins 47.

Record carrier mechanism is employed to lower the record, thus threaded over spindle S, to the turntable and/or remove it therefrom. The record carrier mechanism may take the form of means comprising a flap F which includes a pair of arms 50 held in spaced relation to each other by a beam 51, adapted to be rocked about an axis 52 so that the arms are swung from a normal or playing position (Fig. 5), on either side of the turntable T to a substantially vertical position indicated in Figs. 6 and 7. In its raised position, the flap F is adapted to arrest the fall of a record to the left, as it swings about pins 47, after it has been relieved of the support afforded by the roller 38. The arms 50 then begin their swing counterclockwise as the pins 47 simultaneously continue their downward motion. The center hole of the record being threaded over the free end of spindle S, the weight of the record is then in part sustained by the flap F until it passes beyond the straight portion of the spindle 48. Thereafter the weight of record is increasingly sustained by the arms 50 until it meets the turntable T. The arms 50 come to rest in their normal position which is below the level of the record on the turntable.

As has been previously indicated, the arms 50 of flap F are adapted to support a record during its transfer from the magazine 6 to the turntable, after the record has been released from the support of the roller 38. In detail, the transfer operation differs slightly in accordance with the size of record being so manipulated. In the case of a 10-inch record, said record first strikes the free ends of arms 50 as indicated in Fig. 7 after the record has been released from the support of the roller 38. Then the center hole is threaded over the end 49 of spindle S by the combined operation of flap F and pins 47. If, however, a 12-inch record is being transferred from the magazine 6 to the turntable T, the record remains seated on the pins 47 until they have been lowered to a lower level than they are lowered before a 10-inch record is disengaged from them and from the support of the roller 38. A longer period of time is thus consumed for removal of the 12-inch record than a 10-inch record from the magazine. Before a 12-inch record is thus disengaged from the roller 38 the flap F has begun its swinging motion toward the turntable so that the end 49 of the spindle extends slightly between the arms 50 at the point of release of the 12-inch record from the roller 38. Consequently the larger sized record, instead of first engaging the ends of the arms 50, engages the point of spindle S over which it slides by its own weight while still seated on the pins 47 which continue in their downward course. Before the pins 47 have reached the lowermost point of their travel, the center hole of the record is threaded over the spindle S which then supports the record. Thereupon gravity provides for the record overtaking the arms 50 by means of which it is gently lowered to the turntable.

Then a pickup or reproducer arm 53 (Fig. 8) is swung into operative engagement with the record which, in turn, then carries the pickup toward the spindle during the course of reproduction. When the pickup reaches the terminal groove of the record, the pickup 53 is automatically disengaged from the record and swung outwardly to a position immediately above a point beside the record, by mechanism to be described hereinafter. This is one of the operations performed in the course of a cycle of automatic operation after a record has been played, which cycle also involves a change of records in sequential order. Since such a cycle involves rocking of the flap arms 50 upwardly from the Fig. 8 position, the record just reproduced is carried in a reverse direction over the spindle until it ceases to be supported thereby. Thereupon the record falls laterally downward and comes to rest in the played record compartment 3.

In its passage to the compartment 3 from the flap F, the record is engaged by a record lowering device L (Fig. 9), to be described hereinafter, for reducing the impact of the record with the walls of the compartment 3 or with other records already in the compartment.

*Structure of frame and connection with cabinet*

The structure of the frame of the mechanism 2 is best shown in Figs. 13, 15 and 18. It is preferably of parts struck from some suitable sheet metal and includes a base plate 55 and has secured to its opposite edges lateral members 56 and 57, Fig. 13. The base plate 55 is of generally rectangular formation and has an apron 58 extending downwardly from the edge thereof to add rigidity thereto. The lateral members 56 and 57 are of generally similar L-shaped formation, and their rigidity is improved by flanges 59 extending toward each other throughout the length of the base of each of the members. Additionally, a flange 60, extending perpendicular from the upper edge of the member 56, and a flange 61, extending perpendicular from the upper edge of the member 57, overlie the plate 55 to which they are rigidly connected in any convenient manner such as by rivets 62. The opposite ends of the lateral members 56 and 57 extend upwardly and are tied together by the record support member 39 (Fig. 47), later to be described. In order that this connection may be effected, an inwardly extending flange 63 is provided on both members 56 and 57, the support member 39 being rigidly coupled to the flanges 63 in any suitable manner. Additional means to tie the lateral members 56 and 57 together is provided by a corner beam 64 which is L-shape in cross section, for the sake of rigidity, and to the ends thereof, the ends of flanges 59 are rigidly fastened in any convenient manner, as is also the relationship between ears 64a, on the beam 64, to the end member 56 and 57.

Vibration dampening members are employed in connection with means to anchor the mechanism 2 to the cabinet 1. For support of the mechanism 2, the cabinet is provided with horizontal rails 65 and 66 (Figs. 10 and 11) from which said mechanism is spaced by bushing 68 of some resilient material such as rubber, sections 67 thereof, of reduced diameter, extending into the rails. The bushings are anchored to the rail 66 by screws 73 passing therethrough and axially of the bushings 68, above which the screws are threaded in the beam 64. Rigidly coupled to the left hand end of the base plate 55 (Fig. 10) is a bracket 74 L-shaped in cross section, and having threaded therein a pair of screws 79 which pass through the rail 65 and axially of an additional pair of the bushings 68 to space the bracket 74 from said rail. As an additional precaution to cushion the support of the mechanism 2, the heads of the screws may be in spaced relationship to the rails 65 and 66 so that no clamping pressure is exerted on the rubber bushings. If desired, the screws 73 and 79 may carry washers 80 between their heads and the rails thereabove.

*Construction of magazine*

As has previously been indicated, the record support or base member 39 (Fig. 52) is carried by the lateral members 56 and 57. It includes an upwardly extending record guide flange 84, at the rear side thereof which, toward the top, is further bent outwardly at 85 to assure guidance of records to the record support surfaces, and to lend rigidity to the member 39. The continuity of member 39 is broken by slots 86 and 87 so that the sppport member includes horizontal portions 88 and 89, and a central portion 90 which slopes downwardly from the flange 84 toward the side member 41. The portions 88 and 89 include downwardly extending flanges 92 to which the member 41, Fig. 48, is attached in any convenient manner and by which the side member is adapted to be supported in a position slightly inclined from a vertical so that said side member extends downwardly and slightly beneath the support member 39. The horizontal portions 88 and 89 includes lip portions 93 and 94 which curve downwardly in the slots 86 and 87, and horizontally extend in a diverging order, from the guide flange 84 toward the side member 41. It will, therefore, be apparent that since the surfaces 88 and 89 are disposed at a level substantially below the level of the bottom of slot 7, that a record or records inserted through said slot will, when they have passed slightly beyond the support thereof, assume a rolling motion as they drop to the support of surface 89. The inertia of their rolling motion conveys them over and on to the support of the central portion 90. As the records pass into engagement with the central portion 90, they slide axially in a direction forwardly of the magazine 6, due to the slant of the central portion, being prevented from rolling movement in either direction by the lips 93 and 94. They are finally brought to a rest due to their engagement with the side member 41. In addition, the position of the record is maintained between the limits defined by the two lips 93—94.

Novel precautions are resorted to in order that the magazine may be adapted to effectively carry the records R. The precautions comprehend the angular position in which the records are positioned in the magazine with respect to a vertical. The means by which the records automatically assume this position include the inclination of a plane on which their peripheral edges are adapted to rest, and a plane of increased slant for the end record, to provide for engagement thereof by the fingers 42. The means by which the records automatically find a position of rest in the magazine include a prop member against which the end record also is adapted to rest.

To illustrate the significance of the factors governing the position of the records, reference to more of the difficulties overcome by the invention may be timely. It is obvious that the more the records are inclined from a vertical position toward a horizontal position, the greater will be the weight of the rest of the records on the end record, and the greater will be the possibility of disturbing a record or records adjacent the end record when said end record is engaged for movement thereof, by the fingers 42. This difficulty of disturbing one or more records of the stack, adjacent the end record, is also present when the slant provided by the central member 90 is too great, since such a construction involves a tendency, on the parts of the records, to wedge themselves between the central member and the side member 41, resulting in undue pressure on the end record, and consequently undue friction between said end record and the adjacent record. Also present when the slant of member 90 is too great is this disadvantage: The records tend to diverge from each other from their region of support on the support member 39, the diverging tendency being due to a slight difference in thickness of a record at its very edge and regions remote therefrom. On the other hand, if the inclination of the central member 90 is insufficient, the records may not automatically seek a desirable position in abutment with each other and with the end record in position where it is regularly adapted to be engaged by the fingers 42. This condition may be aggravated if the inclination from a vertical position, as provided by the roller 38, is insufficient, when records are casually placed in the magazine. Furthermore, provision for insufficient inclination of the records from a vertical may even be accompanied by the records finding a position wherein they lean away from the roller 38, on being hurriedly placed in the magazine. The foregoing defects having been noted with the aim of determining an ideal construction for the magazine, it was further ascertained that the records were satisfactorily displaced axially by gravity, toward the side member 41, when the central member 90 was inclined at an angle of from 26 degrees to 30 degrees from a horizontal, and this was when the records were adapted to lean against the roller 38 at an angle of from 9 degrees to 13 degrees from a vertical. Accordingly, an angle of 11 degrees was adopted as a suitable one at which to incline the records, when they were supported on the central portion 90, which was inclined at an angle of 28 degrees from a horizontal, this being near the minimum angle of inclination of the member at which the records would slide, on their edges, thereover.

A novel feature is further incorporated in the magazine as a means for providing a more effective abutment between the end record and the side member 41. This is effected by providing a zone toward the forward portion of the member 90 and centrally thereof which slants at a greater angle toward the member 41 for a distance approximately equal to or slightly greater than the thickness of a record. Consequently an incline 96 of increased slant is provided for support of the end record but which does not afford support for the record adjacent the end record. The incline 96 slants downwardly at an angle after the order of 45 degrees and continues throughout the width of a tongue 97 which extends through a horizontal, elongated aperture 98 in the side member 41, Fig. 51, wherein it is supported. By means of this construction, I gain the advantage of snug abutment of the end record with the side member 41 so that as the fingers 42 move upwardly they more efficiently engage and remain in engagement with the end record as long as it is in the magazine. This operation is carried out without excessive pressure against the end record by the rest of the records. Consequently, the possibility of an additional record being disturbed when the appropriate one is ejected from the magazine is eliminated.

Additional means are provided for supporting the records and determining the angle of tilt when they are in the magazine 6. Said means includes, as previously indicated, the roller 38. Mechanism to support the roller 38 includes an arch beam 99, Fig. 18, spaced from the member 39 by upright members or standards 101 and 102 respectively, which are, in turn, rigidly coupled to the lateral members 56 and 57 in any suitable manner. Each of the standards 101 and 102 is substantially triangular in conformation, the angle included between the respective long sides of each standard approximating the angle of inclination of the records in the magazine. Additionally, the standards are flanged outwardly at the long edges thereof to add substantially to their rigidity. The beam 99 is preferably L-shaped in cross section so as to include a side wall 103 from one edge of which is bent a flange 104 to add to its rigidity. Centrally of the wall 103 is provided an elongated aperture 106. The roller 38, on the other hand, includes axially extending pintles 105, adapted to extend under loops 107 struck from the wall 103, and by which the pintles are frictionally secured to the beam 99. The roller 38 thus mounted, extends through the aperture 106, Figs. 19 and 22, and the records in the magazine are adapted to lean against it. Both ends of the beam 99 include laterally extending flanges 108 adapted for intimate engagement with the standards 101 and 102 when the beam 99 is positioned therebetween. Toward the tops thereof, each of the standards 101 and 102 is provided with an elongated aperture 109, Fig. 19, adapted to receive a bolt 111 by which the respective flanges 108 are secured to the standards 101 and 102. Owing to the elongation of the apertures 109, the beam 99 is adapted to be shifted laterally before it is clamped in place by the bolts 111, which is advantageous for adjusting the position of the roller 38 so that, throughout its length, it may contact a record and also to adjust the position of the record in order that it may be as close as it can be against the side member 41.

Means is additionally employed to convey the records into leaning engagement with the roller 38 as the records are passed into the magazine. The means includes a deflector 100, Figs. 15 and 18, rigidly attached to the standard 101 and the support member 39. The deflector 100 includes a section 100' of U-shaped cross-section which extends rearwardly and toward the longitudinal axis of the record player mechanism so that records which strike its inclined sides are tipped toward the roller 38.

As previously indicated, the records are singly dislodged from the magazine 6 by means including a pair of fingers 42. The fingers 42 are integral parts of a finger bar 112, Fig. 47, and are in intimate and slidable association with the side member 41. To provide this relationship between the fingers and side member each of the fingers 42 has a slot 113 extending longitudinally thereof. Buttons 114 carried by the member 41 extend into the slots 113. Each of the buttons 114 has a shank 115 of a length slightly greater than the thickness of the finger 42 and of a diameter adapted to be slidably accommodated in the slots 113 so as to provide a guide for the finger when the buttons are secured to the side member 41 by a bolt 116. As a precaution against interference to the movement of records by the heads of the bolts 116, the side member 41, includes a blister or elongated depression 110 distended outwardly along a horizontal plane from the side member 41 for a distance slightly greater than the height of the heads of bolts 116. Due to the presence of the blister 110, a record which is lowered by the pins 47 is adapted to be cammed outwardly toward the ends of the pins so that interference of a record with the bolts 116 is avoided. An additional advantage provided by the blister is this: Should the end record be warped slightly, as indicated in Figs. 70 and 71, then the upper portion of the side member 41 is adapted to operably engage the record while the peripheral edge of the record rests on the slanting surface 96 of the member 90. At either end thereof, the finger bar 112 includes rearwardly extending flanges 117, each of which carries a stud 118, in coaxial relationship to each other. The finger bar 112 is cooperatively associated with a pair of cam operated levers 119 and 121, Figs. 14 and 48, the structure and operation of which will be described hereinafter. Suffice it to say, however, that the levers have slots 122, in one of the ends of each, in which are received the studs 118. The levers 119 and 121 being adapted to be rocked simultaneously, the fingers 42 are thus reciprocated alongside the side member 41.

Additional means is employed to separate the end record from the remainder of the stack of records R. Said means includes safety blades 123 and 124, Figs. 18 and 47, in association with the fingers 42. The blades 123 and 124 are of thin, resilient metal and are rigidly secured, at their lower ends, to the finger bar 112. Upwardly thereof the blades 124 include lobes 126 and 128, Fig. 47, extending toward each other, the upper edges of which are provided with beveled surfaces 127, sloping upwardly toward the upper edge of the side member 41 when the fingers are below the level of said edge. Being so constructed, the beveled edges 127 of the fingers 123 and 124 are adapted to be readily forced upward between the slightly wedge-shaped edges of the records as indicated in Figs. 65, 66, 67 and 68 so that the end record is thus moved and spaced from the adjacent record. The end record being thus freed from face-to-face abutment with the adjacent record, said end record is relieved of the retarding effect of frictional resistance between it and said adjacent record when moved upwardly by the fingers 42. The fingers 123 and 124 extend upward beyond the ends of fingers 42 and consequently, as will be noted in Fig. 67 also prevent the end record from sliding backward, due to a defect in its structure.

Safety blades 129 and 131 of an alternative construction are depicted in Figs. 93 and 94. They are laterally movable with respect to the fingers 42 and include beveled edges 132. In order that they may be movable, each of the blades 129 and 131 is pivoted near its base to the finger bar 112 by a rivet 133, Fig. 97. A spring washer 134 between the head of the rivet and each of the blades 129 and 131 provides for pressure contact of the blades with the fingers 42. To provide for rotative motion thereof about the pivots 133, the blades 129 and 131 are each provided with a curved cam slot 136 extending longitudinally thereof. The ends of the slot are disposed approximately along the center line of the blade and slant toward the center portion 137 which is to one side of the center line as can best be seen in Fig. 94. In each of the slots 113 and 136 is slidably received the shank 138 of a button 139, which is secured to the side member 41 by a bolt 141, Fig. 96. The button 139 includes a head 142 overlapping the edges of the slots 136 so that the blades 129 are confined between heads 142 and fingers 42. It will therefore, be apparent that as the fingers 42 and blades 129 and 131 move vertically on the buttons 138 that the lateral position of the blades are varied with respect to the fingers depending upon the longitudinal position of the button in the slot. This is desirable since the peripheral regions of records sometimes become splintered or nicked as indicated at 143, Figs. 95 and 101, in which event as the end record is lifted by the fingers 42 the adjacent record might be lifted if a blade 124 (Fig. 47) engaged the nick. When either of the blades, as indicated in Figs. 95 and 101, engage the nick 143, however, the motion of the surfaces 132, to and from each other, is adapted to disengage the blades from the nick whereupon the adjacent record drops from the support of the blade (Fig. 102) to the support provided by the surface 90 (Fig. 103). As will be noted by comparing Fig. 93, wherein the blades 129 and 131 are shown in their lowest extreme position, with Fig. 98, wherein the blades are depicted in approximately a midway position, that the upper extremities of the blades move apart to a maximum extent during approximately the first half of their upward course. They remain in this position with respect to the fingers 42 during the remainder of their upward course in order that the nicked portion of the record may have a chance to return to its normal position of rest on the surface 90.

The levers 45, which carry the record receiving pins 47, on the front of the side member 41, are adapted to be operated by movement of the finger bar 112, on the rear side of the side member to lower the record into adjustment with the spindle. That this may be carried into effect, each finger bar 112 carries adjacent each end a stud 144 (Fig. 27), each of which includes a section 146, of enlarged diameter, the studs being secured in the finger bar by a riveted head 147. The side member 41 has vertically extending slots 148 in which are slidably received the sections 146 of the studs, whereby the fingers 42 are adapted to be additionally guided in their vertical motion. The studs 144 extend through slots 149 (Fig. 18) in the levers 45. The levers 45 are provided with a boss 151 on the side (Fig. 27) to provide bearing portions adapted to have sliding engagement with the side member 41 and which also space slightly the lever 45 from the member 41. A spring washer 152, is confined between a rigid washer 153 and the side member 41, a side-slotted washer or retaining ring 154 fitting in a groove 156 in the stud 144 removably holding washer 153 on the stud and spring washer 152 so that the bearing portion 151 is pressed against the magazine. If desired, a covering 47*a* of some resilient material, such as rubber, may be applied to each of the pins 47 to eliminate or greatly lessen noise created by initial engagement of the pins by a record as well as to protect their contact with the record.

*Record flap and relationship to frame*

As previously indicated, the record engaging flap F includes a beam 51 adapted to rock about the axis 52 (Fig. 6). In detail, the beam 51 (Fig. 15) is constructed of sheet metal and is substantially U-shape in cross-section throughout the greater part of its length. At one end thereof the beam 51 includes a follower arm 157 (Figs. 6, 26 and 30) extending downwardly therefrom. Toward the end thereof, the arm 157 carries a follower 158 extending outwardly and in parallel relationship to the axis 52 (Fig. 6). The arm 157, at one end, provides, with a lug 159 (Fig. 30), bent downwardly from the opposite end of the beam 51, bearing portions for pivotally supporting the beam between the lateral members 56 and 57. The arms 50 may also be of sheet metal rigidly coupled to the beam 51 in any convenient manner. If desired, the arms 50 may be surfaced with some vibration absorbent element such as a finely comminuted fibrous material, applied by flocking. By its use, the noise of impact of a record on striking the surface of the arms 50 is greatly lessened or eliminated as well as forming a softer surface for engagement therewith.

Fig. 30 shows the means employed for pivotally supporting the flap F from the lateral members 56 and 57. A screw 161, threaded in the lateral member 57, has a reduced end portion 162 passing through the lug 159 as a pivot for the beam 51. At the opposite side of the machine, a bolt 163 provides pivotal support for the beam 51, and like the screw 161 is coaxial with the axis 52. The structure of the bolt involves a straight portion 164 which is clamped against the lateral member 56 by a nut 166, threaded on a section 167 of reduced diameter. The straight portion 164 therefore spaces a flange 169, an integral portion of the bolt 163, from the lateral member 56; furthermore, the flange defines one extremity of the straight portion 164 and an inwardly extending stud portion 168 on which the arm 157 is journaled. Preferably, the beam 51 is resiliently confined against axial motion between the flange 169 and the threaded portion of screw 161. In the embodiment as illustrated, a spring washer 171, of arcuate transverse cross section is carried by the stud portion 168 between flange 169 and arm 157 while a similar spring washer is carried by the end portion 162 of screw 161 between the lug 159 and the threaded portion of said screw. The flap F is adapted to be rocked about its axis by movement of cam mechanism, later to be described, in engagement with the follower 158.

The structure of the invention is of such a nature that should a record fail to be transferred from the magazine 6 to the spindle S, it will be directed into the played or rejected record compartment 3. Without this precaution, a defective record, and in particular one with an ill-formed center hole, which failed to be threaded over the spindle S would remain seated on the pins 47 and leaning against the end of the spindle at the end of a record changing operation. As means to overcome this, the side member 41 is cut away at 172, 173 and 174 (Fig. 18) thereby providing tongues 176. Transversely thereof, the ends of the tongues 176 are bent so as to slant outwardly; i. e., toward the turntable, and downwardly to provide deflection lugs 177. The free ends of the lugs 177 are desirably rounded and free of sharp points. Owing to this, the lugs 177 are of such construction that should the center hole of a record pass by the free end of the spindle S, without becoming threaded thereover, while carried downward on the pins 47, the record is engaged by the lugs 177 before the pins 47 have reached the lower extremity of their travel, holding the record against further downward movement until the support of the pins 47 is removed from the record, after which the record slides outwardly, by gravity over the inclined surfaces of the lugs and drops to the record compartment 3.

*Record lowering device*

It is desirable that the records be slowed down as they drop into the compartment 3 to decrease the noise of impact as its fall is arrested, especially when the record collides with another record already in the compartment, and which might be accompanied by chipping of one of the records. A mechanism L (Figs. 15 and 17) adapted to engage the opposite sides of a record is therefore provided to prevent records from acquiring too great a velocity after they have been dislodged from the spindle S by the flap F.

The mechanism L or "lowering device" comprises a pair of pulleys or rollers 178 and 179, one of which is disposed on one side, and the other on the opposite side of a vertical course through which a record travels in its downward passage on release from the support of spindle S. The roller 178 is connected to a rotatable weight or flywheel 181. The other is adapted to be constantly pressed toward the first roller by spring or other yieldable pressure. More specifically, the device L includes a bracket 182 rigidly fastened to the under side of the base plate 55 toward the right thereof as seen in Fig. 15. The bracket 182 includes an arm 183 beside the free end of which is associated the roller 178, journaled on shaft 184 which is cantilevered from the side of said arm. The bracket 182 also includes a second arm 186 extending downwardly parallel to the arm 183. The two arms 183 and 186 carry a shaft 187 which rotatably supports a fly wheel 181. Adjacent the roller 178, the weight 181 is of reduced diameter to provide a roller engageable portion 188 which may be knurled to provide operable frictional relationship thereof with the roller 178. The roller 179, on the other hand, is adapted to rotate on a shaft 189 which is secured in the arms of a swingable yoke 191. The yoke 191 is swingable from a bracket 193 by means of a pin 194 which connects the arm and bracket to each other. The bracket 193 is mounted on the corner beam 64 in such a position that the roller 179 is adapted to be swung into engagement with the roller 178 due to the tension of a spring 196 anchored between a lug 197', on yoke 191, at a point centrally thereof and a laterally extending lug 197, on bracket 193. Normally, the axis of pulley 179 is thus disposed in substantially the same horizontal plane as the axis of pulley 178; and the flap F, when at the point whereat it releases a record from the spindle S, is preferably spaced slightly from a vertical plane through to the line of contact between rollers 178 and 179. This is in order that the fall of a record, on release from spindle S, will first be arrested by contact with the roller 178, the rotation of which is resisted by the weight 181, rather than contact with both of the rollers 178 and 179. The point of contact of the record with roller 178 is sufficiently near to the point of contact between the rollers, however, to immediately start rotation of the same due to the weight of the record which presses them apart, by swinging roller 179 to the broken line position (Fig. 15) and passes downwardly between them.

In operation, the tension of spring 196 is just adequate to provide a gripping action on a record by the rollers 178 and 179 to the extent that descent of the record would be arrested if one of the rubber rollers were forcibly held against rotation. The weight of a record is, however, adequate to force the rollers 178 and 179 apart against the spring pressure provided and permit the record to continue its course into the compartment 3. The weight of the record is adequate, then, to rotate the rollers, one of which, as previously indicated, is drivingly coupled to the weight 181. But owing to the size and weight of the flywheel 181, and consequently the time necessary for it to acquire kinetic energy which it must acquire from the downward thrust of the record, there is a considerable lag in the rate at which the flywheel gathers speed; furthermore, the speed that the flywheel is adapted to attain is limited, due to the weight of a record and the friction of the bearings for the wheel and rollers. As positioned with respect to the compartment 3, the rollers 178 and 179 thus retain their grip on a 12-inch sized record almost to the point where it reaches the bottom of said compartment. Owing to this, the likelihood of records becoming chipped or creating noise due to impact on delivery to the compartment 3 is negligible, and this is further lessened by the degree to which the rejected record compartment is enclosed and the manner in which the interior thereof is padded.

Provision is also made to swing the record clockwise slightly, so that eventually the record will not slide unduly over a record already in the rejected record compartment 3. This is carried out as follows: When passing between rollers 178 and 179, a record is urged to pass therebetween in a course which is normal to the plane defined by the axes of the rollers. When the rollers 178 and 179 are pressed apart by a record, the roller 179 swings from its full line position (Fig. 15) to the broken line position, as previously indicated. In so doing, the axis of roller 179 is carried to a level slightly below the level of the axis of roller 178. The record which is passing between the rollers is thus swung clockwise slightly about roller 178 so that when it is released from the grasp of the rollers it falls in a position which is inclined slightly from a vertical. Consequently the lowest part of the record does not engage and unduly scrape or slide over other records already in the compartment 3 (Fig. 10) but engages the bottom 33 or lower regions of the other records before it comes to rest. Although the arm 182 is shown as being a single fixed arm, it is apparent that this arm could also be pivotally connected to the supporting structure as is the arm 191.

As previously stated, the records fall into the compartment 3. As best shown in Fig. 11, the bottom wall 33—36 of this compartment is inclined in two directions to form a depressed mid portion, which causes the records to stack up nicely with each other and to keep the records well away from the front and rear walls. As an alternative form, or improvement on the foregoing, the center line 40 of the depressed portion may be disposed to one side of a line defined by the center hole of a record during its downward travel, this being shown by the dashed lines 33' and 36'. The records, therefore, fall to one side of this center line and roll into a position to one side of the center line of fall. Then the next record which falls into the compartment, the edge of which engages the face of the previously discharged record, engages the record in a line tangent to the record grooves instead of striking the record grooves at right angles thereto. This further prevents damage to the record grooves by the edge of the record.

*Support and drive for turntable*

Centrally thereof and at a predetermined distance from the magazine 6, the base plate 55 is provided with an aperture 198 (Fig. 16). It provides means by which a bearing frame 199 is adapted to be positioned with respect to the magazine and other elements of the record player, later to be referred to. The frame 199 is of rectangular formation and includes a flat top surface 201 centrally of which is an annular flange 202 adapted to fit closely within the aperture 198 while clamped abutting relationship between the surface 201 and plate 55 is provided by screws 203. The turntable T includes a hub 204 axially of and in rigid communication with which is associated a tubular shaft or sleeve 206. Upwardly thereof, the frame 199 provides a bearing portion 207 in which a bushing 208 is disposed to provide a bearing for shaft 206. On either side of the sleeve 206, and spaced therefrom, the frame 199 includes vertical arms 209 and 211 while downwardly thereof, the arms are joined by a transverse portion 210. The transverse portion includes a boss 212 in which is provided a bore 213, in coaxial relationship with the bushing 208. Upwardly thereof, the boss 212 is provided with a counterbore 214 in which is frictionally mounted a bushing 216 to provide a second bearing for the shaft 206. As will be noted, the bearings provided by bushings 208 and 216 restrain the shaft 206, and consequently the turntable T, against lateral displacement. Also, as will be noted, the shaft 206 falls short of engaging the bottom of counterbore 214. This is because the weight of the turntable is supported on the frame 199 by means including a ball thrust bearing 217, of conventional construction, separated from the frame 199 by a suitable vibration dampener washer 218, and from the hub 204 by a similar washer 219.

In order to drive the turntable T continuously, means including a motive unit 221 (Fig. 13) is provided. It will not be described in detail, however, since it forms the subject matter of Patent No. 2,429,512, issued to George E. Redfield on August 16, 1949. In view of this, however, it may be timely to state that the motive unit comprises a motor 222 having a shaft 223 and a rubber-tired wheel 224 adapted to be swung around the pulley 223, with which it is in constant, frictional driving communication. The motive unit also includes a plurality of arms 226 which it is supported from the base plate 55 below an aperture 227 therein. Rubber bushings, not shown, further segregate vibration created by the motor from other parts of the machine, the bushings being between the ends of the arms 226 and plate 55. The motive unit 221 is so positioned with respect to a vertical skirt-portion 228 of the turntable T that force a spring, not shown, is adapted to normally urge the wheel 224 into driving communication with said skirt-portion.

*Spindle and support therefor*

Novel features are incorporated in the spindle S (Fig. 16). It includes three essential portions namely, a base portion 229, which is received in the bore 213 and where it is rigidly and adjustably held by a set screw 231, an intermediate or record engaging portion 232 adapted to extend through the center hole of a record while the same is supported by the turntable T and a guide portion or cam portion 233 which is adapted to guide the center hole of the record into engagement with the playing portion. As will be noted, the base portion 229 is of reduced diameter with respect to the intermediate portion 232, and also of diameter less than the internal diameter of the sleeve 206 so that said base portion, throughout its length, is segregated from vibrations or lateral play of the shaft 206. Also to this end, a shoulder 234 at the base of the intermediate portion 232 is additionally spaced slightly from the turntable T. The diameter of the guide portion 233 is less than the diameter of the intermediate portion for a purpose which will be explained hereinafter. In addition, the surface of the guide portion 233 is of mirror-like finish, it being preferably plated with chromium and polished so that the spindle may offer little friction to the passage of records thereover. If desired, the guide portion 233 and the remainder of the spindle may be made in two sections, as indicated, the lower end of the guide portion being fitted in a bore 236, in the intermediate portion, with which the bore is coaxial. The two parts of the spindle are, of course, rigidly held together and this is a convenient mode of manufacture. Additionally, a section of the sides of the playing portion 232 is conical, thus providing a surface 237 to guide, by a camming action, a record from the guide portion into operative engagement with the playing portion. From the intermediate portion 232 the guide portion 233 curves rather abruptly at 238 (Fig. 15) to more gentle curvilinear portion 239 into which the curvature 238 blends. In turn, the curvilinear section 239 is blended into the straight section 48 by a more abrupt curved section 241. Toward the free end 49, the spindle may also include a section 242 which is tapered with the aim of improving the record-engaging quality of the spindle. The centerline of section 242, at least, is in the vertical, medial plane defined by the axes of the center holes of the records as they are moved vertically when supported by the pins 47.

In operation, when the records were allowed to slide by gravity over a part of the straight section 48, it was found that some records produced a squeaking noise due to friction with the surfaces of the spindle which caused it to vibrate at a high frequency. I have found that this trouble can be avoided by use of a slender rib 243 disposed on the upper side of the section 48. A convenient manner in which the rib 243 may be provided is shown in Fig. 84 wherein holes 244, slanting in opposite directions in the upper side of the section 48, are adapted to receive therein, the two ends of a section of wire 246 of a resilient nature, such as steel piano wire. The wire 246 includes anchorate portions 247 which are deflected to only a sufficient degree beyond their elastic limit to permit their insertion in the holes 244, from which they are resistant to removal by virtue of their tendency to straighten, and thereby cause that part of the wire between the holes to hug the surface of the spindle. Although, as shown in Figs. 83 and 84, the wire may lie close to the spindle, in actual practice it is found that the wire may be spaced from the spindle. This is more clearly shown in Figs. 106 to 109 inclusive. Herein I have shown a groove 510 which extends from the portion 48, along the spindle, including the slanting part 242 to the end 49 thereof. This groove is of varying depth, being deepest at the end toward the section 48 and uniformly decreasing in depth toward the end of the spindle being shallowest at 511 which is slightly spaced from the junction point of the conical section with the end of the point 49. It then increases in depth from the point 242*a* to the end of the spindle. The groove, as can best be seen in Fig. 107, is slightly wider than the wire 512. The wire 512 may be secured in the groove as indicated at 513 by brazing, soldering, or staking. At the extremity of the spindle, the wire is preferably secured by staking as indicated at 514. Due to the inclination of the part 242, this has a tendency to bow the wire out of the groove. Because the wire may move sidewise in the groove, any tendency to vibrate is in a frequency beyond the audible range.

The shape of the spindle S is critical insofar as the diameter, curvature and slant of the guide portion 233 are concerned. To understand the reasons for this, it should primarily be recognized that the size of records which are to be reproduced are of a substantially predetermined size, namely, ten and twelve inches in diameter. In a console style of radiophonograph cabinet, of average size, the space is rather limited. Therefore, where the foregoing principle of manipulating a record is involved; that is, the principle of transferring a record, by means including a bent spindle from a substantially vertical to a horizontal position, one of the problems was that of making it possible for a record to slide freely over the curved surface without sticking. This was due to conditions which will be understood by reference to Fig. 83. Therein it will be noted that from a point where the center hole of a record becomes initially engaged by the section 48, the axis of the record swings increasingly away from coaxial relationship with the axis of the spindle until the record approaches the axis of the intermediate portion 232, when the axis of the record swings back toward and finally into substantially coaxial relationship to the axis of the spindle. It will therefore be understood that the farther the axis of the record swings out alignment with the axis of the spindle, the nearer the edges defining the center hole of the record approach the axis of the spindle, and consequently approach opposite sides of the spindle. Of necessity the diameter of the guide portion 233 had to be made less than the diameter of the intermediate portion 232. This involved sacrificing rigidity of the spindle, a desirable quality due to the length of the same. Accordngly, it was ascertained that the diameter of the guide portion 233 could be increased to a maximum if the axis of the curved portion thereof defined a logarithmic curve, for the greater part of its length. Therefore, from a radius, beginning at the vertical part of the axis, the logarithmic curved portion of the axis continues to the axis of the inclined, straight section 48 into which it blends. To construct the curved part of the axis it should first be assumed that, with respect to the horizontal axis 52, the end 49 bears a definite vertical and lateral relationship; also that the axis of the section 48 slants downwardly from the end 49. The inclination from the horizontal is only just enough to provide for motion by gravity of a record over the section 48 in view of the friction offered to passage of the record by the spindle. Preferably, the section 48 is inclined at an angle of about 25 degrees from a horizontal. Through a point M, the approximate point where the curvature begins and the axis 52 of the flap F a straight line is drawn. At an angle of 1 degree, counterclockwise from a line N52, perpendicular to the line M52, a straight line *p* 52 is drawn. Then the line p 52 is divided into equal sections indicated by the points *p'*, *p''*, *p'''*, etc., and straight lines are drawn through each of these points parallel to line M52 and intersecting a straight continuation of the axis of section 48 at points M', M'', M''', etc. Then with a radius M'*p'* and the axis 52 as a center, an arc *a'* is struck transversely of line M'*p'*. Another arc having a radius M'M is struck about M and intersecting the first arc. The point of intersection of the arcs is on the logarithmic curved portion of the spindle. Another point on this arc is found as follows: Using M''*p''* as a radius and 52 as a center, an arc is struck transversely of line M''*p''*, which arc is intersected by another arc drawn about M as center and M''M as a radius. Additional intersecting arcs drawn about M with radius M'''M and with radius M'''*p''''* circumscribed about 52, respectively, thus provide points through which a line is drawn by the assistance of a French curve until it reaches the proximity of the intermediate portion 232 where the logarithmic curve is joined to a vertical line representing the vertical portion of the spindle's axis by a radius of convenient length.

Although a spindle which includes a logarithmic curvature between the portions 48 and 232 provides an ideal contour due to uniformity of space between the sides of the spindle and walls of the center hole of a record when said record is slid over the spindle as described, there are other means of generating a suitable curved portion. For example, it was found by test that two or more suitable radii, drawn about appropriately-located centers, could be used to approximate the logarithmic curvature.

*Record transfer actuator mechanism*

As has already been indicated, the turntable T is constantly driven from the motor 222, the tubular shaft 206 (Fig. 16) being rotated with the turntable. Parallel to shaft 206 is a stationary shaft 249 (Figs. 13 and 31) on which a master cam or cam wheel 251 is rotatable. Upwardly thereof, the end of shaft 249 is of reduced diameter at 252 and threaded to receive a nut 253 by which it is held in clamped relationship to the base plate 55, a lockwasher 254 assisting in the clamping. As means for adding rigidity to the support at shaft 249, the lower end thereof is also of reduced diameter at 256 and threaded so that by means of a nut 257 and lockwasher 258 the shaft is adapted to be secured to a bracket 259, which is, in turn, bolted to the transverse portion 210 of the frame 199, Fig. 14. The cam wheel 251 includes a hub 260 extending from bracket 259 to the base plate 55. Integral with the master cam 251, at the periphery thereof, are the teeth of a mutilated gear 261, adapted to mesh with the teeth of a shrouded pinion 262 rigidly mounted on the shaft 206. The continuity of the series of teeth of gear 261 is interrupted by a blank space 263 (Fig. 23) in which the pinion 262 is normally disposed and due to which there is normally no driving communication between the pinion and master cam. This normal position of the cam 251 is the position it occupies during the operation of reproducing a record. When the reproducing operation has been completed, the cam wheel is rotated sufficiently, by mechanism later to be described, to create meshing engagement between the gear 261 and pinion 262. The wheel 251 is thus rotated through one complete revolution or cycle of rotation until the blank space 263 is carried back to the pinion 262, whereupon the gear 261 thus automatically loses its driving communication with the pinion and stops. During a cycle of rotation of the cam 251, a played record is removed from the turntable T by the flap F and in operative sequence an unplayed record is removed from the magazine and transferred to the turntable. During rotation of the gear 251, the record player is said to be "in cycle."

In order that operation of the cam 251 may be utilized to operate the fingers 42 (Fig. 13) and pins 47, rotative motion of the cam 251 is translated into reciprocatory motion of a longitudinally slidably movable member or cam plate 264. This is effected by a lever 266 pinned at 267 (Fig. 14) to a lug 268 extending laterally of the frame 199. On the lower side thereof, the cam 251 has an endless cam groove 269 into which a follower 271, on the lever 266, extends. The remaining and swingable end of lever 266 is bifurcated as at 270 to operatively engage a pin 272 supported from the cam plate 264 by an L-shaped bracket 273.

The cam plate 264 (Fig. 25) is of generally rectangular formation, and preferably constructed of sheet metal. It also is slidably anchored to the lateral member 56 (Figs. 27–30) as follows: The portion 164 of the bolt 163 carries an annular bearing 274 in extension through a substantially horizontal slot 276 in an upwardly extending portion of the plate 264; furthermore, the bearing is confined between the flange 169 and member 56 for the sake of overcoming axial displacement thereof. The bearing 274 further has an annular flange 278 between which and the flange 169, the plate 264 is confined. Another bearing 279, similar to the bearing 274, is in extension through a slot 281, parallel to the slot 276, in the lower portion of the cam plate 264. The bearing 279 is rotatably supported from the member 56 by a bolt 282 having a head 283. The bearing 279 includes a flange 284 between which and the head 283 the plate 264 is confined. As will be noted, the plate 264 is supported on the bearings 274 and 279 which pass through the plate toward diagonally opposite corners thereof. Therefore, to overcome a tendency of the plate to tip about the bearings, and to improve the bearing relationship of plate 264, with respect to member 56 said plate is provided, in the corner opposite the slot 276, with a boss 286 protruding laterally of the plate and adapted to engage the member 56, while a similar boss 287, above the slot 281 also extends into engagement with the member 56. Since tipping, and consequently binding of the plate about its bearings is thus obviated, a suitable lubricant such as grease can be retained between the cam plate and member 56 for a long period of time.

As has previously been stated, the finger bar 112 is adapted to be moved laterally thereof by a pair of levers 119 and 121 (Figs. 15, 27 and 29). Of slightly arcuate and identical formation, the levers 119 and 121 are rigidly coupled to each other, toward similar ends thereof by a beam 289 about the longitudinal axis of which the pair of levers are adapted to be swung. The beam 289 (Fig. 15) comprises a pair of members 291 and 292 which are L-shaped in cross-section and have fins, or flanges 293 and 294, each of which is rigidly and conveniently coupled at complementary edges, as indicated, to provide the composite beam 289. At each of its opposed ends, the beam 289 includes similarly shaped flanges 296 and 297, struck outwardly from the members 291 and 292, to which the levers 119 and 121 are rigidly secured, preferably by spot welding. An axis about which the arms 119 and 121 are adapted to swing, is provided by a screw 298 threaded in the member 57 and a stud 299, directly opposite the screw 298, carried by the member 56 to which the stud is riveted. To pivotally support the beam 289 from the member 56 without interfering with movement of the cam plate 264, said plate is provided with a slot 301, Fig. 25, which is so proportioned as to accommodate therethrough the stud 299. The end of the stud 299 includes a section 302, Fig. 29, of reduced diameter, which passes through the lever 121 and on which said lever is in journaled relationship. The lever 119, on the other hand, is journaled on a stud portion 303 of the screw 298. One of the arms, namely, the arm 121, carries a follower 304, Fig. 30, which is adapted to be received within a cam slot 306 in the plate 264. As will be noted (Fig. 25), the slot 306 extends from a dwell portion 307, which is substantially horizontal for nearly half the total length of the slot, to a rise portion 308 which slopes upwardly for the remainder of its length. In its normal position; that is, the position while a record is being reproduced, the follower 304 occupies a position at the left of the dwell portion 308 as indicated in Fig. 25. In this position the fingers 42 are, of course, at their lowest extremity. When the cam wheel 251 is rotated through a cycle of motion, the cam plate 264 is moved to the left and the follower 304 lifted, thereby swinging the arms 119 and 121 to the extreme upward position shown in Fig. 26. This, of course, is accompanied by a movement of the fingers 42 and the pins 47 to their extreme upward position.

If desired, each of the levers 119 and 121 may be surfaced, at a region centrally thereof, with some suitable noise deadening element 309 such as rubber, so that should a record strike either of the arms, on its way to the rejected record compartment 3, it will create little or no noise.

The flap F is also operated by motion of the cam plate 264. To provide for this, the plate 264 also includes an irregular shaped slot indicated in its entirety by the reference character 311. The slot 311 is adapted to receive the follower 158 which normally occupies a position toward the top of a vertical portion 312 of the slot. As the plate 264 starts its motion from the right (Fig. 25) the follower 158 is first carried downwardly from its normal position until the cam portion 312 passes a point directly beneath the axis 52 of the flap. The follower then moves upwardly to a horizontal dwell portion 313, the function of which will be described hereinafter, thence to a second horizontal dwell portion 314 wherein the flap has reached its extreme raised position (Fig. 26). During its return movement, the follower, of course, moves in a direction and at a rate the reverse of which it was carried through in the first half of its cycle, just described. In the latter half of its cycle the pause caused by follower 158 entering the dwell 313 causes the arms 50 to remain temporarily in their broken line position of Fig. 25. Since a 12-inch record first strikes the free end of the spindle S on being released from the support of roller 38 (Fig. 15), it is desirable that there be a hesitation in the swinging motion of the arms 50, counterclockwise, to enable the large sized record to move but a short distance to the flap after it has been threaded over the spindle. If the record were intercepted by the arms 50 at a region considerably farther down the spindle, the impact of record and arms 50 would be adequate to produce noise of an objectionable nature. Furthermore, the record might even stick on the spindle before it reached the turntable.

Although the dwell provided by the portion 313 of the cam is intended primarily for the benefit of 12-inch records, said dwell may be beneficial for the so-called 10-inch records if owing to irregularities in manufacture their diameter is substantially greater than ten inches.

*Support and control of pickup arm*

Means to govern the position of the pickup arm 53 with respect to the turntable T are provided. The means includes use of a tubular column 316 (Fig. 36) having at the base thereof a section 317, of reduced diameter passing through the base plate 55, the section 317 being rolled over or riveted at 318. The column 316 is thus held in vertical relationship to the plate 55 so that a sleeve 319, journaled within the column, is rotatable about a vertical axis and is anchored against downward displacement by a coupling 321 adjustably secured to the sleeve by a set screw 322. The coupling 321 bears an outwardly and upwardly extending arm 323 from the end of which a pair of arms 324, formed of spring metal, are supported and extend outward. From the top of the pickup arm 53 a pair of arms 326 extend downwardly to embrace the arms 324 and with which they are in pivoted relationship by a pin 327 passing horizontally through the two pairs of arms. The column 316 is so positioned with respect to an annular and vertical motion cam 328, on the cam wheel 251, that a lift rod 329, journaled centrally of the sleeve 319 and adapted to rest against the cam 328, is adapted to be moved axially by said cam when it is rotated. At the upper end thereof, the rod 329 carries an adjustment screw 331 threaded in the rod. The screw 331 and rod 329 being adapted to sustain the pickup arm 53 as its weight urges it downwardly about the pin 327, it follows that differences in the height of the cam 328 are adapted to swing the pickup arm about said pin. The screw 331, of course, provides for vertical adjustment of the needle end of the pickup arm while provision for maintaining such an adjustment involves use of a lock nut 332, on the screw, which is adapted to be clamped against rod 329.

The pickup arm 53 is adapted to be swung laterally by means including a lateral motion cam 333 (Figs. 23 and 36) adjacent the cam 328 and preferably forming an integral part of the cam wheel 251. In order that motion provided by the cam 333 may be imparted to the pickup arm, the lower end of the sleeve 319 has, rigidly fastened thereto and extending radially thereof, a cam arm 334 which carries at its swinging end a downwardly extending follower 336 adapted to be operably engaged by the cam 333. As will be noted, the cam 333 takes the form of a groove 337 only wide enough, for the greater part of its length, to accommodate the follower 336. At one extremity thereof, one of the opposed vertical walls of the groove 337, namely, an inner wall 338, diverges as at 339 from an opposed or outer wall 341 and extends toward a region centrally of the wheel 251 to a wall section 342. During the operation of reproducing a record, in which the wheel 251 is in a normal position, the follower 336 is adjacent the wall 342, which wall is arcuate to provide clearance and free movement for the follower (Fig. 23). Also during its normal position, and until the needle of the pickup arm reaches the end of the sound groove of the record being reproduced, the follower 336 is remote from the wall section 339. At the same time the lift rod 329 rests against a dwell or depression 343 in the vertical motion cam 328. When, however, the pickup arm reaches the end of the sound groove of a record, and wherein the follower 336 has closely approached the wall section 339, a trip mechanism, later to be described, starts the wheel 251 rotating counterclockwise. This causes the lift rod 329 to ride up inclined surfaces 344, each of which extends from either side of the dwell 343 to the top of the cam. In so doing, the lift rod 329 rocks the pickup arm about the pin 327 thus disengaging the pickup arm from the record just engaged. When the pickup arm is free of the record, the follower 336 is then engaged by the wall section 339 against which the follower is forced to slide by rotation of the wheel 251 until said follower enters the groove 337 where it is confined between the walls 338 and 341. Since the follower 336 is swung in a direction away from shaft 249 by the wall section 339, the pickup arm 53 is also swung away from the spindle S until, at the position where follower 336 is in the groove 337, the pickup arm occupies a position sufficiently remote from the turntable to allow a record to be transferred thereto or removed therefrom without striking the pickup arm. During the interval of time which it is necessary for the pickup arm to be free of a record, the lift rod rests on the top of cam 328, which is of uniform height throughout its surface except at the dwell 343 and inclined surfaces 344. Also while the follower 336 is in the groove 337, the lever 266 is operated by the cam 269 thereby providing for removal of the played record from the turntable and replacing it with an unplayed record by the mechanism already described.

A track switch 346 (Figs. 23 and 39) is employed to determine the "let-down" position of the pickup arm; that is, the operation of lowering the pickup needle into engagement with the beginning of the sound groove of an unplayed 10- or 12-inch record. Since the let-down of the pickup for a 12-inch record is at variance with the let-down for a 10-inch record, it follows that when the wheel stops turning, automatically, on completion of a cycle of rotation and occupies a normal position, the follower 336 must occupy either of two possible positions depending on whether a 10-inch or 12-inch record is on the turntable. Therefore, it is in accordance with the construction and operation of the mechanism that the track switch or gate 346 normally occupies the position indicated in Fig. 23 wherein the switch is set for manipulation of the pickup arm with respect to 10-inch records.

In detail, the switch is generally arcuate in transverse cross section and includes a downwardly extending pin 347 (Fig. 39) which is journaled in a boss 348, an integral part of the wheel 251. Since it is desirable that just enough friction be provided between the switch 346 and a web portion 349 of the wheel 251, a suitable compression spring 351 on the pin 347 is provided between a nut 352 on the lower end of the pin and the boss 348. The switch 346 is pivoted to the web 349 in close proximity to a baffle 353 upstanding from the web. Furthermore, the baffle 353 is disposed midway between opposed vertical walls 354 and 356 rising from the web 349, thereby providing channels or end grooves 357 and 358 just wide enough to operably accommodate the follower 336. Additionally, one end of the baffle 353 extends, substantially, to the arc defining the wall surface 342. As the follower is guided by the groove 333, during a record changing cycle, it is directed toward the shaft 249 by an inwardly directing or return portion 359, of the groove 333, in the proximity of the switch 346 against which the follower strikes, only to be deflected thereby into the groove portion 357. When the follower 336 emerges from the groove portion 357, the wheel 251 automatically stops, due to the notch 263 reaching a point beside the pinion 262. At the same time that the follower 336 passes through groove 357, one of the inclined surfaces 344 (Fig. 36) passes under the lift rod 328, thereby allowing the pickup to rock downwardly by its own weight. A 10-inch record being on the turntable at the time, the pickup arm engages the beginning of its sound groove, owing to the angular relationship between the arm and follower 336. The follower 336, then being free from the groove 357, moves with the pickup arm as the sound groove on the record carries said pickup arm toward the spindle and the follower 336 toward wall 339, the completion of this motion resulting in another record cycle as previously outlined.

When a 12-inch record is deposited on the turntable T a latch mechanism is actuated. It provides for swinging the switch 346 from the 10-inch record position, in which it is represented by full lines (Fig. 40), to the 12-inch record position, represented by broken lines. The latch is supported from the base plate 55 and is so positioned, with respect to the turntable T, that when a 10-inch record is manipulated with respect to the turntable, this size of record fails to engage the latch mechanism.

In detail, the latch mechanism comprises a latch frame 364 (Figs. 23 and 36) which is bolted to the plate 55 adjacent an aperture 366 therein. The frame 364 is of generally L-shaped formation, being preferably of sheet metal. At one end thereof, the frame 364 includes a pair of upstanding ears 367 adapted to embrace arms 368 and 369 of a U-shaped toggle member 371, the same being in pivoted relationship to the frame by a pin 372 passing through the ears 367 and arms 368 and 369. Toward one end and at the upper edge thereof, the arm 369 includes a laterally extending pad or finger 370 adapted to be engaged by a 12-inch record as it is being lowered to the turntable T. The toggle member 371 is adapted to rock about the pin 372 between an upward position indicated in Fig. 36 and a downward position indicated in Fig. 37 by the weight of a 12-inch record as it is deposited on the turntable. The arm 369 also includes a downwardly extending flange 373, one of the edges of which is provided with a pair of notches 374 and 376. A tooth 377, having gently sloping cam sides, is thus provided by the notches 374 and 376. Beside the course through which the tooth 377 is adapted to be carried, is a near-vertically extending link 378 pivoted at its lower end at 379 to the lower end of a finger 381, extending downwardly from the side of the frame 364 toward one end thereof. Upwardly and laterally thereof the link 378 bears a pin 382 which is urged into engagement with one of the notches 374 and 376 by a tension spring 383 anchored to the link 378 and a lug 384 struck upwardly from the frame 364. The spring 383 is adequate to retain the arm 369 in either of the positions shown in Figs. 36 or 37. When in its downward position, the lower end of the arm 373 is spaced from the cam wheel 251 by a narrow margin, as is also a plate 386 of resilient metal riveted to the arm 373. The plate 386 is further slotted at 388 to provide a resilient cam or finger 389 while the end of arm 373 is notched at 391 to afford lateral movement for the finger. Furthermore, the finger 389 is so positioned with respect to the course that a lug 392, extending upwardly from the switch 346, is adapted to be carried through, that the lug is adapted to strike the finger 389 and to be thereby deflected, thus moving the switch to the broken line position (Fig. 40). The finger 389 is resilient for the sake of safety, for should the switch 346 stick in its full line and 10-inch record position, the lug 392 would merely bend the finger 389 enough to pass it. It will thus be noted, that, when in the broken line position, the switch 346 is adapted to direct the groove 358 around the follower 336, just beyond which the pickup arm is lowered into engagement with the beginning of the sound groove of the 12-inch record on the turntable.

Since it is desirable that the toggle arm 369 be normally in its raised position, means are provided for moving it from the Fig. 37 position, to the Fig. 36 position. To provide for this, the arm 373 includes a reset arm 393, extending laterally from the base thereof, adapted to be engaged by a reset cam 394 (Figs. 37 and 38). The cam 394 is bolted to the cam wheel 328 and includes an upstanding portion 396 which is segmental of an arc about the axis of wheel 251. The cam 394 also includes a slanting cam surface 397 adapted to be passed under the reset arm 393 and by which the arm 371 is adapted to be lifted to its normal position (Figs. 36 and 78). Additionally the reset arm 393 is notched at 398 (Fig. 38) so that the lug 392 may pass under the reset arm.

Provision is also made for returning the track switch 346 to its normal position; that is, the full line position indicated in Figs. 40 and 23. Said provision includes a cam 399 (Figs. 73 and 78) extending downwardly from the base plate 55 to which it is bolted. The cam 399 is V-shaped in transverse cross section, and one of its sides is positioned in the course that the lug 392 is carried through, when the switch is set for let-down of the pickup arm into engagement with the beginning of a 12-inch record. When the track switch is set for manipulation of a 10-inch record (Fig. 72) the lug 392 is adapted to clear the cam 399 in the course of its movement during a record changing cycle.

In Figs. 87 to 91 inclusive is shown an alternative embodiment of mechanism for varying the let-down of the pickup arm 53. The mechanism includes use of a cam wheel 401 in the top surface of which is a groove 402 identical with the groove 333 indicated in Fig. 23 while cam walls 403 and 404 correspond to the walls 342 and 339. Within a widened portion 406 of the grooves 402, at the wall section 403, a switch 407 is adapted to be moved laterally. The switch 407 is of generally rectangular formation and has a tongue 408, transversely of the base thereof, adapted to be slidably received within a slot 409 transversely of the widened portion 406 of the groove. The switch 407 is further anchored to the wheel 401 by a bolt 411 (Fig. 90) passing through the switch 407, wheel 401, a washer 412, resilient washer 413 and nut 414, the relationship between the parts providing just enough friction between the switch 407 and wheel 401 to maintain the switch in whatever position to which it is moved, yet permit ready displacement of the switch to a different position by mechanism provided for this displacement. In order that the switch may be moved, the bolt 411 is provided with an elongated, round head 416 which performs the function of a follower since it is adapted to be engaged by the cam 399 (Fig. 23), to provide for one extreme position (Fig. 87), and by the cam 389 (Fig. 37) to position the switch in its other extreme position (Fig. 88). By movement of the switch 407 to either of its extreme positions different exit grooves 417 and 418 are provided which are adapted to guide the follower 336 into the respective positions for a 10-inch and/or a 12-inch record let-down.

*Means for controlling the record playing cycle*

A record playing cycle is started by operation of a latch mechanism which, in turn, is adapted to be triggered automatically and/or manually. The means to start this cycle comprises a latch, carried by the cam wheel 251, and electromechanical trigger apparatus actuated automatically by the pickup arm or by a switch adapted to be manually closed from outside the cabinet in which the record player is housed. The latch mechanism is adapted to be cooperatively associated with members fixed to the driven sleeve 206 (Fig. 31). In detail, it comprises a bell crank lever or latch lever 421 pivoted at 422 to a bracket 423 on the under side of wheel 251. Extending radially thereof, the wheel 251 has a slot 424 through which an arm 426 of the lever 421 is adapted to extend. The arm 426 has an eye 427 which is engaged by one end of a spring 428 (Fig. 23) the other end of which is anchored to the wheel 251 at an aperture 429 passing therethrough. Between its respective ends, the spring 428 is coiled about a post 431 in such a way that by its tendency to uncoil, the spring urges the lever 421 clockwise (Fig. 31) about its pivot 422. In its normal position; that is, when the wheel 251 is motionless as when a record is being reproduced, the lever 421 is substantially in a vertical plane with the shafts 249 and 206. Also while in its normal position, the lever 421 is supported, in the position indicated in Figs. 31 and 34, by a cam 432 struck upwardly from the bracket 259. Additionally, the lever 421 is notched at 433 to provide clearance for a pair of diametrically disposed wings 434 preferably integral with the pinion 262.

When the operation of playing a record is discontinued, a trigger mechanism, later to be described, rotates the wheel 251 through a slight increment of rotation, approximately through a circumferential distance of ⅛ or $\frac{3}{16}$ of an inch. This is adequate to carry the lever 421 off the cam 432. Thereupon the spring 428 swings lever 421 about its pivotal axis to the position in which it is indicated in Fig. 33 and Fig. 35 wherein the lever is adapted to be engaged by one of the wings 434. The motion of wing 434, in engagement with the lever 421, moves the gear 251 sufficiently to drivingly engage gear 261 by the pinion 262. The gear 251 is thus turned through a complete revolution during which the lever 421 is engaged by an inclined surface 436, of the cam 432, to be thereby returned to its normal position (Figs. 31 and 34) where the gear 261 is again out of mesh with the pinion 262.

Trigger mechanism, to initiate rotation of gear 251 is indicated in Figs. 23 and 36. It is supported from the base plate 55 by means including a trigger bracket or subframe 438. More in detail, the bracket comprises a bearer plate 439 (Fig. 32), generally triangular in formation, which is supported in spaced relation to the plate 55 by legs 443 and 444 which terminate in laterally extending feet 441 and 442 which are bolted to the base plate 55. The trigger mechanism further includes pusher means or mechanism pivoted to the bearer plate 439 and a trigger member or lever 457, also pivoted to said bearer plate and adapted to holdingly engage the trigger means, which later will be described in detail. Trigger release means, for releasing the push means from holding engagement by the trigger member, is rigidly associated with the bracket 438 and indicated in its entirety by the character 470.

In detail, the pusher mechanism comprises an actuator lever 446 which is pivotally mounted on plate 439 by a rivet 447. The lever 446 is offset at 448, to provide space between it and the plate 439 for a follower link 449, another link of the pusher mechanism, which is pivoted by a rivet 451 to the lever 446. Lever 446 is provided with an upwardly offset portion at 445 so that it may not interfere with the motion of cam 394 under the lever. The lever 446 is urged to rotate about its axis counterclockwise (Fig. 23) by a tension spring 452 anchored between an ear 453, struck upwardly from the link 449, and an extension 454 on the leg 444, but a stop provided by an ear 456, struck upwardly from plate 439, is adapted to limit the counterclockwise rotation of lever 446. In addition, the counterclockwise motion of lever 446 is adapted to be resisted by the trigger member 457 which may appropriately take the form of a lever pivoted to the lower side of plate 439 by a rivet 458. The trigger lever, in turn is biased clockwise by a tension spring 459 anchored between ears 461 and 462 struck upwardly from the trigger lever and plate 439, respectively. As will be noted, the trigger lever 457 is notched at 463 to provide a claw 464 adapted to engage a finger 466 depending from one end of lever 446 and to thereby normally hold lever 446 away from stop 456. When the wheel 251 is in normal position, a pair of peripheral cam surfaces 467 and 468 are below the link 449, Figs. 23 and 24. Between the surfaces 467 and 468 is a V-shaped notch 469 with which a follower 471, on the lower side and end of link 449, is normally in engagement by the force of spring 452 when wheel 251 is in its normal position. The follower 471 being pressed into the notch 469 by the spring 452 thus serves to resist rotation of the wheel 251 once it is in the position indicated (Fig. 23) thereby also serving to releasably maintain the cam wheel 251 in a position wherein the lever 421 (Fig. 34) is supported above the end of cam 432.

The trigger release means involves apparatus including a suitable coil and magnet, denoted by the character 472, which is supported from the base plate 55 by a bracket 473 (Fig. 13). In cooperative association with the magnet 472 is an armature 474 urged away from the magnet by a tension spring 476 (Fig. 23) but limited by the head 477 of a longitudinally adjustable rod 478 carried by the bracket 473. The armature 474 is of substantially L-shaped transverse formation thus including an arm 479, extending over the trigger lever 457, and having an outwardly bent flange 481 adapted to engage an ear 482 bent upwardly from the end of the trigger lever 457. When the magnet 472 is suddenly energized, it, of course, draws the armature 474 toward it. This swings the lever 457 counterclockwise, about pivot 458 thereby relieving the lever 446 from the holding effect provided by engagement of the claw 464, with the result that spring 452 swings lever 446 against the stop 456, as will be noted in Fig. 24. Since the follower 471 is coupled to the lever 446, movement thereof, turns cam wheel 251 through the increment of motion previously mentioned to thereby carry the lever 421 (Fig. 34) from the support provided by cam 432, so that the lever is enabled to assume the position it occupies in Figs. 33 and 35. This gives rise to meshing of pinion 262 with the gear 263, as previously indicated.

The electromagnet is adapted to be energized by either of two switches. They are indicated by the characters 483 and 484 respectively, in the circuit diagram of Fig. 86. Therein, an electric current from a suitable source is available by means of wires 486 and 487. The switch 483 is normally open and may be positioned at any point on the cabinet 1 (Fig. 1) where it will be convenient for manipulation by an operator. In the present embodiment the switch 483 is mounted behind a radio receiver dial 438 and is closed by depressing a button 489. The switch 483 immediately opens, once pressure on the button 489, a momentary depression of the button being all that is necessary to start a record changing cycle.

The switch 484 (Fig. 86) is also normally open but is adapted to be operated automatically. This takes place when a record has been completely reproduced. The switch 484 is shown in greater detail in Fig. 23. It includes a pair of resilient blades 491 and 492 respectively, which are electrically segregated from each other by a block of suitable insulating material 493. The switch 484 is in turn supported from the base plate 55 by a bracket 494 in such a position that when the pickup arm 53 reaches the terminal groove of a record, reproduction thereof having been completed, a pin 496 (Fig. 36), on an extension 497 of the cam arm 334, is carried into engagement with the blade 492 of the switch 484, thus closing the switch.

Preset means are provided to change the setting of the trigger mechanism from the position thereof as shown in Fig. 24 back to the normal position indicated in Fig. 23, before the wheel 251 has completed a revolution. The preset means includes a post 498, extending upwardly from wheel 251, and adapted to be carried into engagement with a free end 499 of lever 446. The post 498 is thus adapted to swing the lever 446 clockwise far enough against the resistance of spring 452, to pass the lever. In its swinging motion, the finger 466, is carried to a point where the spring 459 is permitted to swing the claw 464 back into holding engagement with the finger as indicated in Fig. 23. As the cam surface 468 is carried out of engagement with the follower 471, said follower remains out of engagement with any part of the wheel 251 until it is engaged by the cam surface 467. During this period rotation of the link 449 is limited with respect to the lever 446 since a lug 501, bent upwardly from the link, is pressed into engagement with a notch 502 in the side of lever 446.

I also contemplate a modification of the position of the reject switch 483. As previously stated, this switch can be placed in any convenient position. In Fig. 2*a*, I show how the switch may be cooperatively associated with the knob 11 on the door 8. In this instance, the switch 483 is mounted on the back of the door in any suitable manner, and the knob is provided with a switch actuator 489′ which extends through the door and the knob. The end 500 of the actuator inside of the cabinet is adapted to engage one of the switch arms to close the contacts of the switch when the actuator 489′ is pushed. This actuator, if desired, may be made of some suitable light transmitting plastic, such as Lucite, and a light source placed to the rear of the door and connected into the phonograph circuit will cause the actuator to be illuminated, showing that the phonograph mechanism is turned on.

Having thus described my invention in embodiments thereof, I am aware that numerous and extensive departures may be made therefrom without departing from the spirit or scope of the appended claims.

I claim:

1. A phonograph record player comprising a frame, and a turntable adapted to be rotated about an axis in fixed relationship to said frame, a magazine for records coupled to the frame, said magazine comprising means including a base member adapted to supportingly engage the peripheral edges of the records, a side member, a prop member in spaced association with said side member, said base member being adjacent to and slanting upwardly from said side member to provide for displacement of records thereover by gravity toward said side member, said side member being adapted to retain records in engagement with said base member, said base member being formed with a zone of increased slant adjacent said side member, said zone extending for a distance away from said side member only great enough to support a single end record thereby urging said end record into operative engagement with said side member, said prop member supporting said records in angularly spaced relationship to the plane occupied by a record when supported by said turntable, and a pair of fingers slidably coupled to said side member and adapted to successively push the end record past said side member to thereby free it from said magazine.

2. A phonograph record player comprising a frame, and a turntable adapted to be rotated about an axis in fixed vertical relationship to said frame, a magazine for records coupled to the frame, said magazine comprising means including a base member adapted to supportingly engage the peripheral edges of the records, a side member, means including an anti-friction prop member in spaced association with said side member, said base member being adjacent to and slanting upwardly from said side member at an angle of from 26 degrees to 30 degrees from a horizontal to provide for displacement of records thereover by gravity toward said side member, said side member being adapted to retain records in engagement with said base member, a record support surface of increased slant at the lower side of said base member extending to the interior surface of said side member, said surface extending for a distance away from said side member only great enough to support a single end record thereby urging said end record into intimate association with said side member, said prop member being adapted to support said records at an angle of from 9 degrees to 13 degrees from a vertical, and means connected to said frame formed to provide a slot through which records are adapted to be received by said magazine.

3. In a phonograph record player of the class which comprises a frame and supported therefrom a magazine including a side member against which a group of records are adapted to automatically abut when supported on their edges in near vertical position and a pair of ejector members movably anchored to said side member arranged to eject an end record from said group, means including an instrumentality connected to each of said ejector members being operable in the same plane as said group of records and adapted to engage said end record and the record adjacent said end record to lessen the friction between said records when the end record is moved with respect to said adjacent record, safety means coupled between said instrumentalities and said ejector members, said safety means being adapted to move said instrumentalities with respect to said ejector members, said instrumentalities being thereby adapted to operatively engage adjacent records when the periphery of one of the records is defective.

4. In a phonograph record player of the class which comprises a frame and supported therefrom a magazine including a side member against which a group of records are adapted to automatically abut when supported on their edges in near vertical position and a pair of ejector members movably anchored to said side member for ejecting an end record from said group, means including a blade connected to each of said ejector members being operable in the same plane as said group of records and adapted to be extended between the end record and the record adjacent thereto to lessen the friction between said end record and the adjacent record when said end record is moved with respect to the adjacent record, means coupled to each of said ejector members and said blades to move said blades with respect to said ejector members when said ejector members are moved with respect to said side member to cause operative engagement of said end record and said adjacent record by said blades, said ejector members being less far extended than said blades and thereby being adapted to lift said end record above a portion of the edge of said side member, after separation of said end record from its adjacent record, said ejector members being formed to cause displacement of said end record onto an edge of said side member, said edge of said side member also being formed to displace said end record laterally out of said magazine.

5. A phonograph record player comprising a frame, and a turntable adapted to be rotated about a vertical axis in fixed relationship to said frame, a magazine for records coupled to the frame, said magazine comprising means including a base member adapted to supportingly engage the peripheral edges of the records, a side member, a prop member in spaced association with said side member, said base member being adjacent to and slanting upwardly from said side member to cause displacement of records thereover by gravity toward said side member, said side member being adapted to retain records in engagement with said base member, said base member formed with a region of increased slant adjacent said side member, said region of increased slant being adapted to cause operative engagement of said end record with said side member, said prop member being adapted to support the records in near vertical position and a pair of fingers slidably coupled to said side member, a separator element attached to each of said fingers being operable in the same plane as said records, said separator element being adapted to be pushed between said end record and the remaining records when said fingers are moved toward said records, said fingers being formed with a record abutting surface for engagement with the edge of a record adapted to lift said end record above said side member, said surface on said fingers being slanted to provide for displacement of the end record therefrom into engagement with the edge of said side member and means in connection with the edge of said side member comprising a slanting edge formation for coincident alignment with the slanting edge on said fingers to provide for displacement of said record therefrom and out of the magazine.

6. A phonograph record player comprising a frame, and a turntable adapted to be rotated about an axis in fixed relationship to said frame, a magazine for records coupled to the frame, said magazine comprising means including a base member adapted to supportingly engage the peripheral edges of the records, a side member, a prop member in spaced association with said side member, said base member being adjacent to and slanting upwardly from said side member to displace records thereover by gravity into engagement with said side member, said side member being adapted to retain records in engagement with said base member, said prop member being adapted to support the records in angularly spaced relationship to the plane occupied by a record when supported by said turntable, a pair of fingers slidably coupled to said side member and adapted to be moved into engagement with an end record in the magazine, a safety blade movably anchored to each of said fingers and operable in the same vertical plane as said records, said blades extending beyond the ends of said fingers and adapted to space said end record from the adjacent record in said magazine before said fingers are moved into engagement with said end record, cam means in connection with said blades and said side member formed to move said blades with respect to said fingers when said fingers are in engagement with said record, said fingers being adapted to move said end record above said side member, beveled surfaces on the ends of said fingers to cause displacement of a record therefrom by gravity into engagement with the edge of said side member, and a beveled surface on the edge of said side member formed to cause displacement of the record by gravity therefrom and out of the magazine when the fingers are raised until their ends are coincident with the side member.

7. A phonograph record player comprising a turntable, a magazine for supporting a plurality of records of different sizes at one side of the turntable in an inclined position including a support for the lower edges of the records having an inclined bottom wall, and a vertically extending ledge adjacent the lower edge of said bottom wall defining the forward edge of said magazine, means for supporting the upper portion of said records disposed in a plane toward the turntable so that the records are bodily inclined toward the turntable, means for transferring said records from the magazine to the turntable including a pivoted member extending on opposite sides of the turntable and movable from a position below the level of the turntable to a substantially vertical position adjacent said magazine, an ejector for engagement with the records singly in said magazine to raise said records above the edge of said ledge, the edge of said ledge being inclined toward said turntable whereby the record drops from said ledge, supporting means adjacent said ledge for catching the lower edge of said record, said pivoted member adapted to support the edge of said record after removal from the magazine and a stationary spindle for said turntable extending upwardly from the turntable and having an inclined portion extending toward said magazine, said pivoted means being movable to lower said record into engagement with the end of said spindle and said record catching means being movable relative to said pivoted member and said spindle, and arranged to lower and slide said record until the record center hole drops over the spindle and said pivoted member cooperating with said spindle to lower said record onto the turntable, a played record receiving compartment disposed in a plane below the turntable between the record magazine and the turntable, said pivoted means adapted to raise said record from said turntable to a position where it slips off of the spindle and drops into said receiving compartment, and means disposed in the path of travel of the record into the receiving compartment to decrease the velocity of the record falling into the compartment.

8. An automatic record player comprising means adapted to move one of a group of records into an initial near vertical position with its center hole in a predetermined vertical medial plane, a turntable adapted to be rotated about a fixed vertical axis, and means including stationary members to space said turntable with respect to said first named means, said record being conveyed from said near vertical position to a horizontal position on said turntable by means comprising, a fixed spindle supported centrally of said turntable from said stationary members, said spindle comprising an intermediate portion adapted to be engaged by a record on said turntable a guide portion curving upwardly and laterally from said intermediate portion and including a straight section terminating in a free end in said vertical medial plane, means including a swingable member supported from said stationary members and adapted to cooperate with said spindle to lower the record to said turntable and to remove said record from said turntable, and means including a pair of mobile elements by which said record is adapted to be moved laterally within said medial plane, said mobile elements being adapted to carry a record into engagement with the free end of the spindle by thus moving said record to a predetermined point whereat it is adapted to swing about said elements, said movement by said mobile elements being in a path to provide for interception of the record's center hole by the free end of said spindle thereby transferring the support of the record from said mobile elements to said spindle.

9. An automatic record player comprising means adapted to move one of a group of records into an initial near vertical position with its center hole in a predetermined vertical medial plane, a turntable on a fixed vertical axis, and means including stationary members to space said turntable from said first named means, said record being conveyed from said near vertical position to a horizontal position on said turntable by means comprising, a fixed spindle supported centrally of said turntable from said stationary members, said spindle comprising an intermediate portion, and a cam portion, said intermediate portion being engaged by a record when resting on said turntable, said cam portion extending upwardly and laterally from said intermediate portion and continuing through approximately a logarithmic curve and including a section terminating in a free end in said vertical medial plane, means including a swingable member supported from said stationary members and adapted to cooperate with said spindle to lower the record to said turntable and to remove said record from said turntable, and means including a pair of mobile elements adapted to move a record laterally within said medial plane, said mobile elements being adapted to carry said record into engagement with the free end of the spindle by thus moving said record to a predetermined point whereat it is adapted to swing about said elements, said movement by said mobile elements being in a path to provide for interception of the record's center hole by the free end of said spindle thereby transferring the support of the record from said mobile elements to said spindle.

10. An automatic record player comprising means adapted to move one of a group of records into an initial near vertical position with its center hole in a predetermined vertical medial plane, a turntable adapted to be rotated about a fixed vertical axis, and means including stationary members to space said turntable from said first named means, said record being conveyed from said near vertical position to a horizontal position on said turntable by means comprising, a fixed spindle supported centrally of said turntable from said stationary members, said spindle comprising vertical portions and a cam portion extending upwardly and continuing laterally through a plurality of curvatures to an inclined straight section terminating in a free end in said vertical medial plane, means including a pair of mobile elements adapted to engage and move said record laterally within said medial plane, said mobile elements being adapted to move said record to a predetermined point where it is free to swing about said elements thereby permitting said record to move into engagement with the free end of said spindle, said movement by said mobile elements being in a path to cause interception of the record's center hole by the free end of said spindle thereby providing for transfer of the support of the record from said mobile elements to said spindle, and means including a pair of arms supported from said stationary members adapted to swing about an axis beside said turntable and at a level below the top surface thereof, and mechanism by which said arms are operated in timed relationship to said mobile elements, said arms being adapted to supportingly engage said record after it has started swinging about said mobile elements, said arms being moved by said mechanism to lower a record to said turntable when swung in one direction and to remove a record from said turntable when swung in the opposite direction, said cam portion being formed to allow said record to be engaged by said arms until said record is carried to a predetermined near vertical release plane remote from said turntable.

11. In an automatic record player comprising a horizontal turntable and a magazine in which records are supported on their edges in near-vertical position from which a record is adapted to be transferred to the turntable by transfer means, said transfer means including pairs of movable fingers and mobile elements in association with the magazine and a fixed spindle having an inclined guide portion terminating in a free end and a pair of swingable arms swingable about an axis beside the turntable and in fixed relationship thereto; mechanism to actuate said transfer means comprising, an intermittently operable driver member, and a slidably drivable member, drivingly associated with said driver member, cam surfaces on one of said members; means, including a follower in operative association with said cam surfaces, adapted to move said movable fingers and said mobile elements for removing one of the records from the magazine and moving it until its center hole is engaged by said free end, second cam surfaces on one of said members, and means including a cam follower in operative association with said second cam surfaces adapted to swing said arms in timed relationship to the movements of said mobile elements and said fingers whereby said arms are adapted to be in cooperative association with said spindle and said mobile elements for transferring a record from the magazine to the turntable.

12. In an automatic record player comprising a horizontal driven turntable and a magazine in which records are supported on their edges in near-vertical position and from which a record is transferred to the turntable by transfer means, said transfer means including pairs of movable fingers and mobile elements in association with the magazine and a fixed spindle having an inclined guide portion terminating in a free end and a pair of swingable arms swingable about an axis beside the turntable and in fixed relationship thereto; mechanism to actuate said transfer means comprising, a driver cam member, and a horizontally slidably movable cam member, means including a mutilated gear adapted to drive said driver cam intermittently from said turntable, means engaged between said driver cam member and said slidably movable cam member to drive said movable cam member, cam surfaces on one of said cam members, means including a follower in operative association with said cam surfaces adapted to move said movable fingers and said mobile elements for removing one of the records from the magazine and moving it until its center hole is engaged by said free end, second cam surfaces on one of said cam members, and means including a cam follower in operative association with said second cam surfaces adapted to swing said arms in timed relationship to the movements of said mobile elements and said fingers whereby said arms are adapted to cooperate with said spindle and said mobile elements for transferring a record from the magazine to the turntable.

13. In an automatic record player comprising a frame and carried thereby a driven horizontal turntable and a magazine in which records differing in size are supported on their edges in near-vertical position and from which, a record is transferred to the turntable by transfer means, said transfer means including a pair of movable fingers and, in association therewith and with said magazine, a pair of mobile elements and a fixed spindle having an inclined portion terminating in a free end and a pair of swingable arms swingable about an axis beside the turntable and in fixed relationship thereto; mechanism to actuate said transfer means comprising a rotary cam member, and a horizontally slidably movable member, both of said members being supported from said frame, means including a mutilated gear adapted to drive said rotary cam member intermittently from said turntable, latch means in association with said frame to initate driving relationship between said turntable and said rotary cam member, a lever pivoted to said slidably movable member and also to said frame, a follower on said lever in operative association with said rotary cam to carry said slidably movable member through a cycle of reciprocatory motion, first cam surfaces on said slidably movable member, means including a follower in operative association with said cam surfaces to move said movable fingers and said mobile elements for removing one of the records from the magazine and moving it until its center hole is engaged by said free end, second cam surfaces on said slidably movable member, and means including a cam follower in operative association with said second cam surfaces, adapted to swing said arms in timed relationship to the movements of said mobile elements and said fingers whereby said arms are adapted to cooperate with said spindle and said mobile elements, said second cam surfaces including portions thereof adapted to hold said arms in a plurality of substantially stationary positions during a cycle of operation of said slidably movable member for transferring a record from the magazine to the turntable.

14. In a phonograph record player of the class which comprises a frame and supported therefrom a magazine including a side member against which records abut when supported on their edges in near vertical position, a horizontal turntable rotatably coupled to said frame, a fixed spindle in extension upwardly and inclined laterally from the axis of the turntable providing a free end portion disposed in a vertical medial plane, a pair of mobile elements adapted to be swung about pivots on said side member on either side of said vertical medial plane to move said record into position for threading the center hole of the record over said spindle; safety means to divert the course of the record if the center hole thereof fails to be threaded over said spindle, including a pair of cam portions on said side member, said cam portions being formed to dislodge a record from said mobile elements if carried thereby into engagement with said cam portions.

15. In a phonograph record player of the class which comprises a frame and supported therefrom a magazine including a side member against which records differing in size abut when supported on their edges in near vertical position, and rotatably coupled to said frame a horizontal turntable from the axis of which a fixed spindle is in extension upwardly and inclined laterally providing a free end portion in a vertical medial plane onto which the center hole of a record from the magazine is adapted to be threaded due to the support provided by a pair of mobile elements adapted to be swung about pivots on said side member on either side of said vertical medial plane, and a rejected record compartment below said mobile elements; safety means to divert the course of the record if the center hole thereof fails to be threaded over said spindle, comprising a pair of cam portions on said side member, each of said cam portions being on opposite sides of said medial plane and adapted to dislodge a record from said mobile elements if carried thereby into engagement with said cam portions thereby providing for passage of the record to said rejected record compartment.

16. In a phonograph record player of the class which comprises a frame and supported therefrom a magazine including a side member against which records differing in size abut when supported on their edges in near vertical position, a horizontal turntable rotatably coupled to said frame, a fixed spindle in extension upwardly from the axis of the turntable and inclined laterally to provide a free end portion disposed in a vertical medial plane onto which the center hole of a record from the magazine is adapted to be threaded by a pair of mobile elements adapted to be swung about pivots on said side member on opposite sides of said vertical medial plane and a rejected record compartment below said mobile elements; safety means to divert the course of the record if the center hole thereof fails to be threaded over said spindle, comprising a pair of cam portions extending outward and downwardly from said side member, each of said cam portions being adapted to dislodge a record from said mobile elements if carried thereby into engagement with said cam portions, said cam portions also being on either side of said medial plane and adapted to swing said record toward a vertical position as it is released from said mobile elements thereby providing for downward movement of the record laterally to said rejected record compartment.

17. A record player including a magazine for unplayed records, means to reproduce said records and means to discharge said records from said reproducing means, a record receiving compartment disposed below the level of said reproducing means, said discharge means arranged to discharge said records into said compartment, and means interposed in the path of travel of said record into said compartment for retarding the speed of travel of the record into the compartment, comprising a pair of friction rollers arranged to engage the record upon its travel into the compartment.

18. A record player including a magazine for unplayed records, means to reproduce said records and means to discharge said records from said reproducing means, a record receiving compartment disposed below the level of said reproducing means, said discharge means arranged to discharge said records into said compartment, and means interposed in the path of travel of said record into said compartment for retarding the speed of travel of the record into the compartment comprising a pair of friction rollers arranged to engage opposite sides of the record as it moves into the compartment.

19. A record player including a magazine for unplayed records, means to reproduce said records and means to discharge said records from said reproducing means, a record receiving compartment disposed below the level of said reproducing means, said discharge means arranged to discharge said records into said compartment, and means interposed in the path of travel of said record into said compartment for retarding the speed of travel of the record into the compartment, comprising a pair of friction rollers arranged to engage opposite sides of the record as it moves into the compartment and weighted means connected to one of said rollers adapted to prevent over-rapid acceleration thereof.

20. In a phonograph record player comprising a magazine in which records are supported on their edges in near vertical position and a turntable adapted to rotate about a vertical axis from which records after they have been played are adapted to be released to a rejected record magazine, the combination of means for modifying the velocity at which a record is adapted to be dropped through a predetermined course to said rejected record magazine, comprising a frame, a pair of rotatable members one on either side of said course, means supporting said members from said frame, means urging said members into position to grasp said record therebetween, said record in passing therebetween being adapted to move said members and means in driving communication with one of said members to influence the extent to which that member is adapted to be moved by the record.

21. In a phonograph record player comprising a magazine in which records are supported on their edges in near vertical position and a turntable adapted to rotate about a fixed vertical axis from which records, after they have been played, are released to drop laterally through a predetermined course to a rejected record magazine, the combination of means for modifying the velocity at which a record is dropped through said course to said rejected record magazine, comprising a frame, a pair of rotatable members one on either side of said course, means supporting said members from said frame, means including a swingable arm carrying one of said rotatable members in pivoted relationship to said frame, resilient means connected to said arm to urge said rotatable members to grasp the record passing between the rotatable members, said record in passing therebetween being adapted to rotate said members, and means including a governor in driving communication with one of said members to regulate the acceleration at which said member is adapted to be rotated by the records.

22. In a phonograph record player comprising a magazine in which records are supported on their edges in near vertical position and a turntable adapted to rotate about a fixed vertical axis from which records, after they have been played, are released and dropped laterally through a predetermined course to a rejected record magazine, the combination of means for modifying the velocity at which the record is dropped through said course, comprising a roller adapted to operate about a fixed axis on one side of said course, means to rotatably anchor said roller to said frame, another roller adapted to rotate about an axis movable with respect to the axis of the first-named roller, a link movably coupled to said frame, said movable roller being pivoted to said link, means connected to one of said rollers to urge said rollers together to grip the opposed sides of a record when passing between said rollers, and an inertia governor coupled to one of said rollers adapted to resist movement of a record between the rollers by virtue of its resistance to gain rotative speed.

23. In combination with a phonograph record player comprising a stationary frame and mechanism providing for passage of a record through a substantially vertical course in discharging a record after it has been played, means to modify the velocity at which said record is adapted to pass through said course comprising a roller adapted to operate about a fixed axis on one side of said course, said roller being rotatably anchored to said frame, another roller adapted to rotate about an axis movable with respect to the axis of the first-named roller, a link movably coupled to said frame, said movable roller being pivoted to said link, means connected to one of said rollers to pull said rollers together to grip the opposed sides of a record when passing through its course, and an inertia governor in driving communication with one of said rollers adapted to resist movement of a record between the rollers by virtue of its resistance to gain rotative speed.

24. In combination with a phonograph record player comprising mechanism provided for passage of a record through a predetermined course in discharging a record after it has been played, means at said course to modify the speed of said record comprising record engageable members including a movable member supported from said record player, resilient means supported from said record player adapted to press said movable member against a record passing through said predetermined course, one of said record engageable members being adapted to be moved by said record and means including a rotatable member coupled to one of said record engageable members and adapted to vary the speed at which said record is adapted to pass said movable member.

25. A speed modifier for a phonograph record adapted to pass through a predetermined course in discharging a record after it has been played, comprising a frame, a pair of rotatable members one on either side of said course, means to support said members from said frame, means including a swingable arm pivoted to said frame and on which one of said rotatable members is journalled, resilient means connected to said arm adapted to urge said rotatable members to grasp the record passing between the rotatable members, the passage of said record being adapted to rotate said members and inertia governor means in driving communication with one of said members adapted to slow the acceleration of said rotatable members as they are rotated by the record.

26. An automatic phonograph comprising record playing mechanism including a turntable adapted to rotate about a fixed axis, a magazine adjacent said turntable adapted to receive records on their edges, and means to automatically position the records with their axes in a predetermined region of the magazine, a rejected record compartment for played records and cyclically automatic mechanism to transfer records of different sizes singly between said magazine and said turntable and played records between said turntable and said compartment, said automatic mechanism including carrier means in supporting engagement with a record being operative to eject said record from said magazine, movable centering means adjacent said turntable, means movably disposed between said centering means and said turntable and in cooperative association with said centering means to support said record upon ejectment thereof from said magazine, guide means associated with said turntable, said centering means and movably disposed means being movable relative to said guide means and operative to center said record relative to said guide means and to lower said record into engagement with said guide means.

27. An automatic phonograph comprising record playing mechanism including a turntable adapted to rotate about a fixed axis, a magazine adjacent said turntable adapted to receive records on their edges, and means to automatically position the records with their axes in a predetermined region of the magazine, a rejected record compartment for played records and cyclically automatic mechanism to transfer records of different sizes singly between said magazine and said turntable and played records between said turntable and said compartment, said automatic mechanism including carrier means in supporting engagement with a record being operative to eject said record from said magazine, movable centering means adjacent said turntable, means movably disposed between said centering means and said turntable and in cooperative association with said centering means to support said record upon ejectment thereof from said magazine, a fixed element mounted centrally on said turntable, said centering means and movably disposed means being movable relative to said fixed element and operative to center said record relative to said fixed element and to lower said record into engagement with said fixed element.

28. An automatic phonograph comprising record playing mechanism including a turntable adapted to rotate about a fixed axis, a magazine adjacent said turntable adapted to receive records on their edges, and means to automatically position the record with their axes in a predetermined region of the magazine, a rejected record compartment for played records and cyclically automatic mechanism to transfer records of different sizes singly between said magazine and said turntable and played records between said turntable and said compartment, said automatic mechanism including carrier means in supporting engagement with a record being operative to eject said record from said magazine, movable centering means adjacent said turntable, means movably disposed between said centering means and said turntable and in cooperative association with said centering means to support said record upon ejectment thereof from said magazine, a fixed spindle mounted centrally on said turntable, said spindle being bent at a region remote from said turntable and inclined so as to extend toward said magazine, said centering means and movably disposed means being movable relative to said spindle and operative to center said record relative to said spindle and to lower said record into engagement with said spindle.

References Cited in the file of this patent

UNITED STATES PATENTS

| | | |
|---|---|---|
| 1,491,252 | Wellner | Apr. 22, 1924 |
| 1,597,391 | Raney | Aug. 23, 1926 |
| 1,628,285 | Stoll et al. | May 10, 1927 |
| 1,802,830 | Pittman | Apr. 28, 1931 |
| 1,802,831 | Pittman | Apr. 28, 1931 |
| 1,807,073 | Schulz | May 26, 1931 |
| 1,887,309 | Kincannon | Nov. 8, 1932 |
| 1,942,864 | La Rue | Jan. 9, 1934 |
| 1,954,246 | Jones | Apr. 10, 1934 |
| 1,966,692 | Small et al. | July 17, 1934 |
| 2,047,160 | Zeruneith | July 7, 1936 |
| 2,270,179 | Wright | Jan. 13, 1942 |
| 2,293,212 | Offen | Aug. 18, 1942 |
| 2,295,460 | Farrow | Sept. 8, 1942 |
| 2,307,030 | Erwood | Jan. 5, 1943 |
| 2,330,293 | Knox | Sept. 28, 1943 |
| 2,348,766 | Wagner | May 16, 1944 |
| 2,352,331 | Leline | June 27, 1944 |
| 2,355,790 | Faulkner | Aug. 15, 1944 |
| 2,370,875 | Pressley | Mar. 6, 1945 |
| 2,371,361 | Small | Mar. 13, 1945 |
| 2,374,080 | Dale | Apr. 17, 1945 |
| 2,387,916 | Knox et al. | Oct. 30, 1945 |
| 2,390,862 | Alexandersson et al. | Dec. 11, 1945 |
| 2,519,187 | Hokanson | Aug. 15, 1950 |
| 2,557,645 | Fox | June 19, 1951 |

FOREIGN PATENTS

| | | |
|---|---|---|
| 403,353 | Great Britain | Oct. 11, 1932 |
| 699,379 | Germany | Oct. 31, 1940 |
| 58,843 | Holland | 1947 |